(12) United States Patent
Kim et al.

(10) Patent No.: US 11,681,405 B2
(45) Date of Patent: Jun. 20, 2023

(54) TOUCH SENSOR AND DISPLAY DEVICE

(71) Applicant: Samsung Display Co., Ltd., Yongin-si (KR)

(72) Inventors: Jang Hui Kim, Suwon-si (KR); Ga Young Kim, Hwaseong-si (KR); A Ra Jo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/963,982

(22) Filed: Oct. 11, 2022

(65) Prior Publication Data

US 2023/0030613 A1 Feb. 2, 2023

Related U.S. Application Data

(63) Continuation of application No. 17/188,481, filed on Mar. 1, 2021, now Pat. No. 11,487,394, which is a
(Continued)

(30) Foreign Application Priority Data

May 18, 2018 (KR) .......................... 10-2018-0056977

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0418* (2013.01); *G06F 2203/04105* (2013.01)

(58) Field of Classification Search
CPC ....... G06F 3/0414; G06F 3/044; G06F 3/0412
(Continued)

(56) References Cited

U.S. PATENT DOCUMENTS 10,579,182 B2 3/2020 Ding et al.
11,093,094 B2 8/2021 Kim
(Continued)

FOREIGN PATENT DOCUMENTS

GB 2 525 174 10/2015
KR 10-2018-0033353 4/2018

OTHER PUBLICATIONS

Extended European Search Report dated Sep. 24, 2019, in European Patent Application No. 19173874.9.
(Continued)

*Primary Examiner* — Calvin C Ma
(74) *Attorney, Agent, or Firm* — H.C. Park & Associates, PLC

(57) ABSTRACT

A touch sensor includes a base layer, a first electrode unit, second electrode units, and a first strain gauge. The first electrode unit includes first touch electrodes arranged on the base layer along a first direction and electrically connected to each other along the first direction. The second electrode units are spaced apart from one another along the first direction. Each of the second electrode units includes second touch electrodes arranged on the base layer along a second direction intersecting the first direction and electrically connected to each other along the second direction. Each of the second touch electrodes includes a first opening. The first strain gauge includes first resistance lines electrically connected to each other along the first direction. Each of the first resistance lines is disposed in a respective first opening disposed in a first row among the first openings.

33 Claims, 57 Drawing Sheets

Related U.S. Application Data continuation of application No. 16/401,080, filed on May 1, 2019, now Pat. No. 10,936,134.

(58) Field of Classification Search
USPC ................................. 345/76, 77, 173, 174
See application file for complete search history.

(56) References Cited

U.S. PATENT DOCUMENTS

| | | |
|---|---|---|
| 2014/0145979 A1 | 5/2014 | Lee |
| 2014/0152912 A1* | 6/2014 | Lee .................. G06F 3/0412 |
| | | 438/34 |
| 2016/0195955 A1 | 7/2016 | Picciotto et al. |
| 2017/0010719 A1 | 1/2017 | Chen et al. |
| 2017/0220180 A1 | 8/2017 | Lu et al. |
| 2017/0285799 A1 | 10/2017 | Iuchi et al. |
| 2017/0371471 A1* | 12/2017 | Kim .................. G02F 1/1343 |
| 2018/0035923 A1 | 2/2018 | Kang et al. |

OTHER PUBLICATIONS

Notice of Allowance dated Oct. 30, 2020, in U.S. Appl. No. 16/401,080.
Non-Final Office Action dated Jul. 23, 2020, in U.S. Appl. No. 16/401,080.
Korean Office Action dated Aug. 10, 2022, in Korean Patent Application No. 10-2018-0056977.
Non-Final Office Action dated Dec. 23, 2021, in U.S. Appl. No. 17/188,481.
Notice of Allowance dated Jul. 1, 2022, in U.S. Appl. No. 17/188,481.

\* cited by examiner

TOUCH SENSOR AND DISPLAY DEVICE

CROSS-REFERENCE TO RELATED APPLICATIONS

This application is a Continuation of U.S. application Ser. No. 17/188,481, filed Mar. 1, 2021, which is a Continuation of U.S. application Ser. No. 16/401,080, filed May 1, 2019, which issued as U.S. Pat. No. 10,936,134, which Continuation of U.S. application Ser. No. 16/401,080, filed May 1, 2019, which issued as U.S. Pat. No. 10,936,134, which claims priority to and the benefit of Korean Patent Application No. 10-2018-0056977, filed May 18, 2018, each of which is hereby incorporated by reference for all purposes as if fully set forth herein.

BACKGROUND

Field

Exemplary embodiments generally relate to a touch sensor and a display device.

Discussion

A display device for displaying an image is typically used in various electronic appliances for providing an image to a user, such as smart phones, tablet personal computers (PCs), digital cameras, notebook computers, navigators, televisions, and the like. The display device may include a display panel for generating and displaying an image and various input devices. In at least the fields of smart phones and tablet PCs, a touch sensor for recognizing a touch input has been applied to a display device. The touch sensor may replace existing physical input devices, such as a keypad, joystick, etc., at least because of the convenience of touching and intuitive control. In addition to touch sensors, pressure sensors for detecting pressure intensity applied to the display device are growing in interest so as to utilize the pressure sensor as, for instance, a substitute for existing physical buttons.

The above information disclosed in this section is only for understanding the background of the inventive concepts, and, therefore, may contain information that does not form prior art.

SUMMARY

Some exemplary embodiments provide a touch sensor capable of sensing pressure.

Some exemplary embodiments provide a display device including a touch sensor capable of sensing pressure.

Additional aspects will be set forth in the detailed description which follows, and, in part, will be apparent from the disclosure, or may be learned by practice of the inventive concepts.

According to some exemplary embodiments, a touch sensor includes a base layer, a first electrode unit, second electrode units, and a first strain gauge. The first electrode unit includes first touch electrodes arranged on the base layer along a first direction and electrically connected to each other along the first direction. The second electrode units are spaced apart from one another along the first direction. Each of the second electrode units includes second touch electrodes arranged on the base layer along a second direction intersecting the first direction and electrically connected to each other along the second direction. Each of the second touch electrodes includes a first opening. The first strain gauge includes first resistance lines electrically connected to each other along the first direction. Each of the first resistance lines is disposed in a respective first opening disposed in a first row among the first openings.

According to some exemplary embodiments, a touch sensor includes a base layer, a first electrode unit, a first strain gauge, and a second electrode unit. The first electrode unit includes first touch electrodes arranged on the base layer along a first direction and electrically connected to each other along the first direction. Each of the first touch electrodes includes a first opening. The first strain gauge is disposed in a same first electrode row as the first electrode unit. The second electrode unit includes second touch electrodes arranged on the base layer along a second direction intersecting the first direction and electrically connected to each other along the second direction. The first strain gauge includes first resistance lines electrically connected to each other along the first direction. Each of the first resistance lines is disposed in a respective first opening among the first openings and is spaced apart from the first touch electrodes.

According to some exemplary embodiments, a display device includes a base substrate, a light emitting element, a thin film encapsulation layer, a touch electrode, and a strain gauge. The light emitting element is disposed on the base substrate. The thin film encapsulation layer is disposed on the light emitting element. The touch electrode is disposed on the thin film encapsulation layer. The touch electrode includes an opening. The strain gauge includes a resistance line and a connection line. The resistance line is disposed in the opening and in a same layer as the touch electrode. A resistance value of the resistance line is configured to change in response to a touch input. The connection line is connected to the resistance line. The connection line is disposed between the resistance line and the thin film encapsulation layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
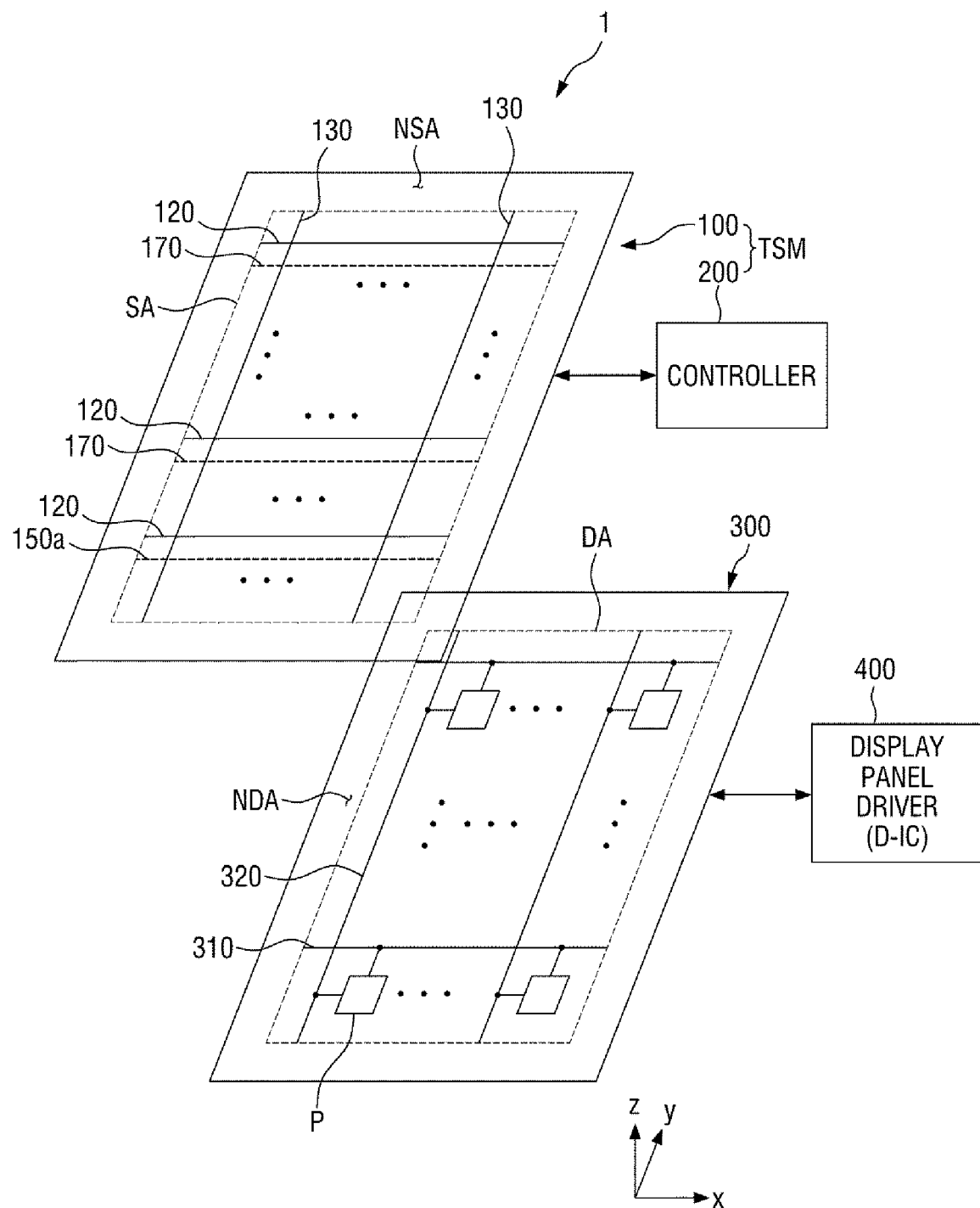
FIG. 1 is a schematic view showing a display device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. Further, the x-axis, the y-axis, and the z-axis are not limited to three axes of a rectangular coordinate system, and may be interpreted in a broader sense. For example, the x-axis, the y-axis, and the x-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be described with reference to the accompanying drawings.

Figure 2:
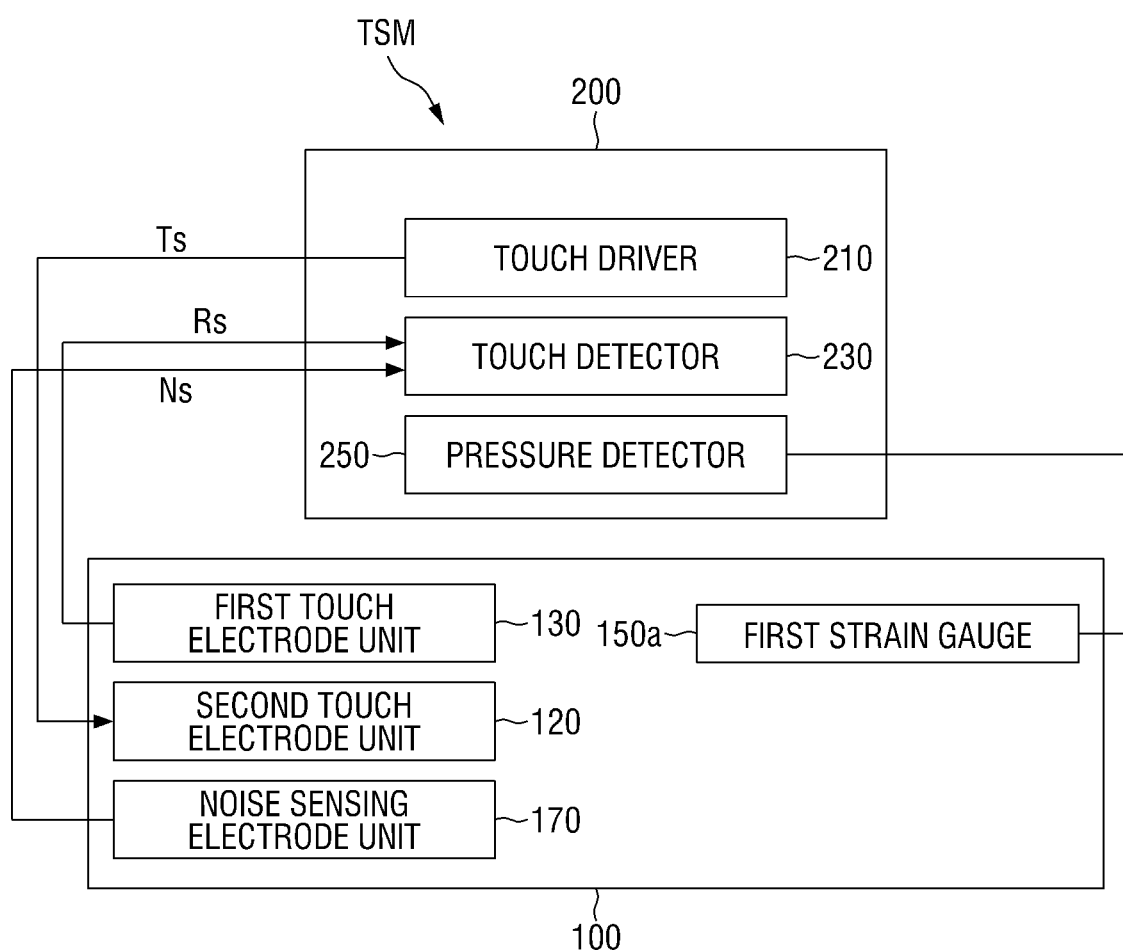
FIG. 2 is a block diagram of a touch sensor shown in FIG. 1 according to some exemplary embodiments.

FIG. 1 is a schematic view showing a display device according to some exemplary embodiments. FIG. 2 is a block diagram of a touch sensor shown in FIG. 1 according to some exemplary embodiments.

Referring to FIGS. 1 and 2, a display device 1 according to some exemplary embodiments includes a touch sensor TSM and a display panel 300, and may further include a display panel driver (or display driver) 400. The touch sensor TSM includes a sensor unit 100 and a controller 200.

Although it is shown in FIG. 1 that the sensor unit 100 and the display panel 300 are separate from each other, this is for convenience of explanation and exemplary embodiments are not limited thereto. For example, the sensor unit 100 and the display panel 300 may be integrated with each other.

The display panel 300 includes a display area DA and a non-display area NDA outside, e.g., surrounding at least a part of, the display area DA. The display area DA is provided with a plurality of scan lines 310, a plurality of data lines 320, and a plurality of pixels P connected to the plurality of scan lines 310 and the plurality of data lines 320. The non-display area NDA may be provided with various driving signals for driving the pixels P and/or wrings for supplying a driving power.

The kind of the display panel 300 is not particularly limited. For example, the display panel 300 may be a self-luminous display panel, such as an organic light emitting display panel (OLED panel), a quantum dot light emitting display panel (QLED panel), a micro light emitting diode display panel, a nano light emitting diode display panel, etc. The display panel 300 may additionally or alternatively be a non-luminous display panel, such as a liquid crystal display (LED) panel, an electrophoretic display panel (EPD panel), an electrowetting display panel (EWD panel), etc. When the display panel 300 is a non-luminous display panel, the display device may further include a backlight unit (not shown) for supplying light to the display panel 300. Hereinafter, for convenience of explanation, a case where the display panel 300 is an organic light emitting display panel will be described as an example.

The display panel driver 400 is electrically connected to the display panel 300 to supply signals for driving the display panel 300. For example, the display panel driver 400 may include at least one of a scan driver for supplying scan signals to the scan lines 310, a data driver for supplying data signals to the data lines 320, and a timing controller for driving the scan driver and the data driver. In some exemplary embodiments, the scan driver, the data driver, and/or the timing controller may be integrated in one display integrated circuit (IC) (D-IC), but exemplary embodiments are not limited thereto. For example, in some exemplary embodiments, at least one of the scan driver, the data driver, and the timing controller may be integrated or mounted on the display panel 300 or interface with the display panel 300 in any other suitable manner.

The sensor unit 100 may be provided on at least one region of the display panel 300. For example, the sensor unit 100 may be provided on at least one surface of the display panel 300 to overlap the display panel 300. For example, the sensor unit 100 may be disposed on one surface (e.g., an upper surface) of the display panel 300 in a direction in which an image is emitted (e.g., a third direction z), on both surfaces (e.g., an upper and a lower surface) of the display panel 300, or the like. Further, the sensor unit 100 may be directly formed on at least one of both surfaces of the display panel 300, or may be formed inside the display panel 300. For example, the sensor unit 100 may be directly formed on an outer surface of a lower substrate (or thin film encapsulation layer) or lower substrate of the display panel 300 (for example, an upper surface of an upper substrate or a lower surface of a lower substrate), or may be directly formed on an inner surface of a lower substrate or an upper substrate of the display panel 300 (for example, a lower surface of the upper substrate or an upper surface of the lower substrate).

The sensor unit 100 includes a sensing (or active) area SA capable of sensing a touch input and a peripheral area NSA outside, e.g., surrounding at least a part of, the sensing area SA. In some exemplary embodiments, the sensing area SA may be disposed to correspond to the display area DA of the display panel 300, and the peripheral area NSA may be disposed to correspond to the non-display area NDA of the display panel 300.

The sensing area SA of the sensor unit 100 may be provided with a plurality of first electrode units 120 for detecting a touch input and a plurality of second electrode units 130 for detecting a touch input.

The first electrode units 120 may extend along the first direction x, and may be spaced apart from each other along the second direction y intersecting the first direction x. That is, the first electrode units 120 extending in the first direction x may be spaced apart from each other along the second direction y to form electrode rows.

The second electrode units 130 may extend along the second direction y, and may be spaced apart from each other along the first direction x. The second electrode units 130 may be spaced apart from the first electrode units 120, and may be insulated from the first electrode units 120.

Figure 3:
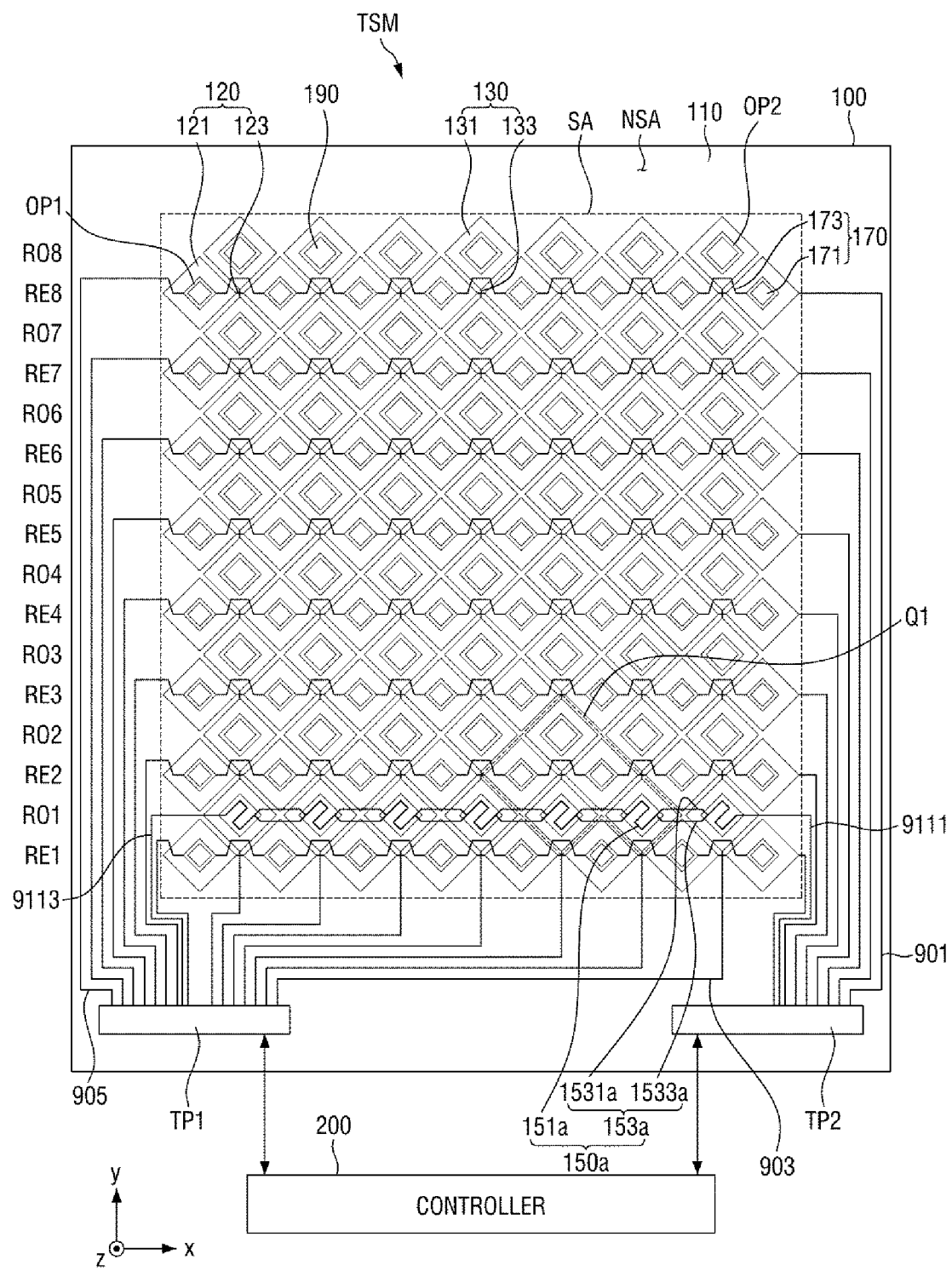
FIG. 3 is a plan view showing the touch sensor of FIG. 2 in which a sensor unit of the touch sensor is depicted and includes a connection relationship between the sensor unit and a controller according to some exemplary embodiments.

The shape, size, and/or alignment of the first electrode units 120 and the second electrode units 130 are not particularly limited. As a non-limiting example, the first electrode units 120 and the second electrode units 130 may be configured as shown in FIG. 3, which will be described later.

The first electrode units 120 and the second electrode units 130 may be electrically connected to the controller 200. In some exemplary embodiments, the second electrode unit 130 may be a driving electrode unit that receives a driving signal Ts for touch detection from the controller 200, and the first electrode unit 120 may be a sensing electrode unit that outputs a sensing signal Rs for touch detection to the controller 200.

The first electrode unit 120 and the second electrode unit 130 may overlap at least one electrode of the display panel 300. For example, when the display panel 300 is an organic light emitting display panel, the first electrode unit 120 and the second electrode unit 130 may overlap a cathode electrode of the display panel 300.

The sensing area SA of the sensor unit 100 may be provided with a first strain gauge 150a for detecting a touch input. When an external force is applied to the first strange gauge 150a, the length or sectional area of the first strain gauge 150a changes, and thus, the resistance thereof may change. The first strain gauge 150a may be spaced apart from the first electrode unit 120 and the second electrode unit 130, and may be insulated from the first electrode unit 120 and the second electrode unit 130. In some exemplary embodiments, like the first electrode unit 120, the first strain gauge 150a may extend along the first direction x.

The sensing area SA of the sensor unit 100 may be further provided with a noise sensing electrode unit 170 for sensing noises. The noise sensing electrode unit 170 may be electrically connected with the controller 200. For instance, the noise sensing electrode unit 170 may be electrically connected with a touch detector 230 to be described later. The noise sensing electrode unit 170 may sense noise generated from the sensor unit 100, and may provide an indication of the noise to the touch detector 230 as a noise sensing signal Ns.

The noise sensing electrode units 170 may extend along the first direction x, and may be spaced apart from each other along the second direction y intersecting the first direction x. In some exemplary embodiments, the noise sensing electrode unit 170 may be spaced apart from the first electrode unit 120, the second electrode unit 130, and the first strain gauge 150a.

The controller 200 may be electrically connected to the sensor unit 100 to supply a driving signal Ts to the sensor unit 100, and may receive a sensing signal Rs corresponding to the driving signal Ts from the sensor unit 100 to detect a touch position. In some exemplary embodiments, the controller 200 may include a touch driver 210, a touch detector 230, and a pressure detector 250.

The touch driver 210 may provide a driving signal Ts for detecting a touch input to the second electrode unit 130.

The touch detector 230 may receive a sensing signal Rs corresponding to the driving signal Ts from the first electrode unit 120 to detect the presence and/or position of the touch input. In some exemplary embodiments, the sensing signal Rs may be a change in mutual capacitance between the first electrode unit 120 and the second electrode unit 130; however, exemplary embodiments are not limited thereto. For example, when a touch input is generated, capacitance changes at a point where the touch input is provided or at a periphery thereof. The touch detector 230 may receive a change amount of mutual capacitance between the first electrode unit 120 and the second electrode unit 130 as a sensing signal Rs, and may detect the presence and/or position of the touch input using the change amount. Further, the touch detector 230 may receive a noise sensing signal Ns from the noise sensing electrode unit 170, and may remove or cancel the noise included in the sensing signal Rs using the noise sensing signal Ns.

Although not shown in FIGS. 1 to 3, in some exemplary embodiments, the touch detector 230 may include at least one amplifier for amplifying the received sensing signal Rs, an analog-digital converter connected to the output terminal of the amplifier, and a processor. It is noted, however, that further details will be described later with reference to FIG. 17.

The pressure detector 250 may be electrically connected to the first strain gauge 150a, and may detect a touch pressure on the basis of a change in resistance value of the first strain gauge 150a. In some exemplary embodiments, the pressure detector 250 may include a Wheatstone bridge circuit unit electrically connected to the first strain gauge 150a.

In some exemplary embodiments, the touch driver 210, the touch detector 230, and the pressure detector 250 may be integrated in one touch IC (T-IC); however, exemplary embodiments are not limited thereto.

Hereinafter, the touch sensor TSM will be described in more detail with reference to FIGS. 3 to 15.

Figure 4:
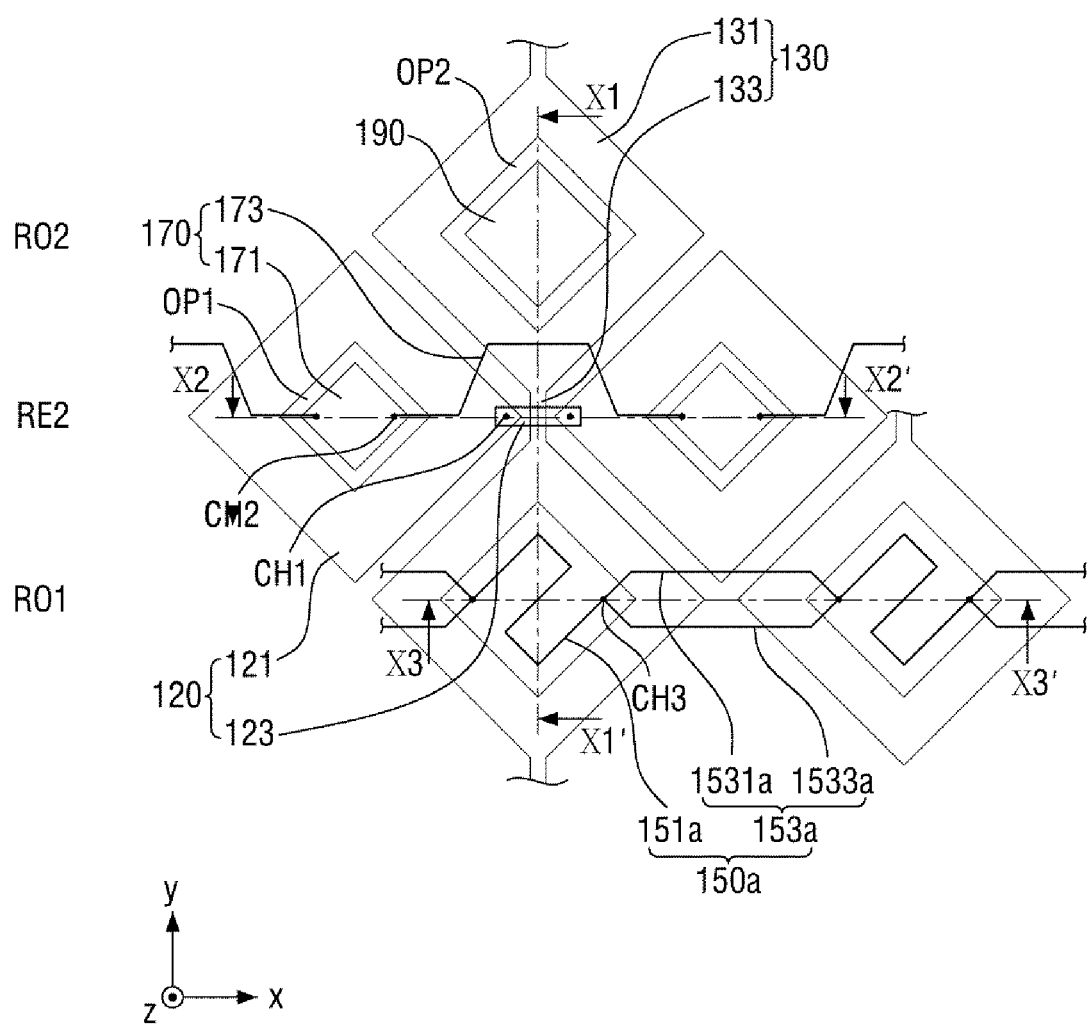
FIG. 4 is an enlarged plan view of portion Q1 of FIG. 3 according to some exemplary embodiments.
Figure 5:
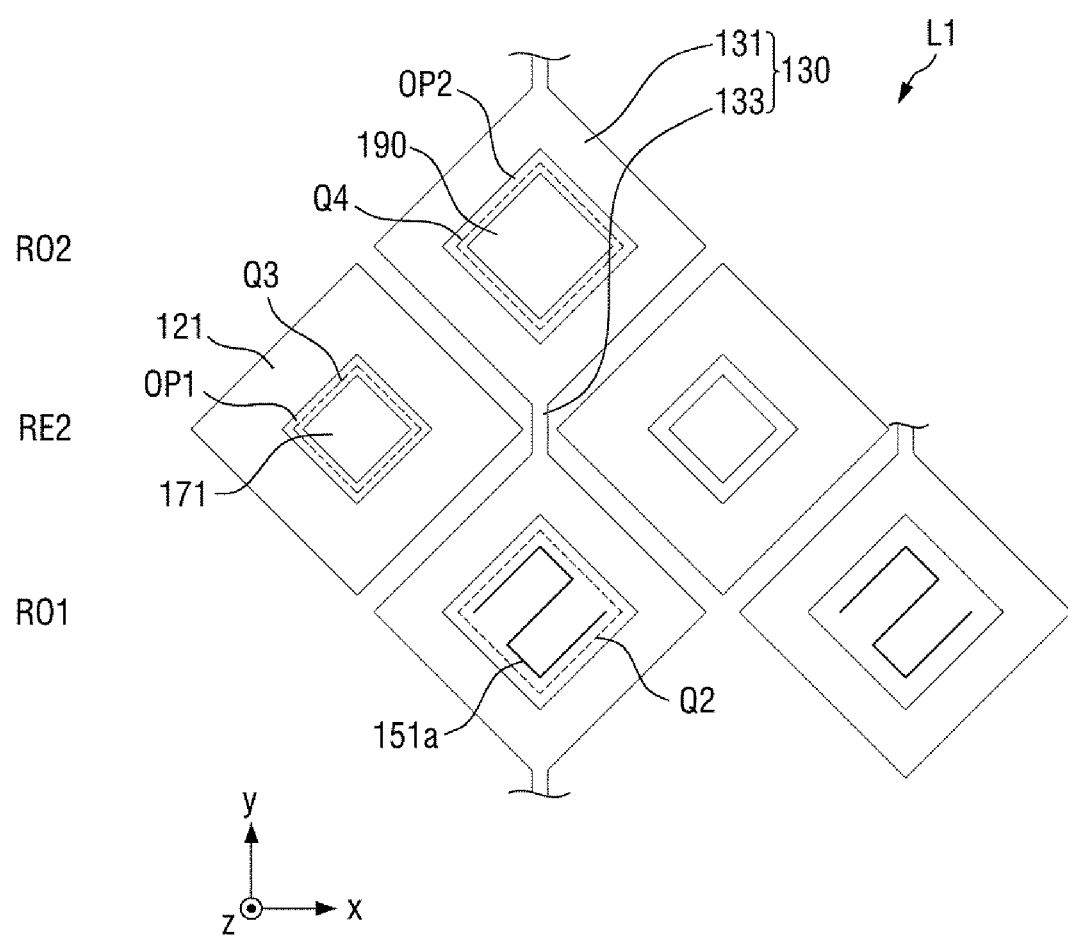
FIG. 5 is a view showing a structure of a first layer of the sensor unit shown in FIG. 4 according to some exemplary embodiments.
Figure 6:
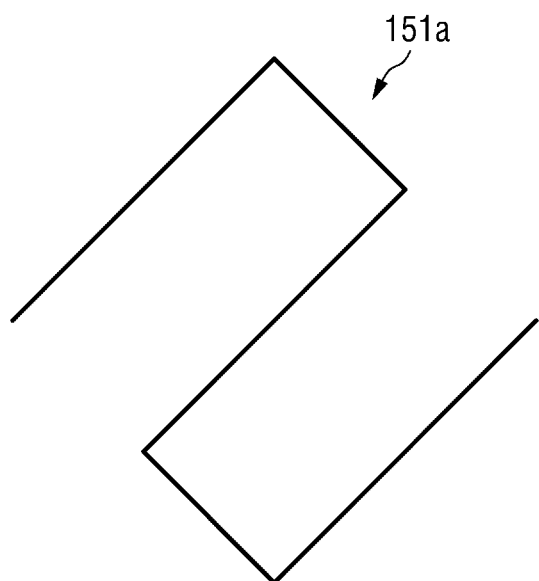
FIG. 6 is an enlarged plan view of portion Q2 of FIG. 5 according to some exemplary embodiments.
Figure 6:
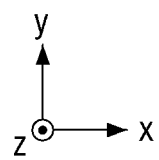
Figure 7:
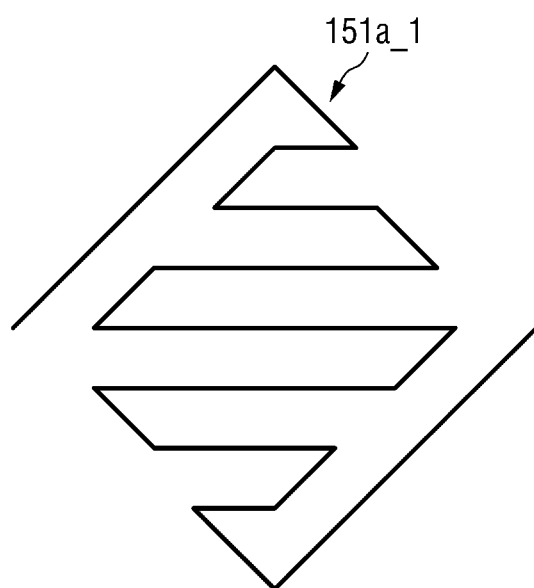
FIGS. 7 and 8 show modified examples of a resistance line shown in FIG. 6 according to some exemplary embodiments.
Figure 8:
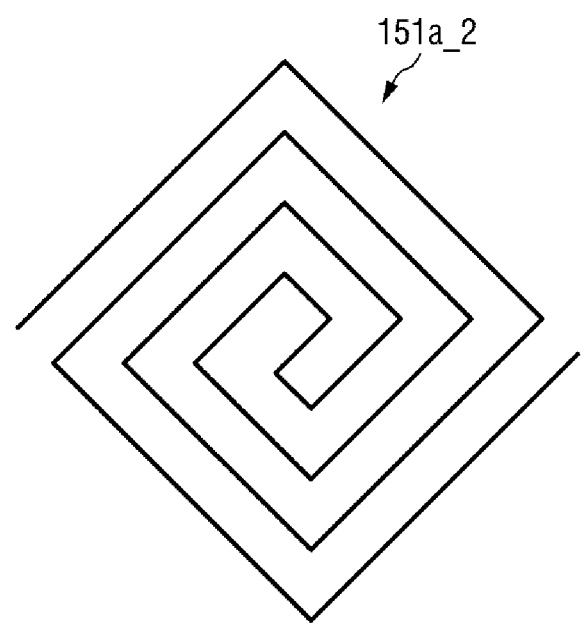
Figure 9:
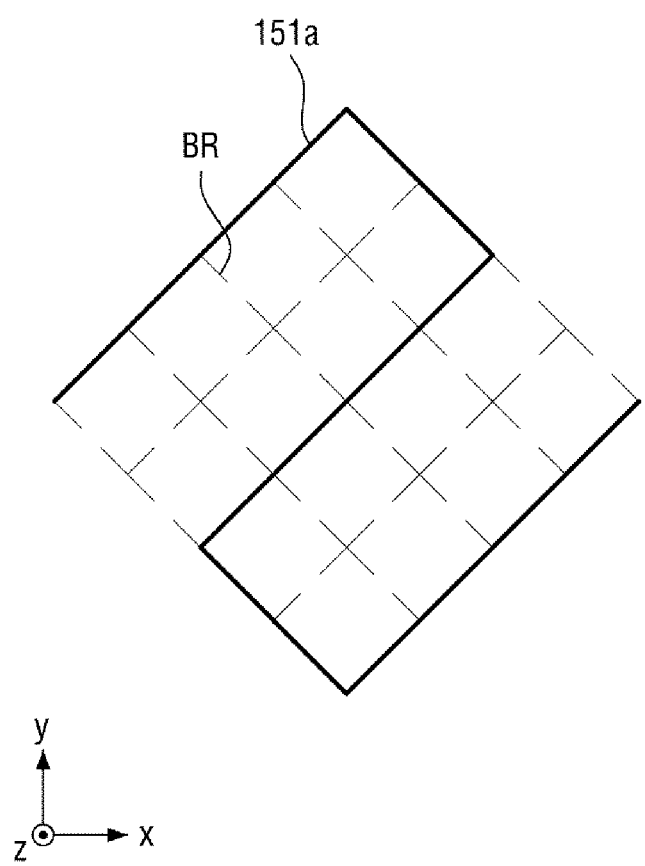
FIG. 9 shows a modified example of the structure shown in FIG. 6 according to some exemplary embodiments.
Figure 10:
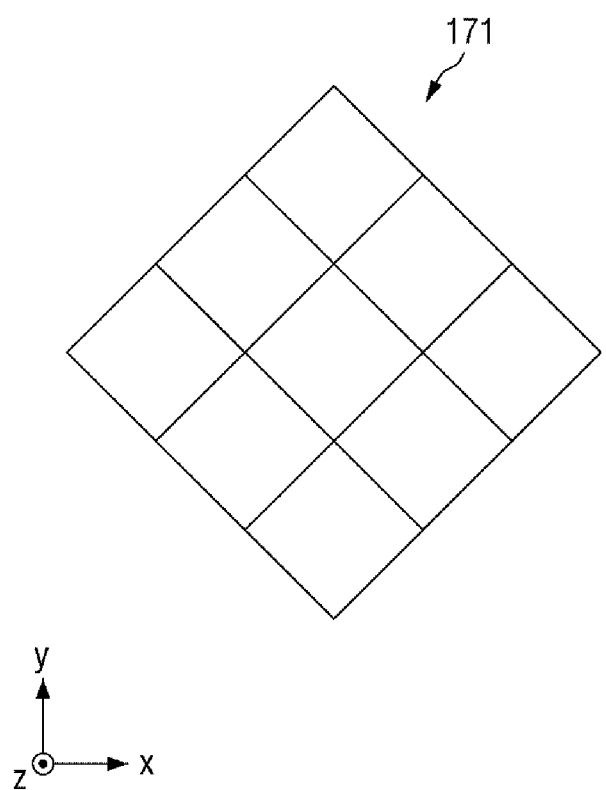
FIG. 10 is an enlarged plan view of portion Q3 of FIG. 6 according to some exemplary embodiments.
Figure 11:
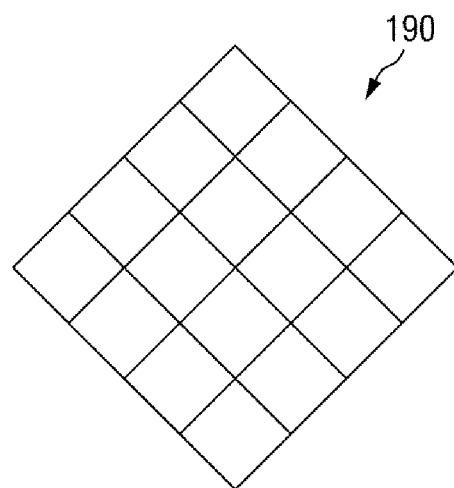
FIG. 11 is an enlarged plan view of portion Q4 of FIG. 6 according to some exemplary embodiments.
Figure 11:
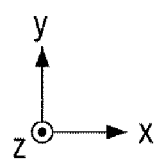
Figure 12:
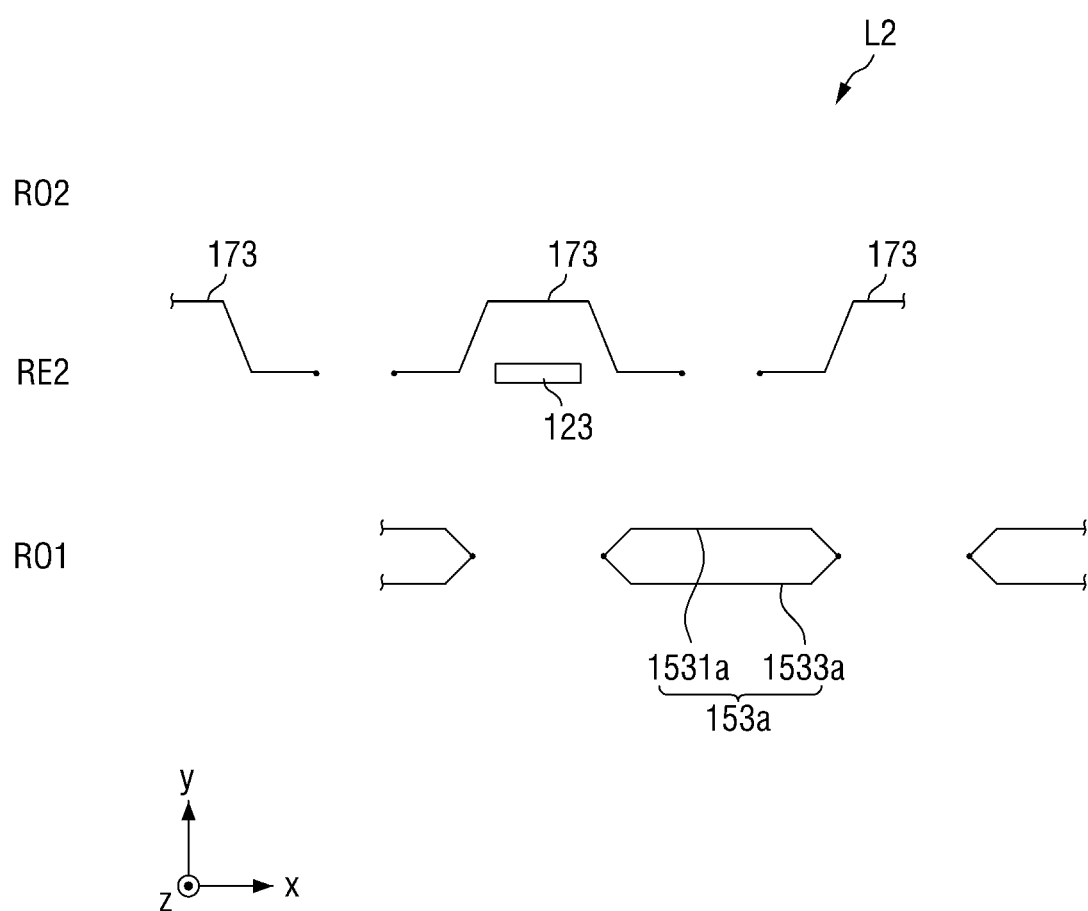
FIG. 12 is a view showing a structure of a second layer of the sensor unit shown in FIG. 4 according to some exemplary embodiments.
Figure 13:
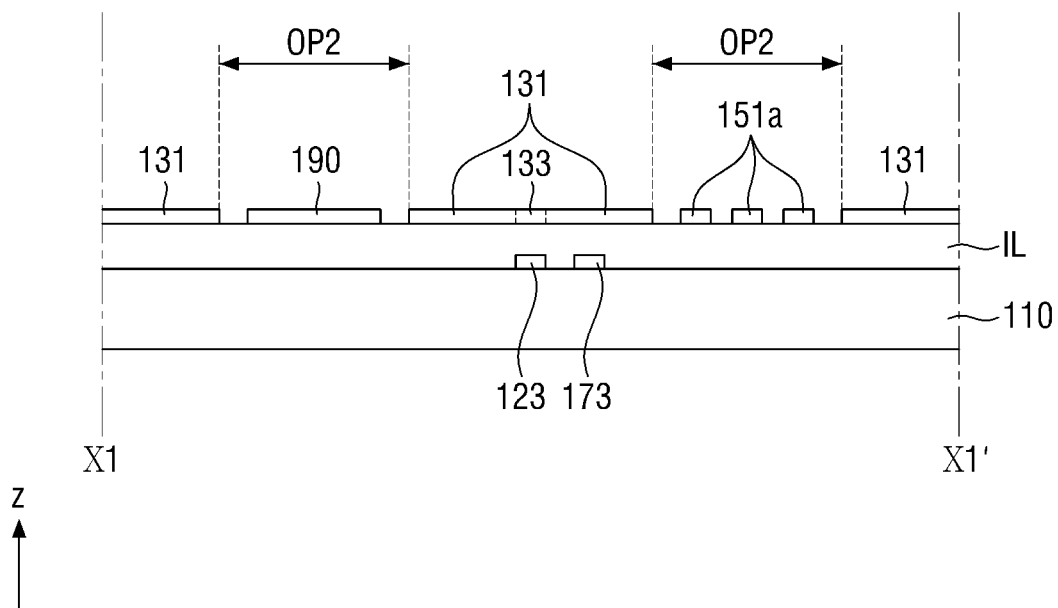
FIG. 13 is a cross-sectional view taken along sectional line X1-X1' in FIG. 4 according to some exemplary embodiments.
Figure 14:
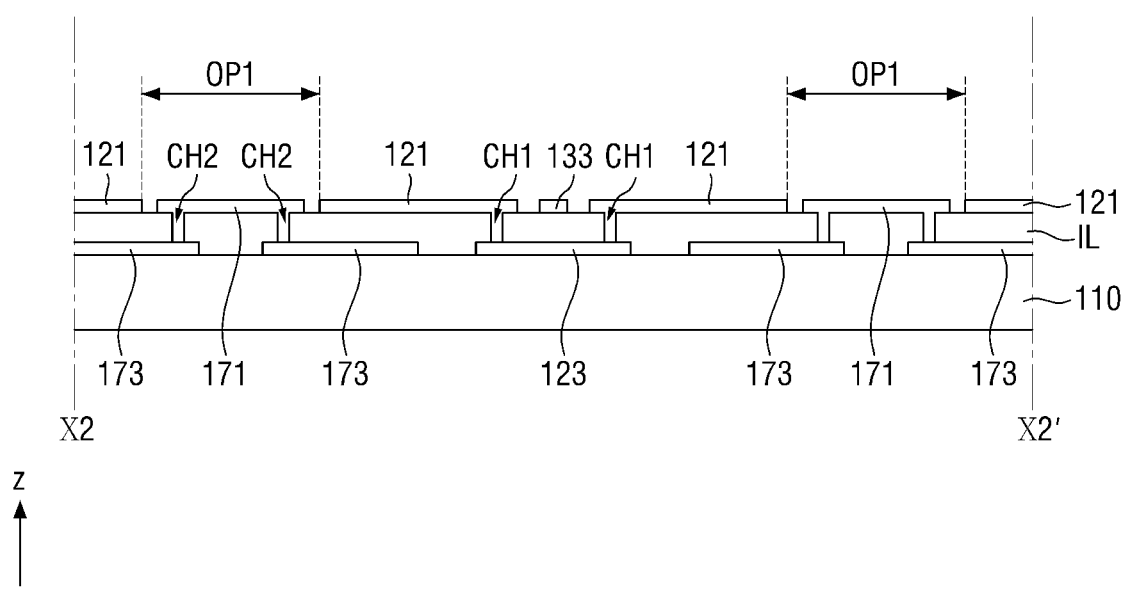
FIG. 14 is a cross-sectional view taken along sectional line X2-X2' in FIG. 4 according to some exemplary embodiments.
Figure 15:
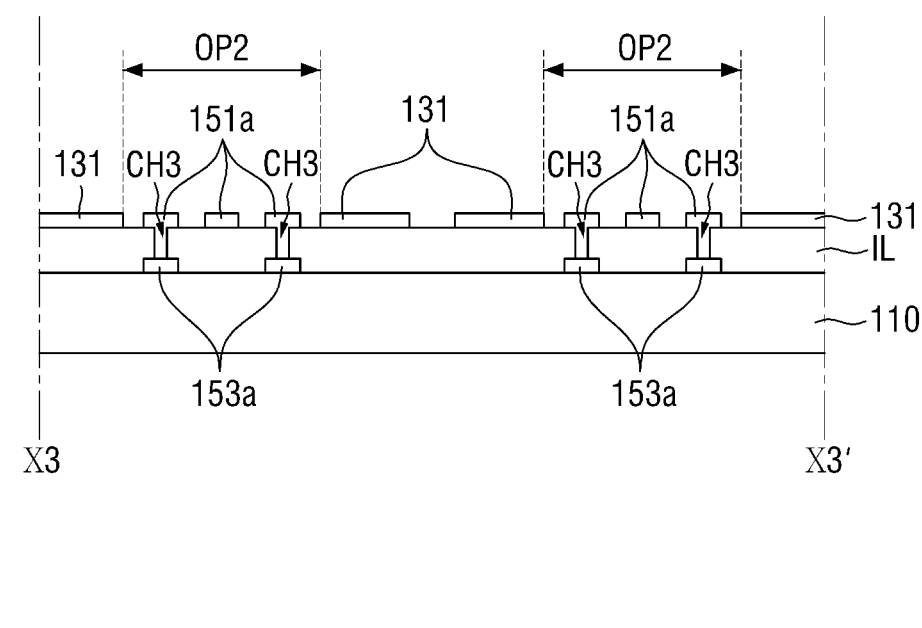
FIG. 15 is a cross-sectional view taken along sectional line X3-X3' in FIG. 4 according to some exemplary embodiments.

FIG. 3 is a plan view showing the touch sensor of FIG. 2 in which a sensor unit of the touch sensor is depicted and includes a connection relationship between the sensor unit and a controller according to some exemplary embodiments. FIG. 4 is an enlarged plan view of portion Q1 of FIG. 3 according to some exemplary embodiments. FIG. 5 is a view showing a structure of a first layer of the sensor unit shown in FIG. 4 according to some exemplary embodiments. FIG. 6 is an enlarged plan view of portion Q2 of FIG. 5 according to some exemplary embodiments. FIGS. 7 and 8 show modified examples of a resistance line shown in FIG. 6 according to some exemplary embodiments. FIG. 9 shows a modified example of the structure shown in FIG. 6 according to some exemplary embodiments. FIG. 10 is an enlarged plan view of portion Q3 of FIG. 6 according to some exemplary embodiments. FIG. 11 is an enlarged plan view of portion Q4 of FIG. 6 according to some exemplary embodiments. FIG. 12 is a view showing a structure of a second layer of the sensor unit shown in FIG. 4 according to some exemplary embodiments. FIG. 13 is a cross-sectional view taken along sectional line X1-X1' in FIG. 4 according to some exemplary embodiments. FIG. 14 is a cross-sectional view taken along sectional line X2-X2' in FIG. 4 according to some exemplary embodiments. FIG. 15 is a cross-sectional view taken along sectional line X3-X3' in FIG. 4 according to some exemplary embodiments.

Referring to FIGS. 3 to 15, the sensor unit includes a base layer 110, a first electrode unit 120, a second electrode unit 130, and a first strain gauge 150a, and may further include a noise sensing electrode unit 170. The sensor unit 100 may further include a dummy electrode 190.

The base layer 110 may include a sensing area SA and a peripheral area NSA. The base layer 110 is a layer serving as a base of the sensor unit 100. In some exemplary embodiments, the base layer 110 may be one of the layers constituting the display panel 300. For example, in an exemplary embodiment where the sensor unit 100 and the display panel 300 are integrated with each other, the base layer 110 may be at least one layer constituting the display panel 300. Illustratively, the base layer 110 may be a thin film encapsulation (TFE) layer of the display panel 300. In an exemplary embodiment, the base layer 110 may be a rigid substrate or a flexible substrate. For example, the base layer 110 may be a rigid substrate made of glass or reinforced glass, or may be a flexible substrate formed of a thin film made of, for instance, a flexible plastic material. Hereinafter, a case where the base layer 110 includes at least one layer constituting the display panel 300, for example, a thin film encapsulation layer will be described as an example.

The first electrode unit 120, the second electrode unit 130 insulated from the first electrode unit 120, and the first strain gauge 150a insulated from first electrode unit 120 and the second electrode unit 130 may be located on the sensing area SA of the base layer 110.

As described above, the first electrode units 120 may extend along the first direction x, and may be spaced apart from each other along the second direction y. The first electrode units 120 spaced apart from each other along the second direction y form electrode rows, respectively. Illustratively, it is shown in FIG. 3 that eight first electrode units 120 are arranged along the second direction y, and the respective first electrode units 120 sequentially constitute a first electrode row RE1, a second electrode row RE2, a third electrode row RE3, a fourth electrode row RE4, a fifth electrode row RE5, a sixth electrode row RE6, a seventh electrode row RE7, and an eighth electrode row RE8; however, exemplary embodiments are not limited thereto. For instance, the number of first electrode units 120 may be variously changed.

The first electrode unit 120 may include a plurality of first touch electrodes 121 arranged in the first direction x and a first connection portion 123 electrically connecting the adjacent first touch electrodes 121 to each other along the first direction x.

In the description of the following embodiments, the term "connection" may inclusively mean "physical and/or electrical connection."

In some exemplary embodiments, the first touch electrode 121 may be located on a first layer L1. The first touch electrode 121 may have a rhombus shape, but is not limited thereto. For instance, the shape of the first touch electrode 121 may be modified into various shapes, such as a triangle, a rectangle, a pentagon, a circle, a bar, etc.

The first touch electrode 121 may contain a conductive material. Illustratively, the conductive material may include a metal or an alloy thereof. Example of the metal may include gold (Au), silver (Ag), aluminum (Al), molybdenum (Mo), chromium (Cr), titanium (Ti), nickel (Ni), neodymium (Nd), copper (Cu), and platinum (Pt). Also, the first touch electrode 121 may be made of a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nanotubes, and graphene. In some exemplary embodiments, the first touch electrode 121 may be formed to have a mesh structure.

The first touch electrode 121 may include a first opening OP1. For example, the first touch electrode 121 may expose a layer located thereunder because at least a center portion thereof is opened. Illustratively, when an insulating layer IL is located under the first touch electrode 121, the insulating layer IL may be exposed by the first opening OP1.

The first connection portion 123 may electrically connect the adjacent first touch electrodes 121 to each other along the first direction x, and may be in contact with the first touch electrode 121. In some exemplary embodiments, the first connection portion 123 may be configured as a connection pattern in the form of a bridge. In some exemplary embodiments, the first connection portion 123 may be located on a second layer L2 different from the first layer L1 on which the first touch electrode 121 is located.

In some exemplary embodiments, the insulating layer IL may be disposed between the first touch electrode 121 and the first connection portion 123, and the first connection portion 123 and the first touch electrode 121 may be connected to each other through a first contact hole CH1 formed in the insulating layer IL.

In some exemplary embodiments, the first connection portion 123 located on a second layer L2 may be located on the base layer 110, the insulating layer IL may be located on the first connection portion 123, and the first touch electrode 121 located on the first layer L1 may be located on the insulating layer IL.

The first connection portion 123 may contain a conductive material. In some exemplary embodiments, the first connection portion 123 may contain the same material as the first touch electrode 121, or may include at least one selected from the aforementioned constituent materials of the first touch electrode 121.

Although it is shown in the drawings that one first connection portion is disposed between the first touch electrodes 121 adjacent to each other along the first direction x, the number of first connection portions 123 may be variously changed.

As described above, the second electrode units 130 may extend along the second direction y, and may be spaced apart from each other along the first direction x. The second electrode unit 130 may include a plurality of second touch electrodes 131 arranged in the second direction y and a second connection portion 133 electrically connecting the adjacent second touch electrodes 131 arranged in the second direction y.

The plurality of second touch electrodes 131 may be electrically connected to each other along the second direction y. The second touch electrodes 131 may be spaced apart from each other along the first direction x.

In some exemplary embodiments, the second touch electrodes 131 spaced apart from each other along the first direction y may form rows, respectively. Illustratively, it is shown in FIG. 3 that eight second touch electrodes 131 are arranged in one row, and the second touch electrodes 131 constitute a first row RO1, a second row RO2, a third row RO3, a fourth row RO4, a fifth row RO5, a sixth row RO6, a seventh row RO7, and an eighth row RO8; however, exemplary embodiments are not limited thereto. For instance, the number of second touch electrodes 131 may be variously changed.

According to some exemplary embodiments, any one row formed by the second touch electrodes 131 may be located between the two electrode rows formed by the first electrode units 120. Illustratively, the first row RO1 may be located between the first electrode row RE1 and the second electrode row RE2, and the second row RO2 may be located between the second electrode row RE2 and the third electrode row RE2. That is, the rows formed by the second touch electrodes 131 and the rows formed by the first electrode units 120 may be repeatedly arranged along the second direction y in an alternating fashion.

The second touch electrode 131 may include a second opening OP2. For example, the second touch electrode 131 may expose a layer located thereunder because at least a center portion thereof is opened. Illustratively, when an insulating layer IL is located under the second touch electrode 131, the insulating layer IL may be exposed by the second opening OP2.

In some exemplary embodiments, the area of the second opening OP2 may be different from the area of the first opening OP1. Illustratively, the area of the second opening OP2 may be larger than the area of the first opening OP1.

In some exemplary embodiments, the second touch electrode 131 may be located on the same first layer L1 as the first touch electrode 121. The second touch electrode 131 may have a rhombus shape, but exemplary embodiments are not limited thereto. For instance, the shape of the second touch electrode 131 may be modified into various shapes, such as a triangle, a rectangle, a pentagon, a circle, a bar, etc.

The second connection portion 133 may electrically connect the adjacent second touch electrodes 131 to each other along the second direction y, and may be in contact with the second touch electrode 131. In some exemplary embodiments, the second connection portion 133 may be located on the same first layer L1 as the first touch electrode 121 and the second touch electrode 131.

The second connection portion 133 may be insulated from the first connection portion 123, and may intersect the first connection portion 123. In some exemplary embodiments, an insulating layer IL may be disposed between the second connection portion 133 and the first connection portion 123.

The second touch electrode 131 and the second connection unit 133 may contain a conductive material. In some exemplary embodiments, the second touch electrode 131 and the second connection portion 133 may be made of the same conductive material as the first touch electrode 121; however, exemplary embodiments are not limited thereto. For instance, the first touch electrode 121 and the second touch electrode 131 may be made of different conductive materials.

In some exemplary embodiments, when the first touch electrode 121 has a mesh structure, the second touch electrode 131 and the second connection portion 133 may have a mesh structure like the first touch electrode 121.

In some exemplary embodiments, the second touch electrode 131 may be a driving electrode receiving a driving signal Ts for detecting a touch position, and the first touch electrode 121 may be a sensing electrode for outputting a sensing signal Rs for sensing a touch position.

The first strain gauge 150a may be located in a row formed by the second touch electrodes 131. Illustratively, the first strain gauge 150a may be located in the first row RO1.

The first strain gauge 150a may include a first resistance line 151a and a first connection line 153a.

The first resistance line 151a may be located in the second opening OP2 formed in the second touch electrode 131 in the first row RO1, and may be spaced apart from the second touch electrode 131. The first resistance line 151a may be bent to have a predetermined pattern. When a pressure having a predetermined intensity is applied to the sensor unit 100 of the touch sensor TSM, the length or sectional area of the first resistance line 151a is changed. When the length or sectional area of the first resistance line 151a is changed, the resistance value is changed, and the intensity of touch pressure may be determined based on the changed resistance value.

In some exemplary embodiments, such as shown in FIG. 6, the first resistance line 151a may have a shape including two or more bent portions and a portion extending in a direction intersecting the first direction x and the second direction y. In addition, the shape of the first resistance line 151a may be variously changed. Illustratively, as shown in FIG. 7, the first resistance line 151a_1 may include a plurality of bent portions and a portion extending in parallel with the first direction x. Further, as shown in FIG. 8, the first resistance line 151a_2 may have an angular spiral shape, and unlike that shown in FIG. 8, the first resistance line 151a_2 may have a curved spiral shape. For descriptive convenience, the first resistance line 151a will, hereinafter, be described in association with FIG. 6, unless stated otherwise.

In some exemplary embodiments, the first resistance line 151a may be located on the same first layer L1 as the first and second touch electrodes 121 and 131. The first resistance line 151a may contain a conductive material. In some exemplary embodiments, the first resistance line 151a may be made of the same material as the first and second touch electrodes 121 and 131; however, exemplary embodiments are not limited thereto.

When the first touch electrode 121 and the second touch electrode 131 have a mesh structure, the first resistance line 151a may be formed by removing a part of the mesh structure. When the first resistance line 151a is formed by removing a part of the mesh structure, in some exemplary embodiments, as shown in FIG. 9, a plurality of branch portions BR connected to the first resistance line 151a and spaced apart from each other may further be disposed in the second opening OP2.

The branch portions BR may be remnants after removing a part of the mesh structure. The branch portions BR may be spaced apart from the second touch electrode 131, may be located on the same first layer L1 as the first resistance line 151a, and may be made of the same material as the first resistance line 151a.

The first connection line 153a may electrically connect adjacent first resistance lines 151a along the first direction x, and may be in contact with the first resistance line 151a. The first connection line 153a may be spaced apart from the first electrode unit 120 and the second electrode unit 130 without being in contact with the first electrode unit 120 and the second electrode unit 130. In some exemplary embodiments, the first connection line 153a may be located on the same second layer L2 as the first connection portion 123a, and may be made of the same material as the first connection portion 123a.

In some exemplary embodiments, an insulating layer IL may be located between the first resistance line 151a and the first connection line 153a, and the first resistance line 151a and the first connection line 153a may be in contact with each other through a third contact hole CH3 formed in the insulating layer IL.

In some exemplary embodiments, the first connection line 153a may include a first sub connection line 1531a and a second sub connection line 1533a. The first resistance line 151a may be in contact with the first sub connection line 1531a and the second sub connection line 1533a through the third contact hole CH3. Meanwhile, in some exemplary embodiments, the first connection line 153a may include three or more sub connection lines. Since pressure is applied to the first strain gauge 150a by a touch, in some cases, there is a possibility that disconnection of the first connection line 153a occurs. However, according to various exemplary embodiments, since the first connection line 153a may include a plurality of sub resistance lines, connection reliability between the first resistance lines 151a can be improved.

The dummy electrode 190 may be disposed in the second opening OP2 of the second touch electrode 131 in a row other than a row including the first strain gauge 150a. As an example, FIG. 3 shows a case where the dummy electrodes 190 are disposed in the second openings OP2 located in the second row RO2, the third row RO3, the fourth row RO4, the fifth row RO5, the sixth row RO6, the seventh row RO7, and the eighth row RO8. The second opening OP2 may be formed in the second touch electrode 131 so that a difference in the reflectance of external light may occur. Accordingly, pattern unevenness may be visually recognized from the outside. The dummy electrode 190 reduces the difference in the reflectance of external light so as to reduce the possibility that the pattern unevenness is visually recognized from the outside.

In some exemplary embodiments, the dummy electrode 190 may have the same shape as the second opening OP2. Illustratively, when the second opening OP2 has a rhombus shape, the dummy electrode 190 may also have a rhombus shape.

The dummy electrode 190 may be disposed in the second opening OP2 and spaced apart from the second touch electrode 131. That is, the dummy electrode 190 may be a floating electrode having an island shape.

The dummy electrode 190 may be disposed on the same first layer L1 as the first touch electrode 121, the second touch electrode 131, and the first resistance line 151a, and may be made of the same material as the first touch electrode 121, the second touch electrode 131, and the first resistance line 151a. Exemplary embodiments, however, are not limited thereto.

In some exemplary embodiments, when the second touch electrode 131 has a mesh structure, the dummy electrode 190 may also have a mesh structure, as shown in FIG. 11.

The noise sensing electrode unit 170 may be located in an electrode row formed by the first touch electrodes 121. Illustratively, the noise sensing electrode units 170 may be located in a first electrode row RE1, a second electrode row RE2, a third electrode row RE3, a fourth electrode row RE4, a fifth electrode row RE5, a sixth electrode row RE6, a seventh electrode row RE7, and an eighth electrode row RE8, and may be spaced from each other along the second direction y.

The noise sensing electrode unit 170 may include a noise sensing electrode 171 and a third connection portion 173.

The noise sensing electrode 171 may be disposed in the first opening OP1 of the first touch electrode 121, and may be spaced apart from the first touch electrode 121. In some exemplary embodiments, the noise sensing electrode 171 may be disposed on the same first layer L1 as the first touch electrode 121 and the first resistance line 151a, and may be made of the same material as the first touch electrode 121 and the first resistance line 151a. Exemplary embodiments, however, are not limited thereto.

In some exemplary embodiments, when the first touch electrode 121 has a mesh structure, the noise sensing electrode 171 may also have a mesh structure, as shown in FIG. 10.

The third connection portion 173 may electrically connect adjacent noise sensing electrodes 171 along the first direction x among the noise sensing electrodes 171 located on the same row. In some exemplary embodiments, the third connection portion 173 may be disposed on the same second layer L2 as the first connection line 153a, and may be made of the same material as the first connection line 153a; however, exemplary embodiments are not limited thereto.

In some exemplary embodiments, the noise sensing electrode 171 and the third connection portion 173 may be connected to each other through a second contact hole CH2 formed in the insulating layer IL. The third connection portion 173 may be spaced apart from the first electrode part 120, the second electrode part 130, and the first strain gauge 150a.

In some exemplary embodiments, wirings 901, 903, and 905, and signal lines 9111 and 9113 may be disposed on the peripheral area NSA of the base layer 110.

Illustratively, the wirings 901, 903 and 905 may include a first wiring 901 connected to the first electrode unit 120, a second wiring 903 connected to the second electrode unit 130, and a third wiring 905 connected to the noise sensing electrode unit 170.

In some exemplary embodiments, as shown in FIG. 3, the second wiring 903 may be connected to one end of the second electrode unit 130, and a separate wiring may not be connected to the other end of the second electrode unit 130. That is, in some exemplary embodiments, the wiring connected to the second electrode unit 130 may have a single routing structure, but exemplary embodiments are not limited thereto.

Figure 57:
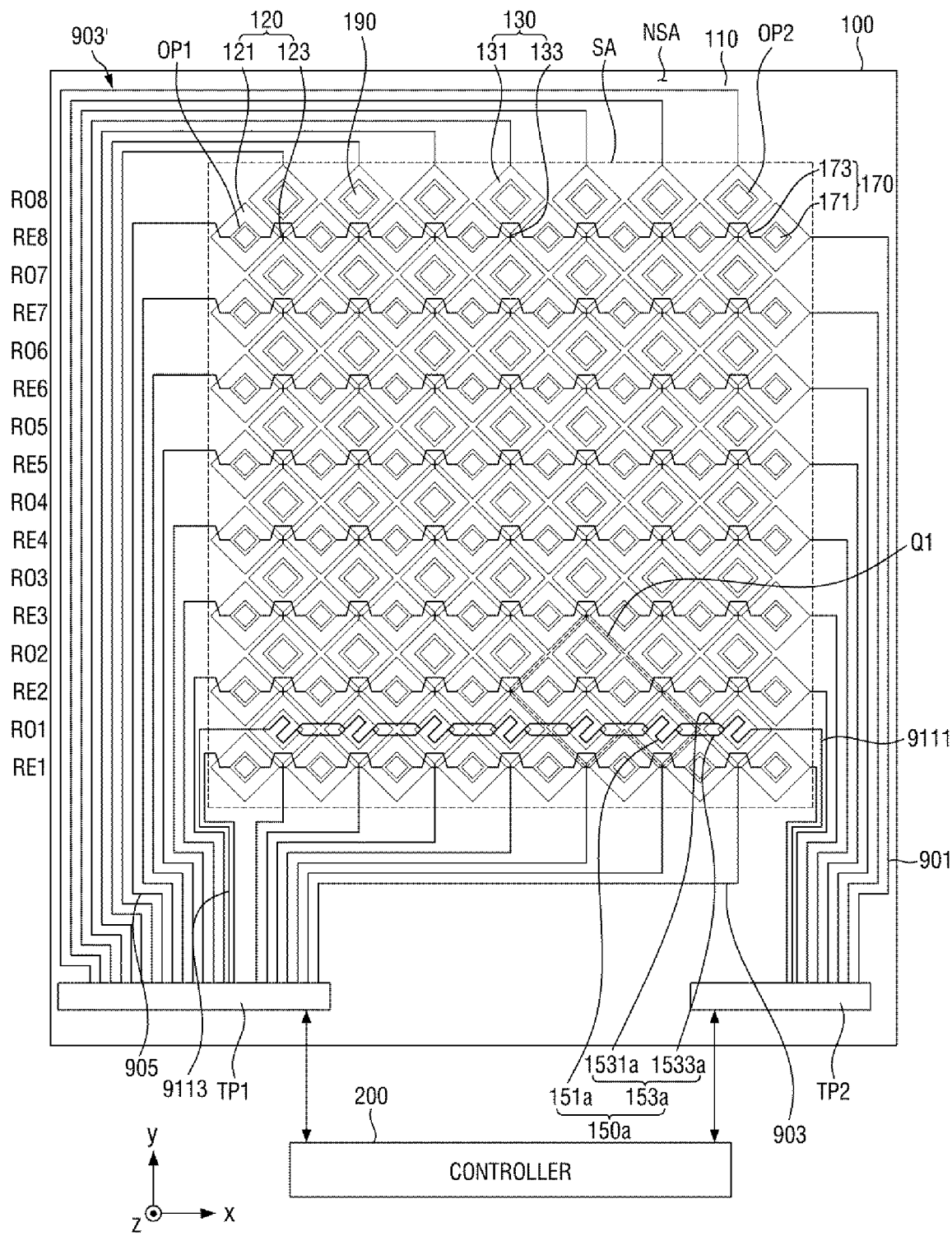
FIG. 57 is a plan view illustrating a structure in which a fourth wiring is additionally provided in the structure shown in FIG. 3 according to some exemplary embodiments.

FIG. 57 is a plan view illustrating a structure in which a fourth wiring is additionally provided in the structure shown in FIG. 3 according to some exemplary embodiments. Referring to FIG. 57 in addition to FIGS. 3 to 15, a separate fourth wiring 903' may be further provided. The second wiring 903 may be connected to one end of the second electrode unit 130 and the fourth wiring 903' may be further connected to the other end of the second electrode unit 130. That is, the wiring connected to the second electrode unit 130 may have a double routing structure, thereby improving resistance-capacitance (RC) delay caused by the resistance or the like of the second electrode unit 130. In the following exemplary embodiments, for convenience of explanation, only one end of the second electrode unit 130 is shown connected to the wiring (e.g., the second wiring 903), but the wiring connected to the second electrode unit 130 may be implemented as a double routing structure, as seen in FIG. 57.

The signal lines 9111 and 9113 may include a first signal line 9111 connected to one end of the first strain gauge 150a and a second signal line 9113 connected to the other end of the first strain gauge 150a. In some exemplary embodiments, the first signal line 9111 may be located between two adjacent first wirings 901 along the first direction x. Also, in some exemplary embodiments, the second signal line 9113 may be located between adjacent third wires 905 along the first direction x.

Pad portions TP1 and TP2 may be disposed on the peripheral area NSA of the base layer 110. The pad portions TP1 and TP2 may be connected to the wirings 901, 903 and 905 and the signal lines 9111 and 9113. The controller 200 may be electrically connected with the pad portions TP1 and TP2.

In some exemplary embodiments, the pad portions TP1 and TP2 may include a first pad portion TP1 and a second pad portion TP2 that are spaced apart from each other along the first direction x. Illustratively, the first pad portion TP1 may be connected to the second wiring 903, the third wiring 905, and the second signal line 9113, and the second pad portion TP2 may be connected to the first wiring 901 and the first signal line 9111. However, exemplary embodiments are not limited thereto. For example, the first pad portion TP1 and the second pad portion TP2 may be formed into one pad portion without being spaced apart from each other. The wirings 901, 903, and 905 and signal lines 9111 and 9113 connected to the first pad portion TP1 and the second pad portion TP2 may be variously changed.

In the touch sensor TSM, since the first touch electrode 121, the second touch electrode 131, and the first resistance line 151a are located on the same first layer L1, there are advantages that the first touch electrode 121, the second touch electrode 131, and the first resistance line 151a can be formed at the same time, thereby simplifying a manufacturing process. Further, since the first touch electrode 121, the second touch electrode 131, and the first resistance line 151a are disposed on the same first layer L1, there is an advantage that the touch sensor TSM can be implemented as a thin film type touch sensor while having a function of pressure sensing.

Further, since the touch sensor TSM includes the noise sensing electrode unit 170, malfunction of the touch sensor TSM can be minimized, and the sensing sensitivity thereof can be improved. In addition, since the noise sensing electrode 171 is disposed on the first layer L1, there are advantages that the manufacturing process of the touch sensor TSM is simplified, and the touch sensor TSM can be implemented as a thin film type touch sensor while having a function of pressure sensing.

In some exemplary embodiments, the structure of the touch sensor TSM, such as the position of the first resistance line 151a, may be changed.

Figure 58:
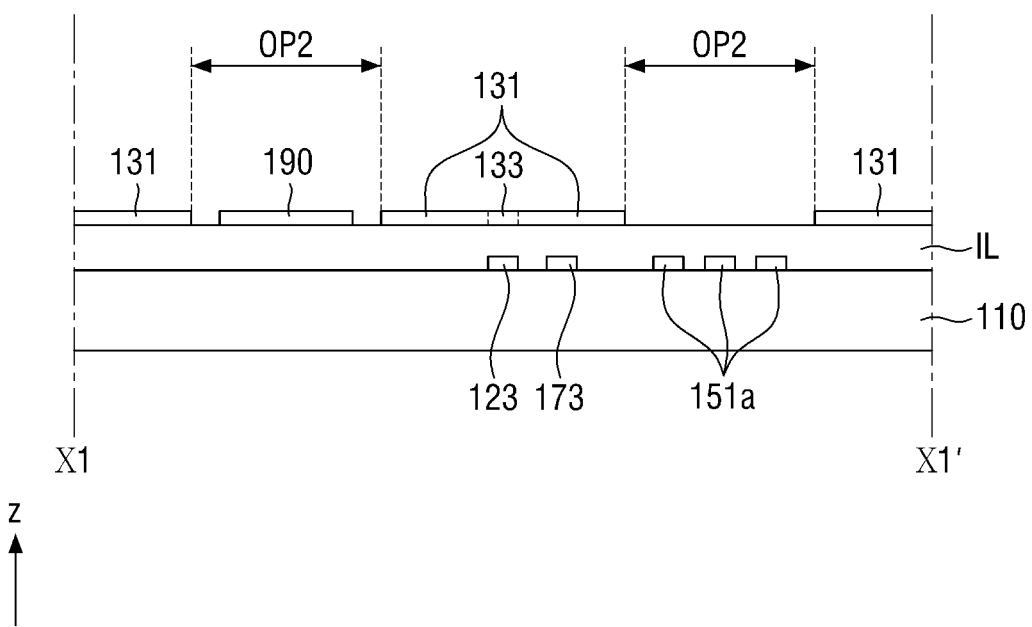
FIG. 58 is a cross-sectional view showing a modified structure of FIG. 13 according to some exemplary embodiments.
Figure 59:
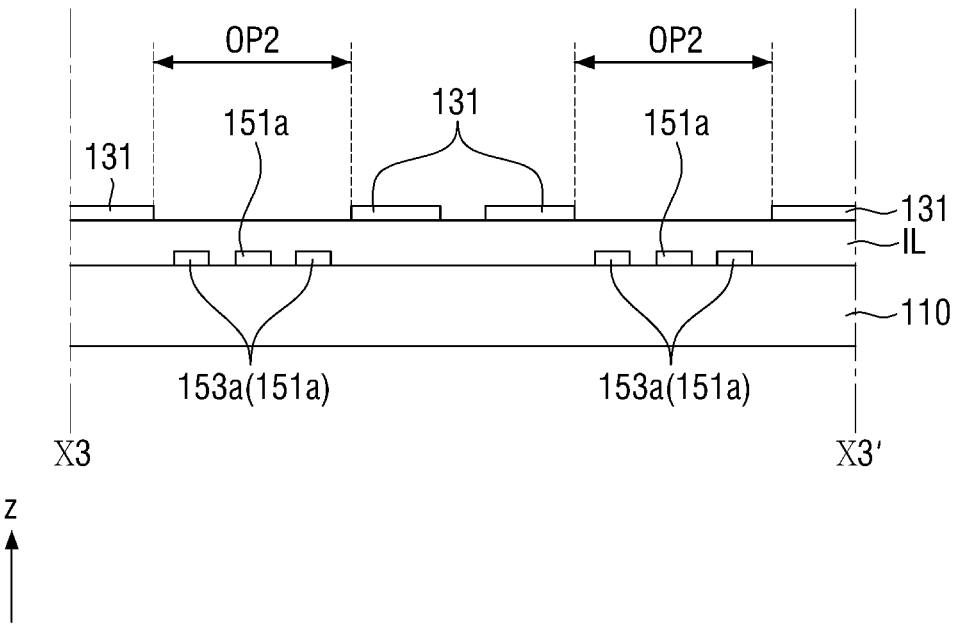
FIG. 59 is a cross-sectional view showing a modified structure of FIG. 15 according to some exemplary embodiments.

FIG. 58 is a cross-sectional view showing a modified structure of FIG. 13 according to some exemplary embodiments. FIG. 59 is a cross-sectional view showing a modified structure of FIG. 15 according to some exemplary embodiments.

Referring to FIGS. 58 and 59 in addition to FIGS. 3 to 15, in some exemplary embodiments, the first resistance line 151a may be disposed on a different layer from the second touch electrode 131. Illustratively, the first resistance line 151a may be disposed on the same second layer L2 as the first connection line 153a and the first connection portion 123. Hereinafter, a case where the first resistance line 151a is disposed on the first layer L1 will be described as an example, but the first resistance line 151a may also be disposed on the second layer L2 depending on some exemplary embodiments.

Meanwhile, depending on some exemplary embodiments, the base layer 110 serving as a base of the sensor unit 100 may be a thin-film encapsulation layer of the organic light emitting display panel, e.g., of display panel 300. In this case, the base layer 110 may be implemented as a multilayer including at least one organic layer and at least one inorganic layer, or may be implemented as a single layer including a combination of organic and inorganic materials. For example, the base layer 110 may be configured as a multilayer including at least two inorganic layers and at least one organic layer between the at least two inorganic layers. In another example, in a display device in which the base layer 110 is implemented as a thin-film encapsulation layer of the organic light emitting display panel, electrodes constituting the sensor unit 100 and components constituting the display panel 300 may be arranged on different surfaces of the base layer 110, respectively.

Figure 16:
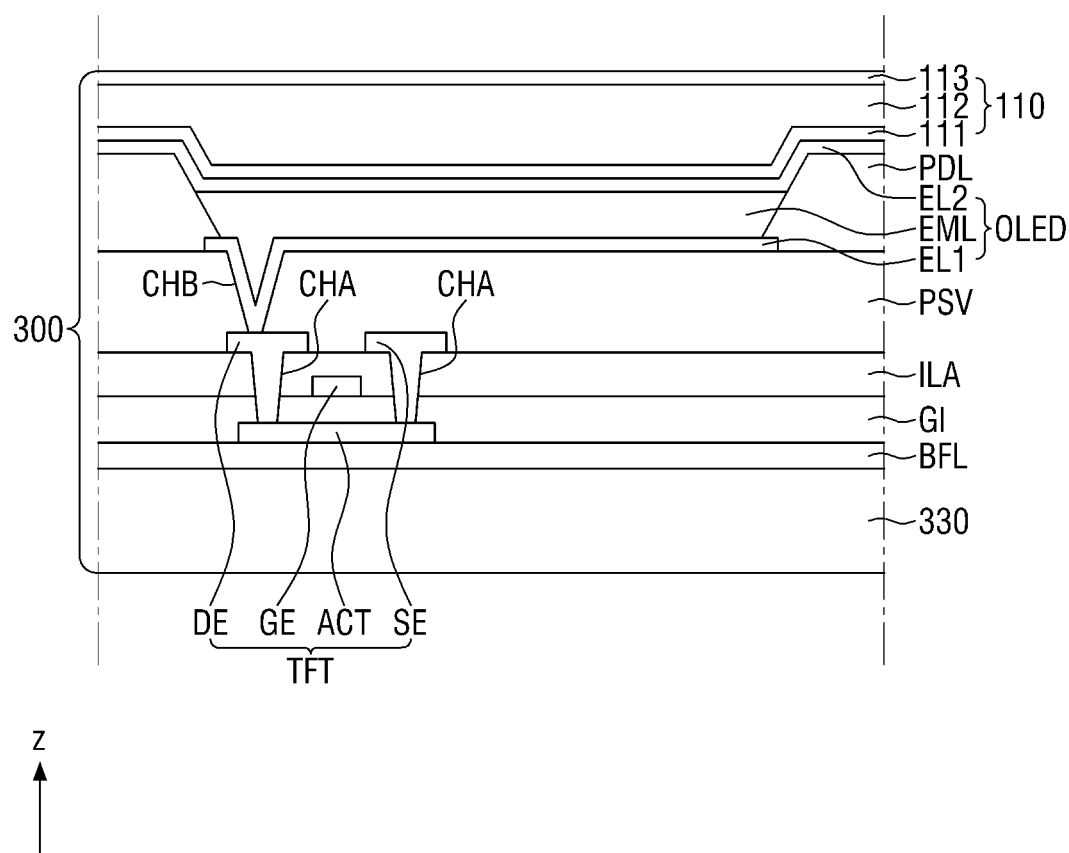
FIG. 16 shows a cross-sectional view of a display panel of a display device according to some exemplary embodiments.

FIG. 16 shows a cross-sectional view of a display panel of a display device according to some exemplary embodiments.

Referring to FIG. 16, the sensor unit 100 may include an encapsulation layer of a display panel 300 (e.g., an organic light emitting display panel 300) as the base layer 110. That is, the display panel 300 and the sensor unit 100 may be integrated with each other. Hereinafter, the same reference numerals are given to the base layer 110 and the thin film encapsulation layer. For convenience of explanation, FIG. 16 shows a light emitting element (for example, an organic light emitting diode) OLED and one thin film transistor TFT connected thereto, among components forming a pixel region.

The display panel 300 includes a base substrate 330, a light emitting element OLED provided on one surface of the base substrate 330, and a thin film encapsulation layer 110 provided on the light emitting element OLED and at least covering the light emitting element OLED. In some exemplary embodiments, the display panel 300 may further include at least one thin film transistor TFT connected to the light emitting element OLED. The thin film transistor TFT may be disposed between the base substrate 330 and the light emitting element OLED. In addition, the display panel 300 may further include at least one power supply line, a signal line, and/or a capacitor, which are not shown.

According to some exemplary embodiments, the base substrate 330 may be a rigid substrate or a flexible substrate, and the material thereof is not particularly limited. For example, the base substrate 330 may be a thin film substrate having flexible characteristics.

A buffer layer BFL is provided on one surface of the base substrate 330. The buffer layer BFL can prevent impurities from diffusing from the base substrate 330 and can improve the flatness of the base substrate 330. The buffer layer BFL may be provided as a single layer, but may also be provided as at least two or more layers. The buffer layer BFL may be an inorganic insulating film made of an inorganic material. For example, the buffer layer BFL may be formed of silicon nitride, silicon oxide, silicon oxynitride, and/or the like.

The thin film transistor TFT is provided on the buffer layer BFL. The thin film transistor TFT includes an active layer ACT, a gate electrode GE, a source electrode SE, and a drain electrode DE. The active layer ACT is provided on the buffer layer BFL, and may be formed of a semiconductor material. For example, the active layer ACT may be a semiconductor pattern made of polysilicon, amorphous silicon, oxide semiconductor, or the like. One region (for example, a region overlapping the gate electrode) of the active layer ACT may not be doped with impurities, and a remaining region thereof may be doped with impurities.

A gate insulating film GI may be provided on the active layer ACT, and the gate electrode GE may be provided on the gate insulating film GI. An interlayer insulating film ILA may be provided on the gate electrode GE, and the source electrode SE and the drain electrode DE may be provided on the interlayer insulating film ILA. The source electrode SE and the drain electrode DE may be in contact with the active layer ACT through respective contact holes CHA passing through the gate insulating film GI and the interlayer insulating film ILA, and may be electrically connected to the active layer ACT through these contact holes CHA.

A passivation layer PSV is provided on the source electrode SE and the drain electrode DE. The passivation layer PSV may cover the thin film transistor TFT.

The light emitting element OLED is provided on the passivation layer PSV. The light emitting element OLED may include a first electrode EL1, a second electrode EL2, and a light emitting layer EML interposed between the first electrode EL1 and the second electrode EL2. The first electrode EL1 of the light emitting element OLED may be an anode electrode, but is not limited thereto. The first electrode EL1 of the light emitting element OLED may be in contact with one electrode of the thin film transistor TFT, for example, the drain electrode DE through a contact hole CHB passing through the passivation layer PSV, and may be electrically connected thereto through the contact hole CHB.

A pixel defining layer PDL for partitioning each pixel region (or a light emitting region of each pixel) is provided over one surface of the base substrate 330 over which the first electrode EL1 of the light emitting device OLED is formed. The pixel defining layer PDL may expose a portion of the upper surface of the first electrode EL1, and may protrude from the base substrate 330 along the periphery of each pixel region.

The light emitting layer EML is provided in the pixel region surrounded by the pixel defining layer PDL. For example, the light emitting layer EML may be disposed on the exposed surface of the first electrode EL1. In some exemplary embodiments, the light emitting layer EML may have a multilayer thin film structure including at least a light generation layer. For example, and though not shown, the light emitting layer EML may include one or more of a hole injection layer (HIL), a hole transport layer (HTL), a light generating layer, a hole blocking layer (HBL), an electron transport layer (ETL), and an electron injection layer (EIL).

In some exemplary embodiments, a color of light emitted from the light emitting layer EML may be one of red, green, and blue, but is not limited thereto. For example, the color of light emitted from the light emitting layer EML may be one of magenta, cyan, yellow, and white.

The second electrode EL2 of the light emitting element OLED may be disposed on the light emitting layer EML. The second electrode EL2 of the light emitting element OLED may be a cathode electrode, but is not limited thereto.

The thin film encapsulation layer 110 may be provided on the second electrode EL2 of the light emitting element OLED to cover the second electrode EL2 of the light emitting element OLED. When the pixel region of the display panel 300 is sealed using the thin film encapsulation layer 110, the thickness of the display device 1 can be reduced, and a flexible characteristic can be secured.

The thin film encapsulation layer 110 may have a multilayer structure or a single layer structure. For example, the thin film encapsulation layer 110 may include a first inorganic layer 111 and a second inorganic layer 113 that overlap each other, and an organic layer 112 interposed between the first inorganic layer 111 and the second inorganic layer 113.

In the display device 1, the display panel 300 may be implemented as an organic light emitting display panel having a thin film encapsulation layer 110, and electrodes of the sensor unit 100 may be formed on the thin encapsulation layer 110. For example, the first connection line 153a of the first strain gauge 150a, the first connection portion 123 of the first electrode unit 120, and the third connection portion 173 of the noise sensing electrode unit 170 may be disposed on the thin encapsulation layer 110, the insulating layer IL may be disposed thereon, and the first touch electrode 121, the second touch electrode 131, the second connection portion 133, the first resistance line 151a, the noise sensing electrode 171, and the dummy electrode 190 may be disposed on the insulating layer IL.

Hereinafter, a touch position detecting operation of the controller 200 will be described with reference to FIG. 17.

Figure 17:
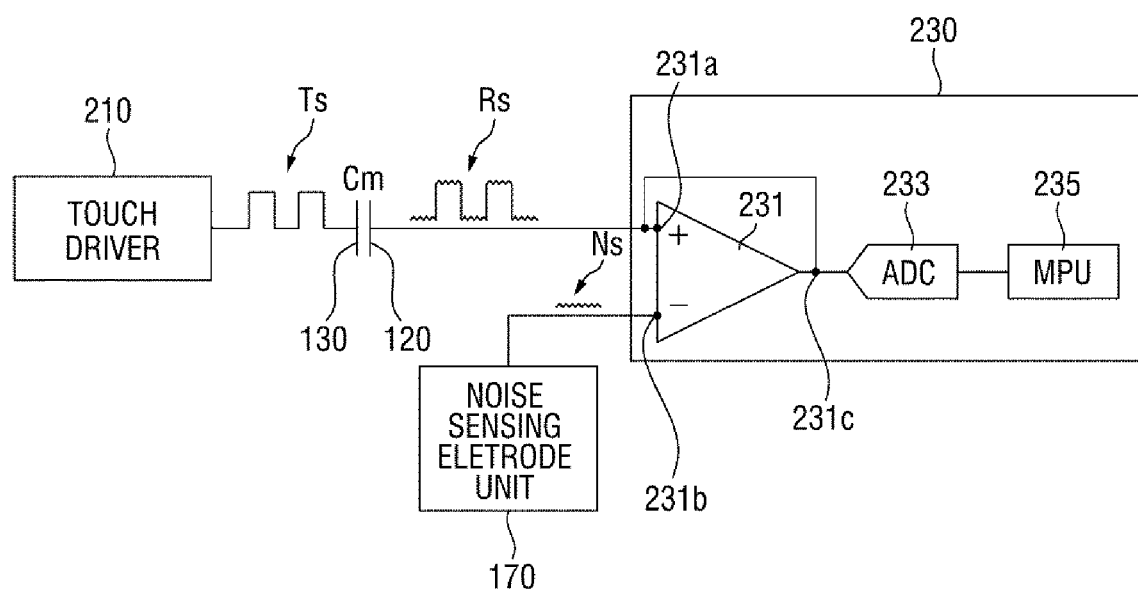
FIG. 17 is a view for explaining a touch position detecting operation of a touch sensor according to some exemplary embodiments.

FIG. 17 is a view for explaining a touch position detecting operation of a touch sensor according to some exemplary embodiments.

Referring to FIG. 17, the touch driver 210 may provide a driving signal Ts to the second electrode unit 130 through the second wiring 903. In some exemplary embodiments, the driving signal Ts may be sequentially provided to each of the second electrode units 130.

The touch detector 230 may receive a sensing signal Rs from the first electrode unit 120 through the first wiring 901. In some exemplary embodiments, as described above, the sense signal Rs may include information on the amount of change in mutual capacitance Cm that has occurred between the first electrode unit 120 and the second electrode unit 130. When the driving signal Ts is provided to the second electrode unit 130, mutual capacitance Cm is formed between the second electrode unit 130 and the first electrode unit 120. Further, when a touch input is applied, the mutual capacitance Cm changes, and the sensing signal Rs may include the above-described information on the amount of change in mutual capacitance Cm.

In some exemplary embodiments, the touch detector 230 may include at least one amplifier 231 (such as an operational (OP) amplifier), an analog-to-digital converter 233, and a processor 235, which may be referred to as MPU 235.

The amplifier 231 may include a first input terminal 231a, a second input terminal 231b, and an output terminal 231c. The first input terminal 231a of the amplifier 231, for example, a non-inverting input terminal of an OP amplifier 231 may be electrically connected to the first electrode unit 120 through the first wiring 901, and the sensing signal Rs may be input to the first input terminal 231a.

In some exemplary embodiments, the second input terminal 231b of the amplifier 231, for example, an inverting input terminal of the OP amplifier 231 may be electrically connected to the noise sensing electrode unit 170 through the third wiring 905. The noise sensing signal Ns may be provided to the second input terminal 231b of the amplifier 231. Accordingly, a reference voltage of each of the amplifiers 231 may be changed together with the voltage change of each of the noise sensing electrode units 170. That is, the reference potential (or voltage level) of each of the amplifiers 231 may be changed according to the potential of the noise sensing electrode unit 170.

The potential of the noise sensing electrode unit 170 may be changed depending on a noise signal flowing into the sensor unit 100 from the display panel 300. For example, the potential of the noise sensing electrode unit 170 may be changed corresponding to a common mode noise flowing into the sensor unit 100 from the display panel 300.

Accordingly, when the noise sensing electrode unit 170 is further disposed in the sensing area SA and the reference potential of the amplifier 231 is changed using the noise sensing signal Ns sensed by the noise sensing electrode unit 170, the common mode noise flowing into the sensor unit 100 may be canceled (or eliminated) or at least reduced. For instance, the first electrode unit 120 and the noise sensing electrode unit 170 that are sensing electrode units, have corresponding ripples with respect to the common mode noise. In particular, the first electrode unit 120 and the noise sensing electrode unit 170 extend in the same direction in the sensing area SA and are disposed at positions corresponding to each other, thereby receiving noise signals having the same or very similar shape and/or size. Further, the first electrode unit 120 is electrically connected to the first input terminal 231a of the amplifier 231 through the first wiring 901, and the noise sensing electrode unit 170 is electrically connected to the second input terminal 231b of the amplifier 231 through the third wiring 905 different form the first wiring 901. Thus, the noise components (e.g., ripples) included in the sensing signal Rs provided from the first electrode unit 120 can be effectively canceled or at least reduced. Accordingly, the signal output from the output terminal 231c of the amplifier 231 may be a noise-canceled sensing signal.

Although the amplifier 231 may be implemented in the form of an inverting amplifier, exemplary embodiments are not limited thereto. In some exemplary embodiments, the amplifier 231 may be implemented in the form of a non-inverting amplifier.

The output terminal 231c of the amplifier 231 may be electrically connected to the analog-to-digital converter 233. The analog-to-digital converter 233 may convert the input analog signal into a digital signal. A number of analog-to-digital converters 233 may be provided in correspondence with the number of the first electrode units 120 so as to correspond to each of the first electrode units 120 at a ratio of 1:1. Further, in some exemplary embodiments, each of the first electrode units 120 may be configured to share one analog-to-digital converter 233, and in this case, a switching circuit (not shown) for channel selection may be additionally provided.

The processor 235 processes the converted signal (e.g., digital signal) from the analog-to-digital converter 233, and detects a touch input according to the result of the signal processing. For example, the processor 235 may analyze (e.g., comprehensively analyze) the first sensing signal amplified by the amplifier 231 and converted by the analog-to-digital converter 233 to detect whether or not a touch input is applied and detect the position of the touch input. In some exemplary embodiments, the processor 235 may be implemented as a microprocessor (MPU). In this case, a memory (not shown) for driving the processor 235 may be additionally provided in the touch detector 230. Meanwhile, the configuration of the processor 235 is not limited thereto. As another example, the processor 235 may be implemented as a microcontroller (MCU) or any other suitable component.

The touch sensor TSM according to various exemplary embodiments can effectively cancel the noise signal introduced from the display panel 300 and improve the signal-to-noise ratio (SNR). Accordingly, malfunction of the touch sensor TSM according to the noise signal can be minimized, and the sensing sensitivity of the touch sensor TSM can be improved.

Hereinafter, a touch pressure detecting operation of the controller 200 will be described with reference to FIGS. 18 and 19.

Figure 18:
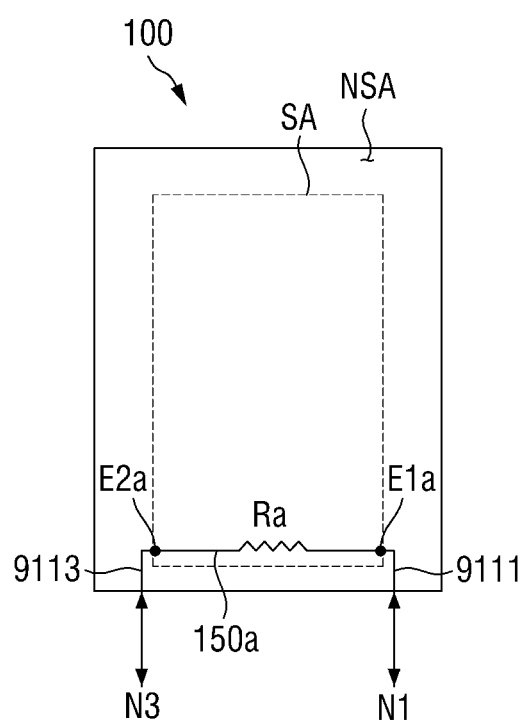
FIG. 18 is a plan view schematically showing a layout of a first strain gauge, a first signal line, and a second signal line shown in FIG. 3, as well as a connection relationship with a Wheatstone bridge circuit unit according to some exemplary embodiments.

FIG. 18 is a plan view schematically showing a layout of a first strain gauge, a first signal line, and a second signal line shown in FIG. 3, as well as a connection relationship with a Wheatstone bridge circuit unit according to some exemplary embodiments. FIG. 19 is a view for explaining a touch pressure detecting operation of a touch sensor including a Wheatstone bridge circuit electrically connected to a first strain gauge shown in FIG. 18 according to some exemplary embodiments.

Figure 19:
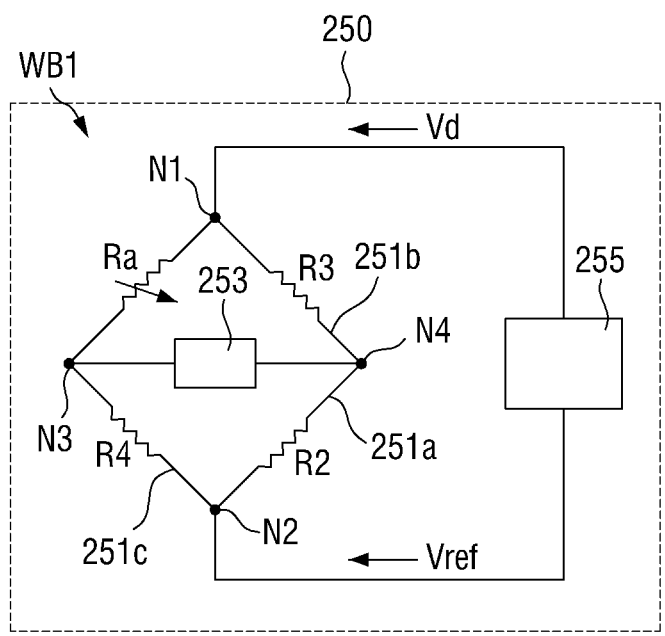
FIG. 19 is a view for explaining a touch pressure detecting operation of a touch sensor including a Wheatstone bridge circuit electrically connected to a first strain gauge shown in FIG. 18 according to some exemplary embodiments.

Referring to FIGS. 18 and 19, the first strain gauge 150a may include one end E1a and the other end E2a, which are opposite to each other along the first direction x. As described above, one end E1a of the first strain gauge 150a may be connected to the first signal line 9111, and the other end E2a of the first strain gauge 150a may be connected to the second signal line 9113. As one end E1a and the other end E2a of the first strain gauge 150a are located at sides opposite to each other, the first signal line 9111 and the second signal line 9113 may also be located at sides opposite to each other with the sensing area SA disposed therebetween.

The pressure detector 250 may include a Wheatstone bridge circuit unit WB1. The Wheatstone bridge circuit unit WB1 includes a first node N1, a second node N2, a first output node N3, and a second output node N4. In some exemplary embodiments, a driving voltage Vd may be provided to the first node N1, and a reference voltage Vref may be provided to the second node N2. Illustratively, the reference voltage Vref may be a ground voltage.

In some exemplary embodiments, the Wheatstone bridge circuit unit WB1 may further include a first resistor 251a connected to the second node N2 and the second output node N4, a second resistor 251b connected to the first node N1 and the second output node N4, and a third resistor 251c connected to the second node N2 and the first output node N3.

In some exemplary embodiments, the resistance value R2 of the first resistor 251a, the resistance value R3 of the second resistor 251b, and the resistance value R4 of the third resistor 251c may have predetermined values, respectively. In some exemplary embodiments, the resistance value R2 of the first resistor 251a, the resistance value R3 of the second resistor 251b, and the resistance value R4 of the third resistor 251c may have fixed values, respectively. In some exemplary embodiments, the resistance value R2 of the first resistor 251a, the resistance value R3 of the second resistor 251b, and the resistance value R4 of the third resistor 251c may be equal to each other.

In some exemplary embodiments, the Wheatstone bridge circuit unit WB1 may further include a first element 253 connected to the first output node N3 and the second output node N4, and a second element 255 connected to the first node N1 and the second node N2. The first element 253 may sense an electrical flow between the first output node N3 and the second output node N4. For example, the first element 253 may be a flow detecting element or a voltage measuring element. The second element 255 may be a voltage supply element for supplying a voltage to the first node N1 and the second node N2. In some exemplary embodiments, the second element 255 may provide a driving voltage Vd to the first node N1 and may provide a reference voltage Vref to the second node N2.

According to some exemplary embodiments, one end E1a of the first strain gauge 150a may electrically connected to the first node N1 through the first signal line 9111, and the other end E2a of the first strain gauge 150a may be connected to the first output node N3 through the second signal line 9113. In this manner, the first strain gauge 150a, the first resistor 251a, the second resistor 251b, and the third resistor 251c are connected to each other to implement a Wheatstone bridge.

In some exemplary embodiments, in a state where a touch input is not applied, the resistance value Ra of the first strain gauge 150a may be substantially equal to the resistance value R2 of the first resistor 251a, the resistance value R3 of the second resistor 251b, and the resistance value of the third resistor 251c. In a state where a touch input is not applied to the sensor unit 100, the resistance value R2 of the first resistor 251a, the resistance value R3 of the second resistor 251b, the resistance value R4 of the third resistor 251c, and the resistance value Ra of the first strain gauge may maintain an equilibrium state. In other words, the voltages of the first output node N3 and the second output node N4 may be equal to each other.

When a touch input is applied to the sensor unit 100, the shape of the first strain gauge 150a may be deformed depending on the intensity of a touch, and the resistance value Ra of the first strain gauge 150a may be changed due to the shape deformation such that a voltage difference occurs between the first output node N1 and the second output node N4. The voltage difference or the amount of current generated by the voltage difference may be measured by the first element 253 to detect the intensity of a touch or the pressure of a touch.

The electrical connection relationship between the first strain gauge 150a and the Wheatstone bridge circuit unit WB1 may be variously changed. Illustratively, the positions of the first strain gauge 150a and the third resistor 251c in FIG. 19 may be swapped with each other.

The touch sensor TSM according to various exemplary embodiments may detect the position of a touch using the first electrode unit 120, the second electrode unit 130, and the touch driver 210, and may detect the intensity of pressure using the first strain gauge 150a and the pressure detector 250.

Figure 20:
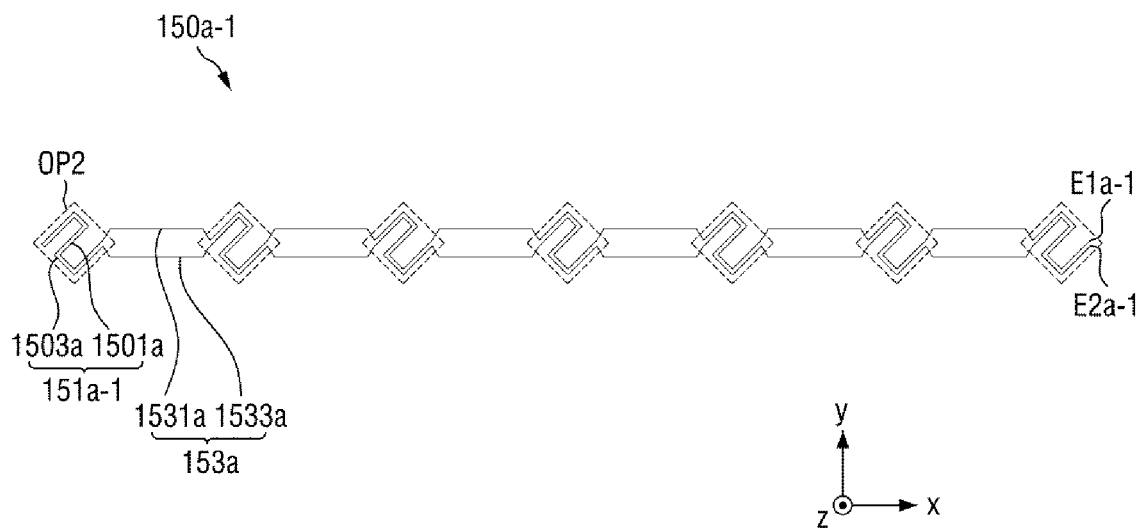
FIG. 20 is a view showing a modified example of a first strain gauge shown in FIG. 3 according to some exemplary embodiments.
Figure 21:
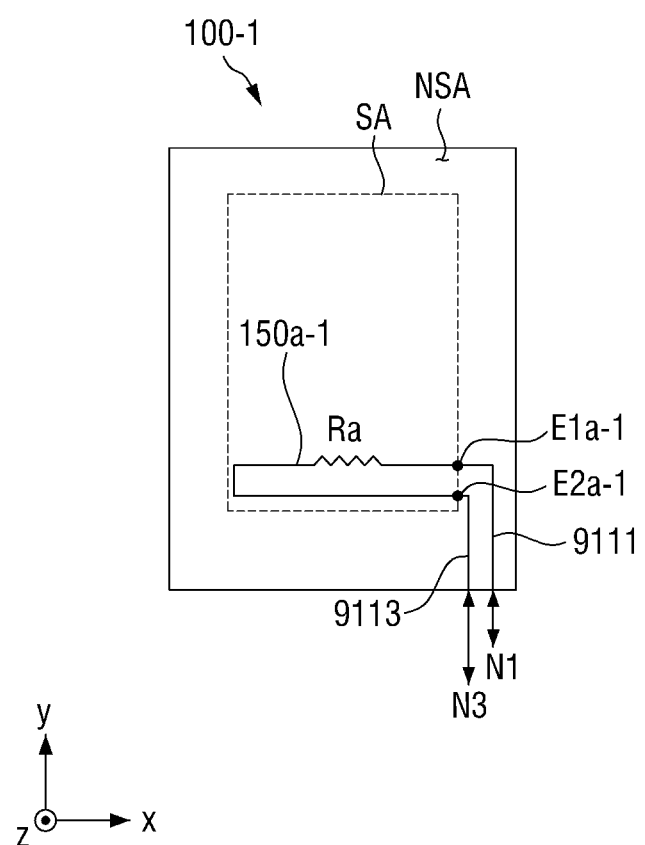
FIG. 21 is a plan view schematically showing a layout of the first strain gauge, a first signal line, and a second signal line shown in FIG. 20, as well as a connection relationship with the Wheatstone bridge circuit unit shown in FIG. 19 according to some exemplary embodiments.

FIG. 20 is a view showing a modified example of a first strain gauge shown in FIG. 3 according to some exemplary embodiments. FIG. 21 is a plan view schematically showing a layout of the first strain gauge, a first signal line, and a second signal line shown in FIG. 20, as well as a connection relationship with the Wheatstone bridge circuit unit shown in FIG. 19 according to some exemplary embodiments.

Referring to FIGS. 20 and 21, unlike that shown in FIG. 3, in the first strain gauge 150a-1 of the sensor unit 100-1, the first resistance line 151a-1 may include a first portion 1501a and a second portion 1503a. The first portion 1501a and the second portion 1503a that are disposed in at least one of the second openings OP2 may be spaced apart from each other. In some exemplary embodiments, the first portion 1501a and the second portion 1503a that are disposed in the second opening OP2 located at the outermost periphery of the one side (e.g., the right side in FIGS. 20 and 21) in the first direction x among the second openings OP2 may be spaced apart from each other.

A first sub connection line 1531a may be connected to the first portion 1501a of the first resistance line 151a-1, and the first sub connection line 1531a and the first portion 1501a may extend from one side (e.g., the right side in FIGS. 20 and 21) to the other side (e.g., the left side in FIGS. 20 and 21) in the first direction x. A second sub connection line 1533a may be connected to the second portion 1503a of the first resistance line 151a-1. The second portion 1503a and the second sub connection line 1533a may extend from one side (e.g., the right side in FIGS. 20 and 21) to the other side (e.g., the left side in FIGS. 20 and 21) in the first direction x.

That is, when viewed from a plane (e.g., when viewed in the third direction z), the first strain gauge 150a-1 may extend from one side to the other side along the first direction x, and then bend to extend from the other side to the one side along the first direction x. In this manner, one end E1a-1 of the first strain gauge 150a-1 and the other end E2a-1 of the first strain gauge 150a-1 may be located at the same side as each other, for example, at one side of the sensing area SA.

Since both of the one end E1a-1 of the first strain gauge 150a-1 and the other end E2a-1 of the first strain gauge 150a-1 are located at one side of the sensing area SA, the first signal line 9111 and the second signal line 9113 may also be located at one side of the sensing area SA. Since the connection relationship between the first strain gauge 150a-1 and the Wheatstone bridge circuit unit WB1 is the same as that having been described with reference to FIGS. 18 and 19, this will be omitted.

Figure 22:
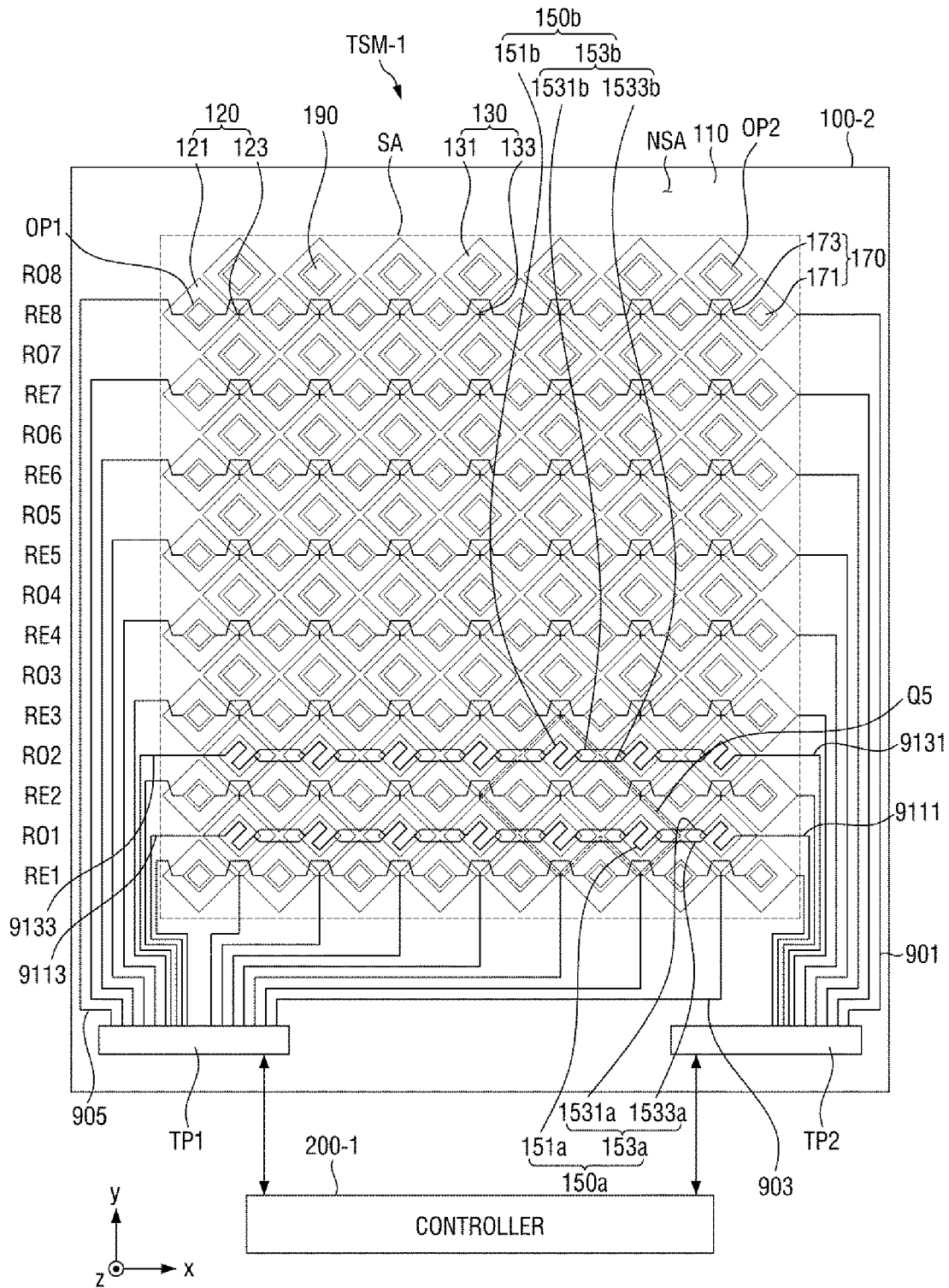
FIG. 22 is a plan view of a sensor unit of a touch sensor including a depiction of a connection relationship between the sensor unit and a controller according to some exemplary embodiments.
Figure 23:
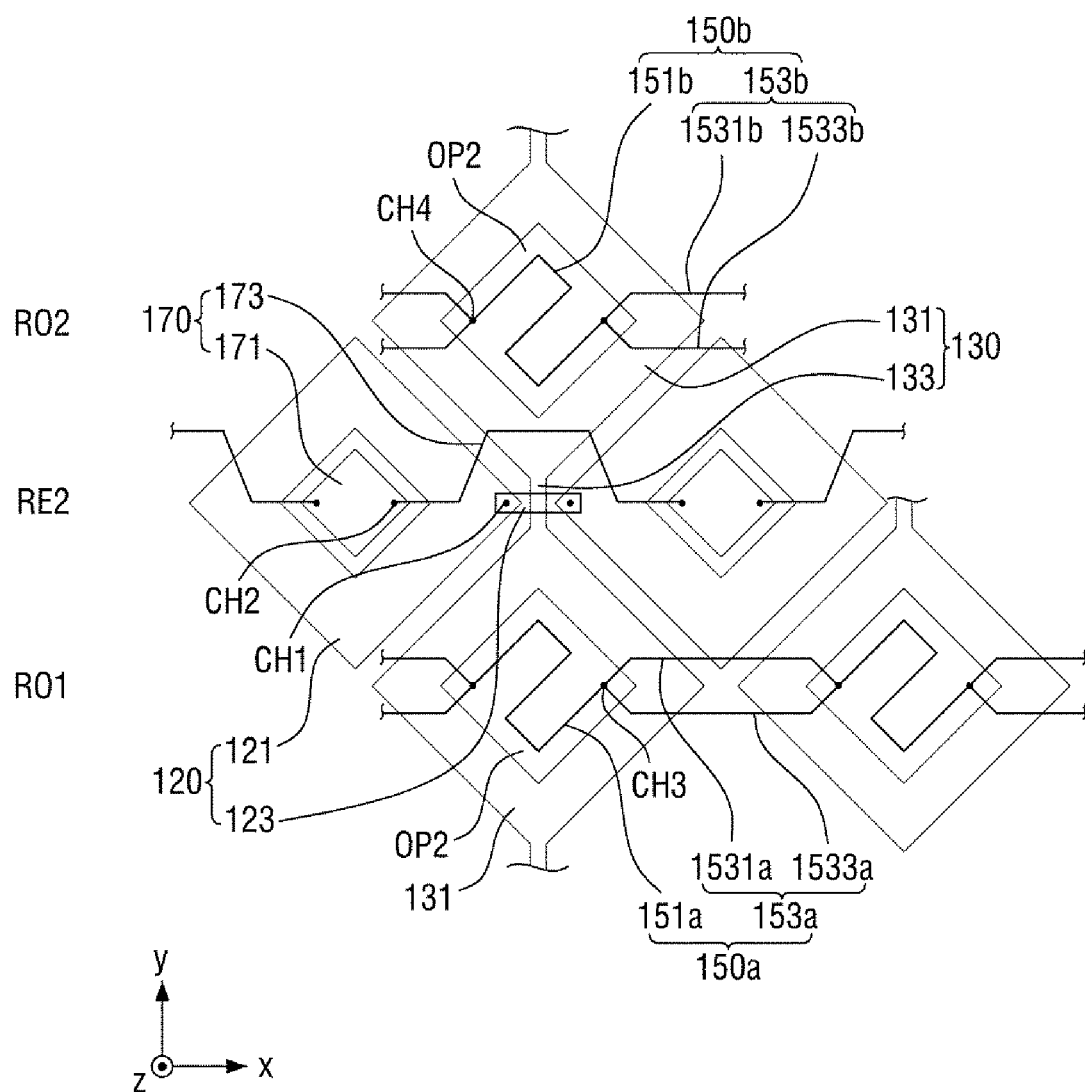
FIG. 23 is an enlarged plan view of portion Q5 of FIG. 22 according to some exemplary embodiments.
Figure 24:
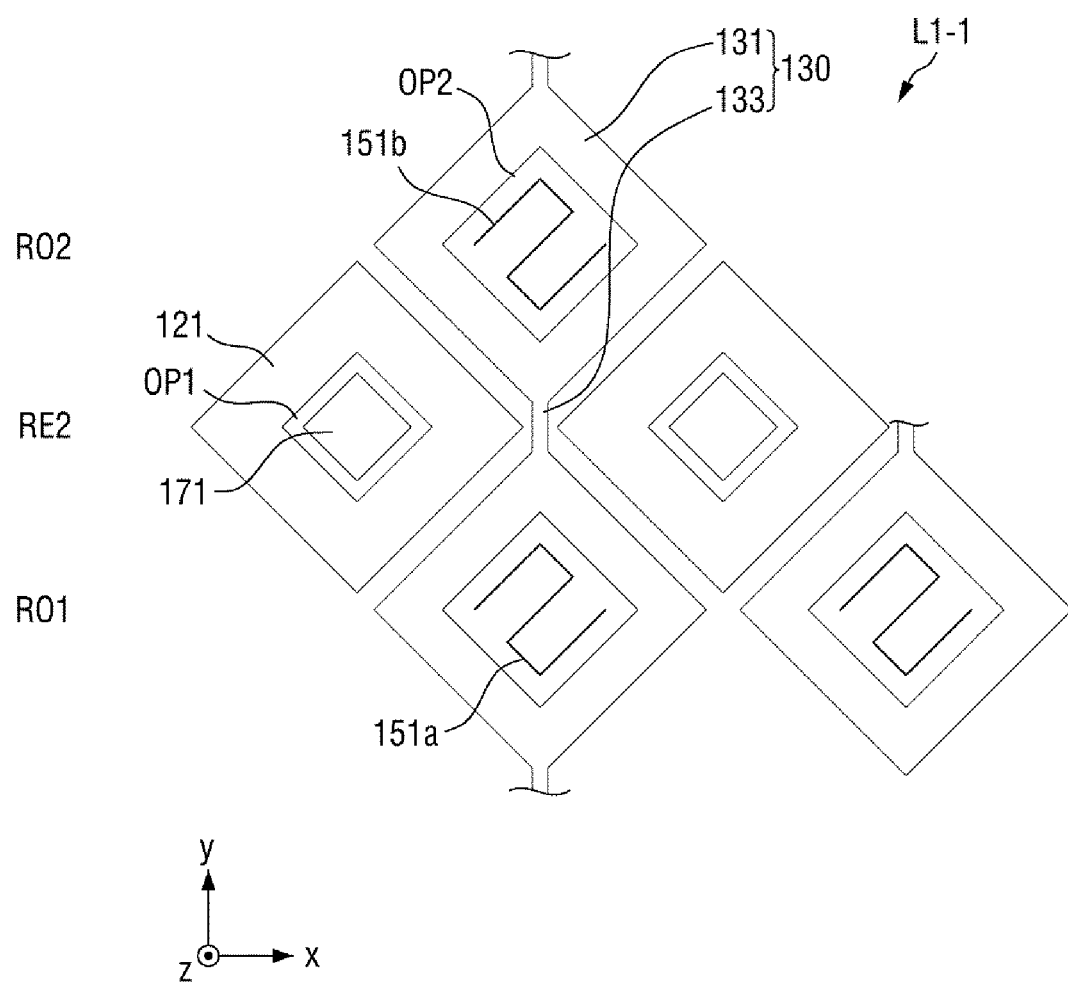
FIG. 24 is a view showing a structure of a first layer of the sensor unit shown in FIG. 23 according to some exemplary embodiments.
Figure 25:
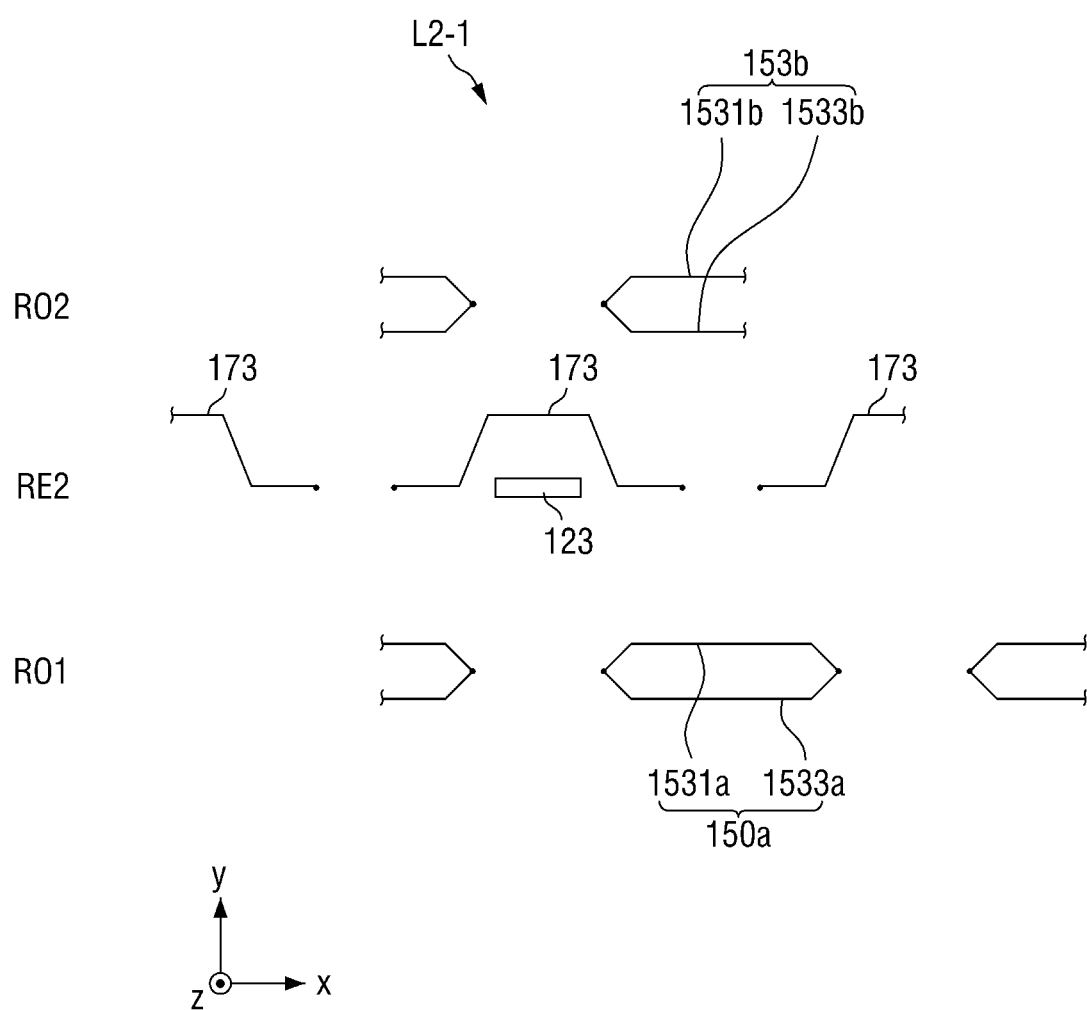
FIG. 25 is a view showing a structure of a second layer of the sensor unit shown in FIG. 23 according to some exemplary embodiments.

FIG. 22 is a plan view of a sensor unit of a touch sensor including a depiction of a connection relationship between the sensor unit and a controller according to some exemplary embodiments. FIG. 23 is an enlarged plan view of portion Q5 of FIG. 22 according to some exemplary embodiments. FIG. 24 is a view showing a structure of a first layer of the sensor unit shown in FIG. 23 according to some exemplary embodiments. FIG. 25 is a view showing a structure of a second layer of the sensor unit shown in FIG. 23 according to some exemplary embodiments.

Referring to FIGS. 22 to 25, the touch sensor TSM-1 includes a sensor unit 100-2 and a controller 200-1.

The sensor unit 100-2 of the touch sensor TSM-1 is different from the sensor unit 100 of the touch sensor TSM as previously described in that the sensor unit 100-2 further includes a second strain gauge 150b, a third signal line 9131, and a fourth signal line 9141, and other configurations of the sensor unit 100-2 are substantially the same as or similar to those of the sensor unit 100. Therefore, hereinafter, differences will be mainly described.

The second strain gauge 150b may be disposed in a row formed by the second touch electrodes 131 within the sensing area SA. In some exemplary embodiments, the second strain gauge 150b may be disposed adjacent to the first strain gauge 150a along the second direction y. Illustratively, the second strain gauge 150b may be disposed in the second row RO2.

The second strain gauge 150b may have substantially the same structure as the first strain gauge 150a. For instance, the second strain gauge 150b may include a second resistance line 151b and a second connection line 153b.

The second resistance line 151b may be disposed in the second opening OP2 formed in the second touch electrode 131 in the second row RO2, and may be spaced apart from the second touch electrode 131. In some exemplary embodiments, the second resistance line 151b may be located on the same first layer L1-1 as the first resistance line 151a, and may be made of the same material as the first resistance line 151a. Further, the second resistance line 151b may have substantially the same structure as the first resistance line 151a. A description of the second resistance line 151b is substantially the same as that of the first resistance line 151a, and is, thus, omitted.

The second connection line 153b may electrically connect adjacent second resistance lines 151b to each other along the first direction x in the second row R02, and may be in contact with the second resistance lines 151b. The first connection line 153a may be spaced apart from the first electrode unit 120 and the second electrode unit 130 without being in contact with the first electrode unit 120 and the second electrode unit 130. In some exemplary embodiments, the second connection line 153b may be located on the same second layer L2-2 as the first connection line 153a, and may be made of the same material as the first connection line 153a.

In some exemplary embodiments, an insulating layer IL (see, e.g., FIGS. 13-15) may be disposed between the second resistance line 151b and the second connection line 153b, and the second resistance line 151b and the second connection line 153b may be in contact with each other through a fourth contact hole CH4 formed in the insulating layer IL. The second connection line 153b may have substantially the same structure as the first connection line 153a. Illustratively, the second connection line 153b may include a first sub connection line 1531b and a second connection line 1533b. A detailed description of the second connection line 153b is substantially the same as that of the first connection line 153a, and is, thus, omitted.

A third signal line 9131 connected to one end E1b of the second strain gauge 150b and a fourth signal line 9133 connected to the other end E2b of the second strain gauge 150b may be disposed on the peripheral area NSA of the base layer 110. In some exemplary embodiments, the fourth signal line 9133 may be connected to the first pad unit TP1, and the third signal line 9131 may be connected to the second pad unit TP2, but exemplary embodiments are not limited thereto.

Figure 26:
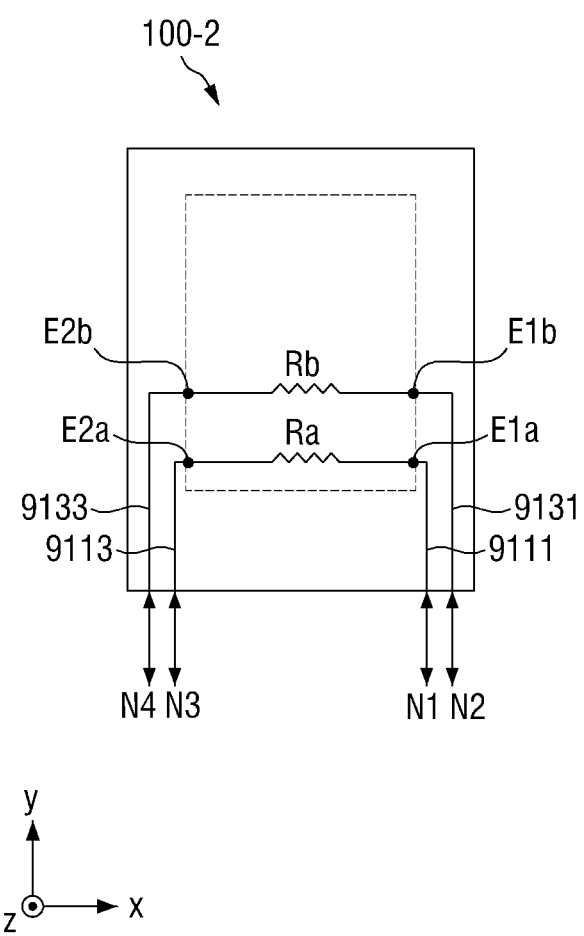
FIG. 26 is a plan view schematically showing a layout of a first strain gauge, a second strain gauge, a first signal line, a second signal line, a third signal line, and a fourth signal line shown in FIG. 22, as well as a connection relationship with a Wheatstone bridge circuit unit according to some exemplary embodiments.
Figure 27:
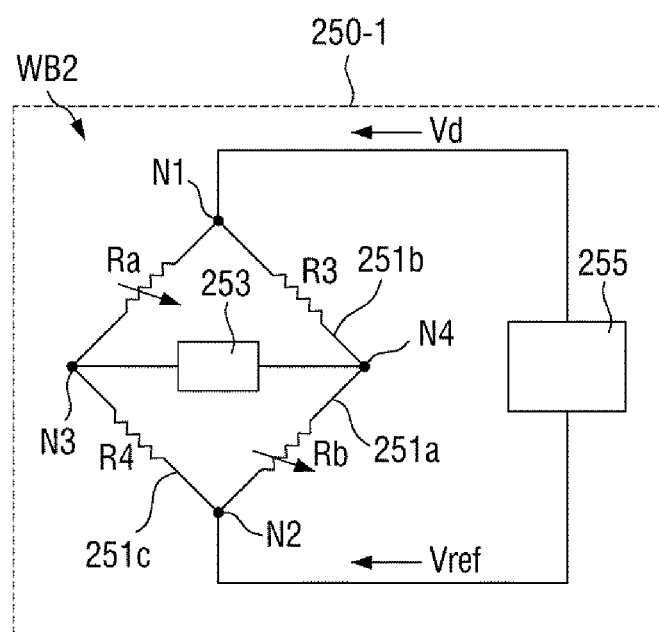
FIG. 27 is a diagram showing the Wheatstone bridge circuit unit electrically connected to the first strain gauge and the second strain gauge shown in FIG. 26 according to some exemplary embodiments.

FIG. 26 is a plan view schematically showing a layout of a first strain gauge, a second strain gauge, a first signal line, a second signal line, a third signal line, and a fourth signal line shown in FIG. 22, as well as a connection relationship with a Wheatstone bridge circuit unit according to some exemplary embodiments. FIG. 27 is a diagram showing the Wheatstone bridge circuit unit electrically connected to the first strain gauge and the second strain gauge shown in FIG. 26 according to some exemplary embodiments.

Referring to FIGS. 26 and 27, the first strain gauge 150a may include one end E1a and the other end E2a located at opposite sides to each other along the first direction x. One end E1a of the first strain gauge 150a may be connected to the first signal line 9111, and the other end E2a of the first strain gauge 150a may be connected to the second signal line 9113. As one end E1a and the other end E2a of the first strain gauge 150a are located at opposite sides to each other, the first signal line 9111 and the second signal line 9113 may also be located at opposite sides to each other with the sensing area SA disposed therebetween.

Further, the second strain gauge 150b may include one end E1b and the other end E2b located at opposite sides to each other along the first direction x. As described above, one end E1b of the second strain gauge 150b may be connected to the third signal line 9113, and the other end E2b of the second strain gauge 150b may be connected to the fourth signal line 9133. As one end E1b and the other end E2b of the second strain gauge 150b are located at opposite sides to each other, the third signal line 9131 and the fourth signal line 9133 may also be located at opposite sides to each other with the sensing area SA disposed therebetween.

The controller 200-1 is different from the above-described controller 200 in that the pressure detector 250-1 includes a Wheatstone bridge circuit unit WB2, and other configurations of the controller 200-1 are substantially the same as or similar to those of the controller 200.

The pressure detector 250-1 of the controller 200-1 may include a Wheatstone bridge circuit unit WB2. The Wheatstone bridge circuit unit WB2 is different from the Wheatstone bridge circuit unit WB1 shown in FIG. 19 in that it does not include the first resistor 251a, and other configurations of the Wheatstone bridge circuit unit WB2 are substantially the same as or similar to those of the Wheatstone bridge circuit unit WB1. Therefore, duplicate descriptions will be omitted.

In some exemplary embodiments, one end E1a of the first strain gauge 150a may be electrically connected to the first node N1 through the first signal line 9111, and the other end E2a of the first strain gauge 150a may be connected to the first output node N3 through the second signal line 9113. Further, one end E1b of the second strain gauge 150b may be electrically connected to the second node N2 through the third signal line 9131, and the other end E2b of the second strain gauge 150b may be connected to the second output node N4 through the fourth signal line 9133. As such, the first strain gauge 150a, the second strain gauge 150b, the second resistor 251b, and the third resistor 251c are connected to each other to implement a Wheatstone bridge.

In some exemplary embodiments, in a state where a touch input is not applied, the resistance value Ra of the first strain gauge 150a and the resistance value Rb of the second strain gauge 150b may be substantially equal to the resistance value R3 of the second resistor 251b and the resistance value R4 of the third resistor 251c.

When a touch input is applied to the sensor unit 100-2, the shapes of the first strain gauge 150a and the second strain gauge 150b may be deformed depending on the intensity of the touch, and the resistance value Ra of the first strain gauge 150a and the resistance value Rb of the second strain gauge 150b may be changed due to the shape deformation such that a voltage difference occurs between the first output node N3 and the second output node N4. The voltage difference or the amount of current generated by the voltage difference may be measured by the first element 253 to detect the pressure of the touch.

From the viewpoint of the Wheatstone bridge, the first strain gauge 150a and the second strain gauge 150b are connected to face each other such that both the resistance value Ra of the first strain gauge 150a and the resistance value Rb of the second strain gauge 150b are changed when a touch input occurs. Therefore, the voltage difference between the first output node N3 and the second output node N4 with respect to the structure shown in FIG. 19 may increase, and as a result, a touch pressure may be detected with more sensitivity.

The process of detecting a touch position is substantially the same as that of the touch sensor TSM, and will be thus omitted.

Figure 28:
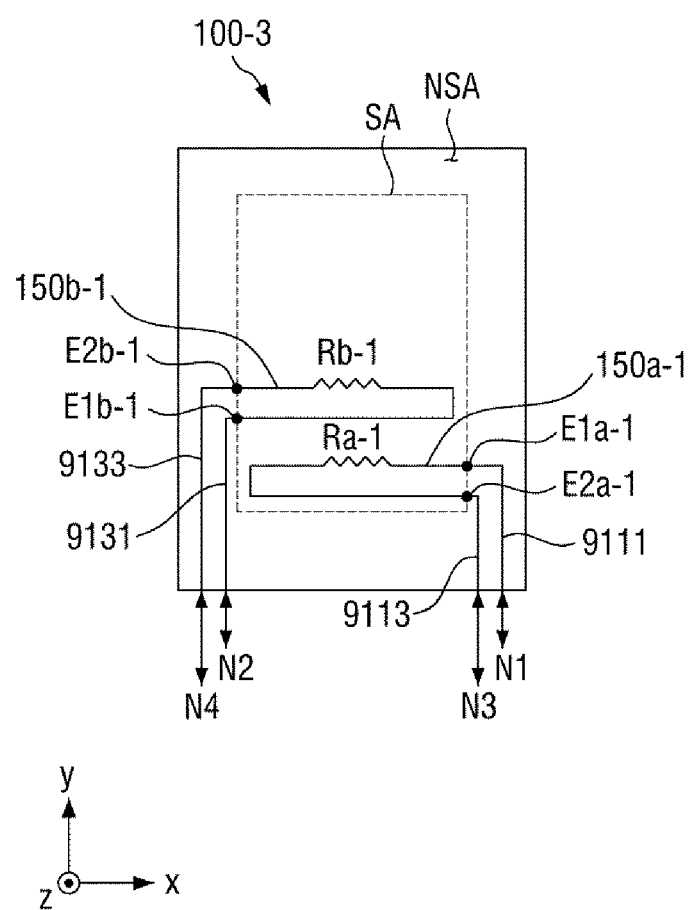
FIG. 28 is a plan view showing a modified example of FIG. 27 according to some exemplary embodiments.

FIG. 28 is a plan view showing a modified example of FIG. 27 according to some exemplary embodiments.

Referring to FIG. 28, both one end E1a-1 and the other end E2a-1 of the first strain gauge 150a-1 may be located at one side (e.g., the right side in FIG. 28) of the sensing area SA, and thus, the first signal line 9111 and the second signal line 9113 may also be located at the one side of the sensing area SA. Further, both one end E1b-1 and the other end E2b-1 of the second strain gauge 150b-1 may be located at the other side (e.g., the left side in FIG. 28) of the sensing area SA, and thus, the third signal line 9131 and the fourth signal line 9133 may also be located at the other side of the sensing area SA.

The above-described first strain gauge 150a-1 may be implemented as the structure shown in FIG. 18, and the second strain gauge 150b-1 may be implemented to be substantially similar to the structure shown in FIG. 18 except that the positions of the one end E1b-1 and the other end E2b-1 of the second strain gauge 150b-1 are different.

In some exemplary embodiments, all of one end E1a-1 and the other end E2a-1 of the first strain gauge 150a-1 and the one end E1b-1 and the other end E2b-1 of the second strain gauge 150b-1 may be located at the same one side of the sensing area SA.

The connection relationships between the first strain gauge 150a-1 and the Wheatstone bridge unit WB2 and between the second strain gauge 150b-1 and the Wheatstone bridge unit WB2 are the same as those having been described with reference to FIGS. 26 and 27, and will, thus, be omitted.

Figure 29:
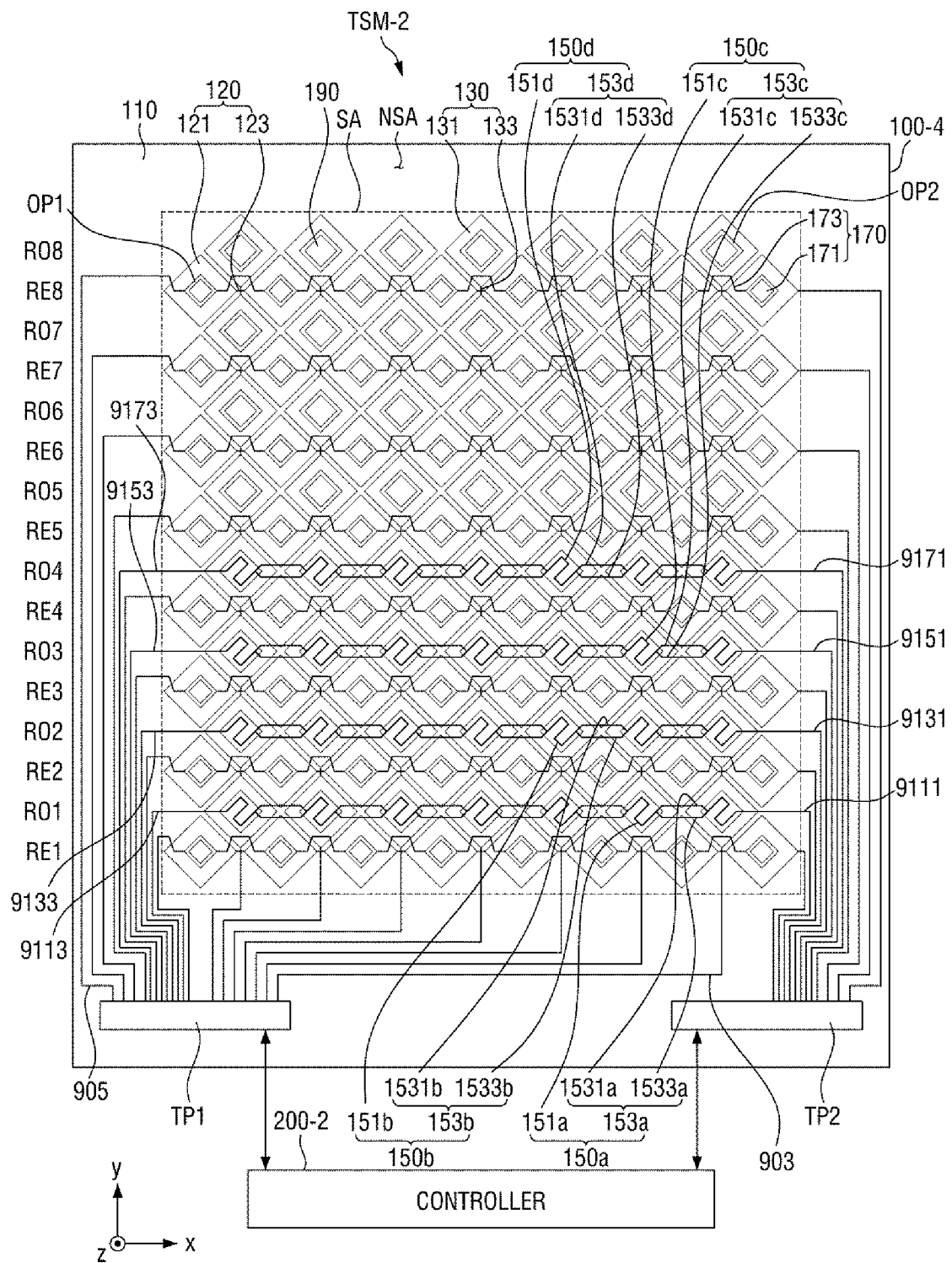
FIG. 29 is a plan view of a sensor unit of a touch sensor including a depiction of a connection relationship between the sensor unit and a controller according to some exemplary embodiments.

FIG. 29 is a plan view of a sensor unit of a touch sensor including a depiction of a connection relationship between the sensor unit and a controller according to some exemplary embodiments.

Referring to FIG. 29, the touch sensor TSM-2 includes a sensor unit 100-4 and a controller 200-2.

The sensor unit 100-4 of the touch sensor TSM-2 is greatly different from the sensor unit 100-2 of the touch sensor TSM-1 in that the sensor unit 100-4 further includes a third strain gauge 150c, a fourth strain gauge 150d, a fifth signal line 9151, a sixth signal line 9153, a seventh signal line 9171, and an eighth signal line 9173, and other configurations of the sensor unit 100-4 are substantially the same as or similar to those of the sensor unit 100-2. Therefore, hereinafter, differences will be mainly described.

The third strain gauge 150c may be located in the third row RO3 located in the sensing area SA and adjacent to the second strain gauge 150b along the second direction y. The fourth strain gauge 150d may be located in the fourth row RO4 located in the sensing area SA and adjacent to the third strain gauge 150c along the second direction y.

The third strain gauge 150c may include a third resistance line 151c located in the second opening OP2 of the third row RO3 and a third connection line 153c connecting adjacent third resistance lines 151c to each other along the first direction x. The fourth strain gauge 150d may include a fourth resistance line 151d located in the second opening OP2 of the fourth row RO4 and a fourth connection line 153d connecting adjacent fourth resistance lines 151d to each other along the first direction x.

In some exemplary embodiments, the third resistance line 151c and the fourth resistance line 151d may be located on the same first layer L1 as the first resistance line 151a, and may be made of the same material as the first resistance line 151a. Further, in some exemplary embodiments, the third resistance line 151c and the fourth resistance line 151d may have substantially the same structure as the first resistance line 151a.

In some exemplary embodiments, the third connection line 153c and the fourth connection line 153d may be located on the same second layer L2 as the first connection line 153a, and may be made of the same material as the first connection line 153a. The third connection line 153c and the fourth connection line 153d may be electrically connected to the third resistance line 151c and the fourth resistance line 151d through contact holes formed in the insulating layer IL.

The third connection line 153c and the fourth connection line 153d may have substantially the same structure as the first connection line 153a. In some exemplary embodiments, the third connection line 153c may include a first sub connection line 1531c and a second sub connection line 1533c, and the fourth connection line 153d may include a first sub connection line 1531d and a second sub connection line 1533d.

A fifth signal line 9151 connected to one end E1c of the third strain gauge 150c, a sixth signal line 9153 connected to the other end E2c of the third strain gauge 150c, a seventh signal line 9171 connected to one end E1d of the fourth strain gauge 150d, and an eighth signal line 9173 connected to the other end E2d of the fourth strain gauge 150d may be located on the peripheral area NSA of the base layer 110. In some exemplary embodiments, the sixth signal line 9153 and the eighth signal line 9173 may be connected to the first pad portion TP1, and the fifth signal line 9151 and the seventh signal line 9171 may be connected to the second pad portion TP2, but exemplary embodiments are not limited thereto.

Figure 30:
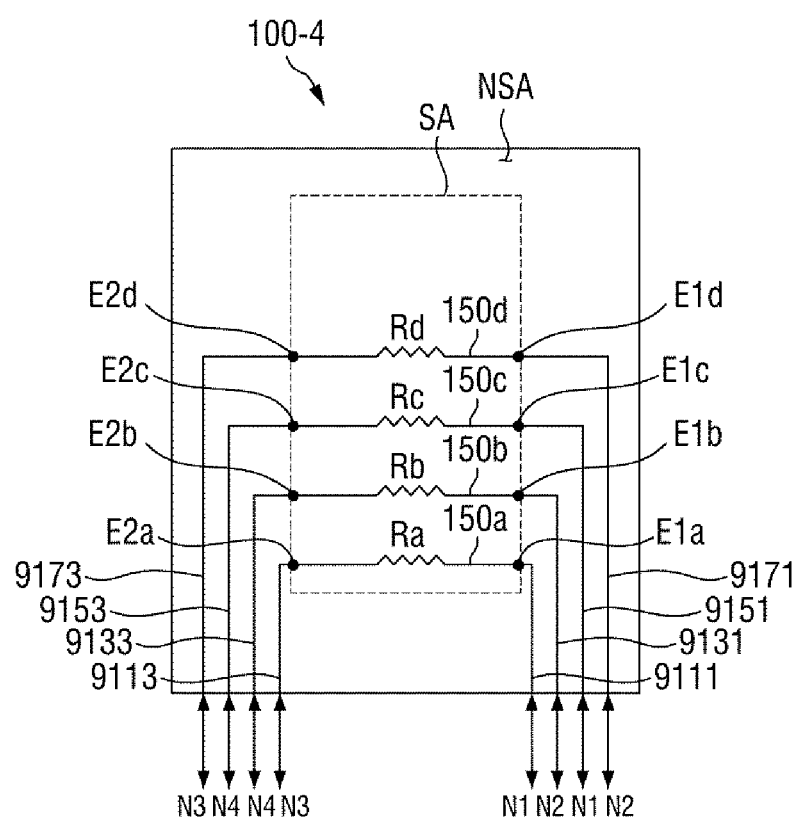
FIG. 30 is a plan view schematically showing a layout of a first strain gauge, a second strain gauge, a third strain gauge, a fourth strain gauge, and first to eighth signal lines shown in FIG. 29, as well as a connection relationship with a Wheatstone bridge circuit unit according to some exemplary embodiments.
Figure 31:
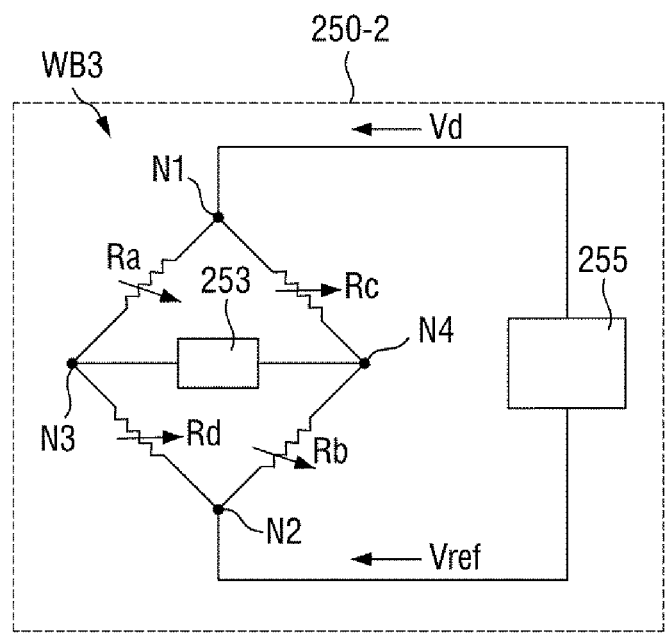
FIG. 31 is a diagram showing the Wheatstone bridge circuit unit electrically connected to the first strain gauge, the second strain gauge, the third strain gauge, and the fourth strain gauge shown in FIG. 30 according to some exemplary embodiments.

FIG. 30 is a plan view schematically showing a layout of a first strain gauge, a second strain gauge, a third strain gauge, a fourth strain gauge, and first to eighth signal lines shown in FIG. 29, as well as a connection relationship with a Wheatstone bridge circuit unit according to some exemplary embodiments. FIG. 31 is a diagram showing the Wheatstone bridge circuit unit electrically connected to the first strain gauge, the second strain gauge, the third strain gauge, and the fourth strain gauge shown in FIG. 30 according to some exemplary embodiments.

Referring to FIGS. 30 and 31, as one end E1c and the other end E2c of the third strain gauge 150c are located at opposite sides to each other, the fifth signal line 9151 and the sixth signal line 9153 may also be located at opposite sides to each other with the sensing area SA disposed therebetween. Further, as one end E1d and the other end E2d of the fourth strain gauge 150d are located at opposite sides to each other, the seventh signal line 9171 and the eighth signal line 9173 may also be located at opposite sides to each other with the sensing area SA disposed therebetween.

The controller 200-2 is different from the above-described controller 200-1 in that the pressure detector 250-2 includes a Wheatstone bridge circuit unit WB3, and other configurations of the controller 200-2 are substantially the same as or similar to those of the controller 200-1. The pressure detector 250-2 of the controller 200-2 may include a Wheatstone bridge circuit unit WB3. The Wheatstone bridge circuit unit WB3 is different from the Wheatstone bridge circuit unit WB2 shown in FIG. 27 in that it does not include the second resistor 251b and the third resistor 251c, and other configurations of the Wheatstone bridge circuit unit WB3 are substantially the same as or similar to those of the Wheatstone bridge circuit unit WB2. Therefore, duplicate descriptions will be omitted.

In some exemplary embodiments, one end E1a of the first strain gauge 150a may be electrically connected to the first node N1 through the first signal line 9111, and the other end E2a of the first strain gauge 150a may be connected to the first output node N3 through the second signal line 9113. Further, one end E1b of the second strain gauge 150b may be electrically connected to the second node N2 through the third signal line 9131, and the other end E2b of the second strain gauge 150b may be connected to the second output node N4 through the fourth signal line 9133. One end E1c of the third strain gauge 150c may be electrically connected to the first node N1 through the fifth signal line 9151, and the other end E2c of the third strain gauge 150c may be connected to the second output node N4 through the sixth signal line 9153. Further, one end E1d of the fourth strain gauge 150d may be electrically connected to the second node N2 through the seventh signal line 9171, and the other end E2d of the fourth strain gauge 150d may be connected to the first output node N3 through the eighth signal line 9173. In this manner, the first strain gauge 150a, the second strain gauge 150b, the third strain gauge 150c, and the fourth strain gauge 150d are connected to each other to implement a Wheatstone bridge.

In some exemplary embodiments, in a state where a touch input is not applied, the resistance value Ra of the first strain gauge 150a and the resistance value Rb of the second strain gauge 150b may be substantially equal to the resistance value Rc of the third strain gauge 150c and the resistance value Rd of the fourth strain gauge 150d.

When a touch input is applied to the sensor unit 100-4, at least one of the resistance value Ra of the first strain gauge 150a, the resistance value Rb of the second strain gauge 150b, the resistance value Rc of the third strain gauge 150c, and the resistance value Rd of the fourth strain gauge 150d may be changed depending on the intensity of the touch. The voltage difference due to the change in the resistance value (or the change in current amount) may be measured by the first element 253 to detect the pressure of the touch.

Figure 32:
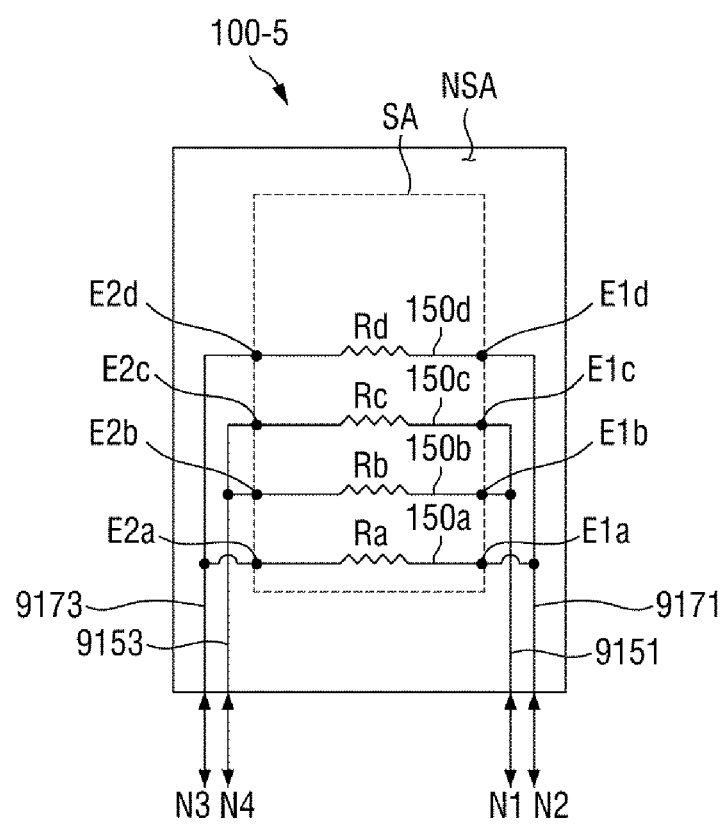
FIG. 32 is a plan view showing a modified example of FIG. 30 according to some exemplary embodiments.

FIG. 32 is a plan view showing a modified example of FIG. 30 according to some exemplary embodiments.

Referring to FIG. 32, the sensor unit 100-5 is different from the structure shown in FIG. 30 in that the first signal line 9111 is omitted and one end E1a of the first strain gauge 150a is connected to the fifth signal line 9151. Further, the second signal line 9113 is omitted and the other end E2a of the first strain gauge 150a is connected to the eighth signal line 9173. In addition, the third signal line 9131 is omitted and one end E1b of the second strain gauge 150b connected to the seventh signal line 9171. Moreover, the fourth signal line 9133 is omitted and the other end E2b of the second strain gauge 150b is connected to the sixth signal line 9153. Other configurations of the sensor unit 100-5 are the same as those of the structure shown in FIG. 30.

In addition, the connection relationship between the signal lines and the strain gauges may be variously changed within the limit of satisfying the connection relationship shown in FIG. 31. Although not shown in the drawings, the shape of each of the strain gauges may be substantially the same as or similar to that shown in FIG. 20.

Figure 33:
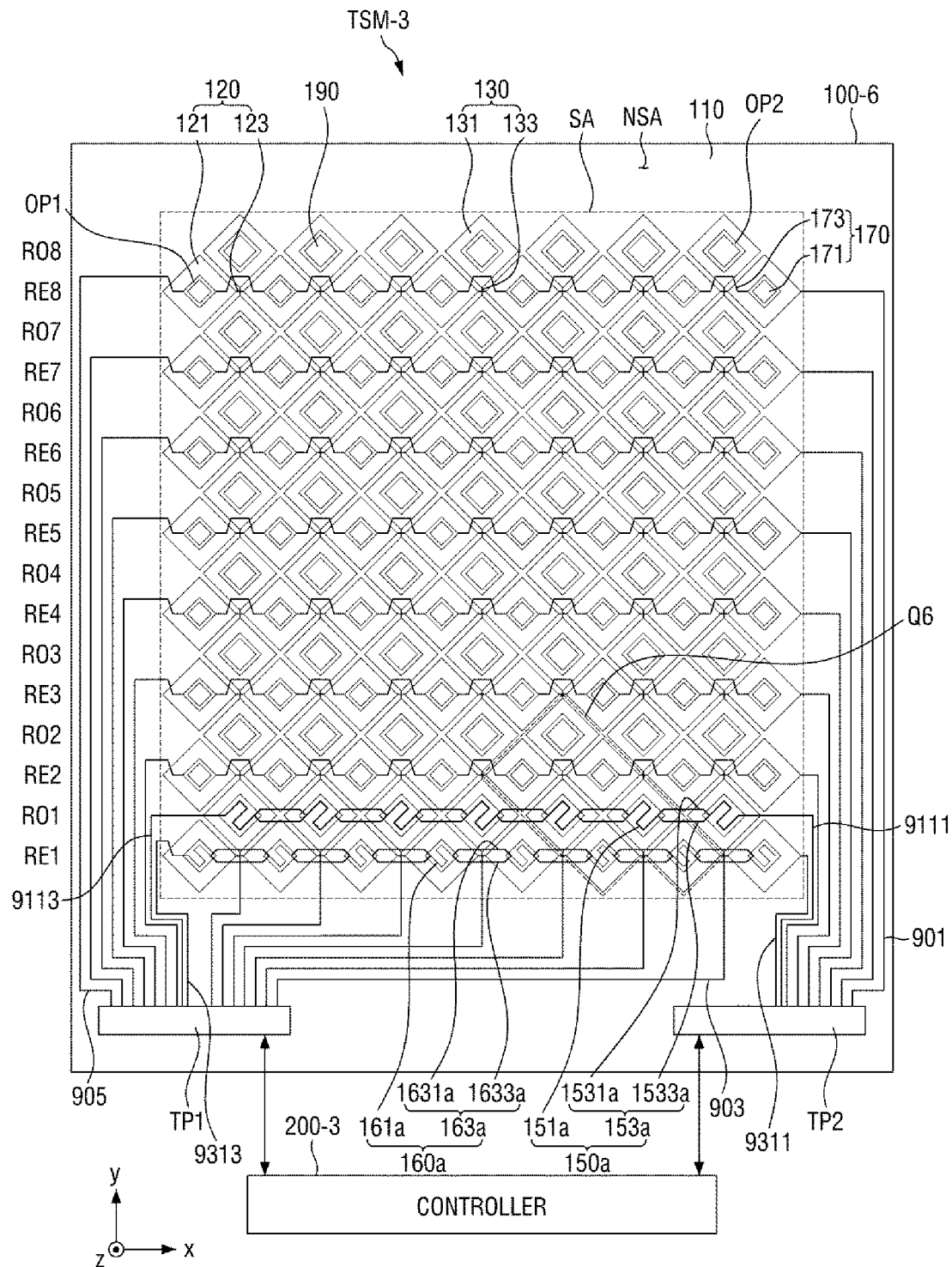
FIG. 33 is a plan view of a sensor unit of a touch sensor including a depiction of a connection relationship between the sensor unit and a controller according to some exemplary embodiments.
Figure 34:
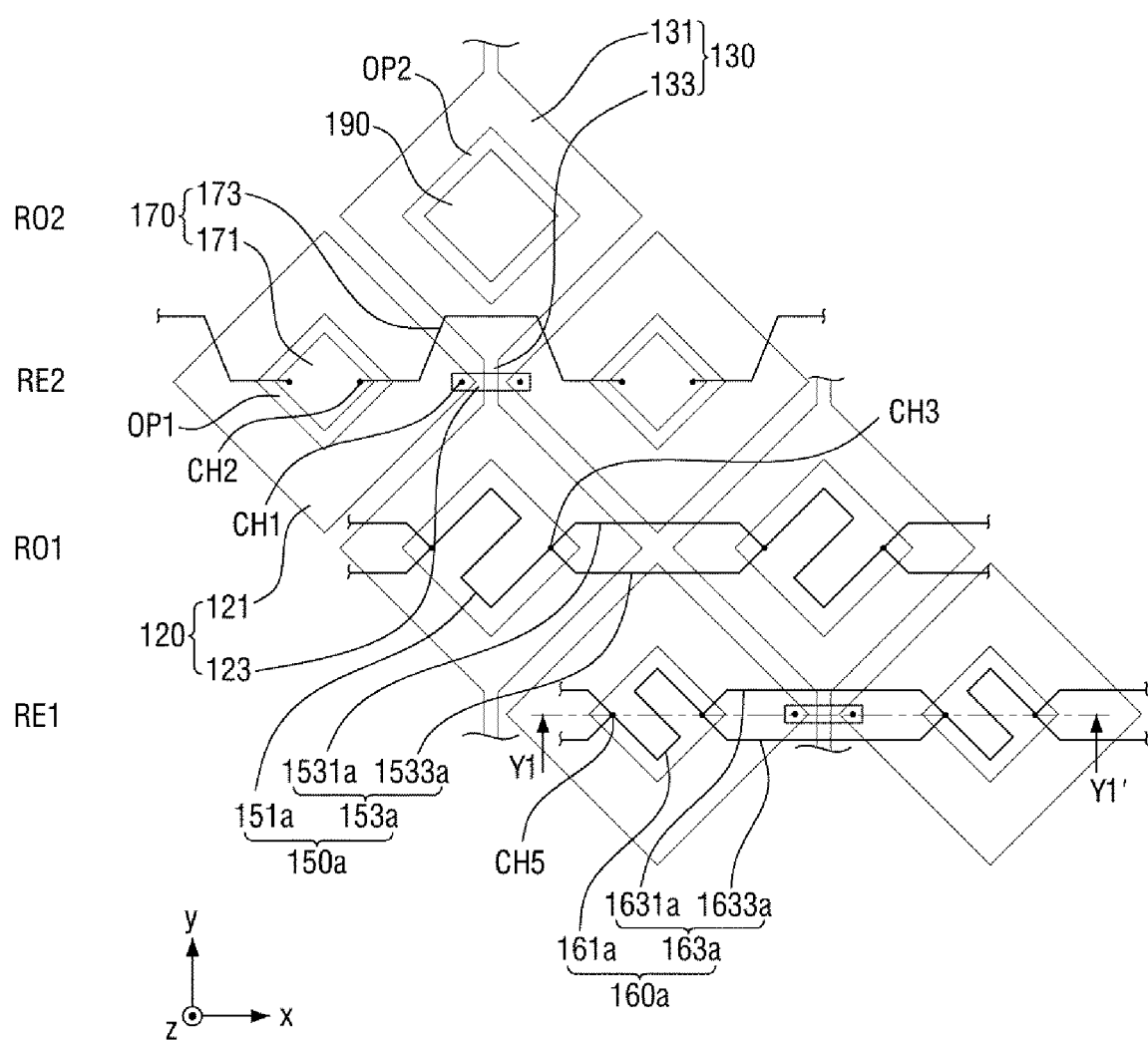
FIG. 34 is an enlarged plan view of portion Q6 of FIG. 33 according to some exemplary embodiments.
Figure 35:
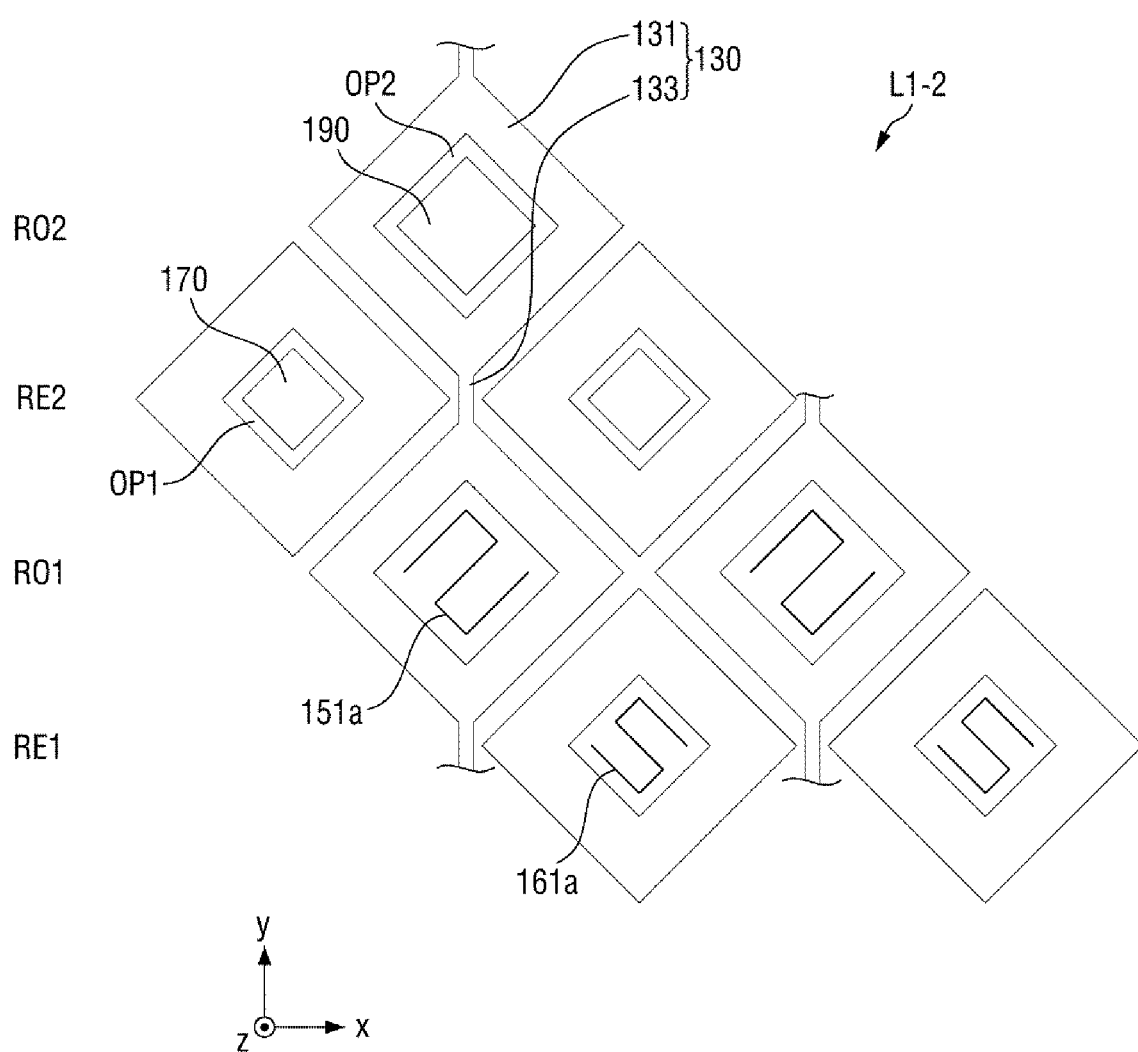
FIG. 35 is a view showing a structure of a first layer of the sensor unit shown in FIG. 34 according to some exemplary embodiments.
Figure 36:
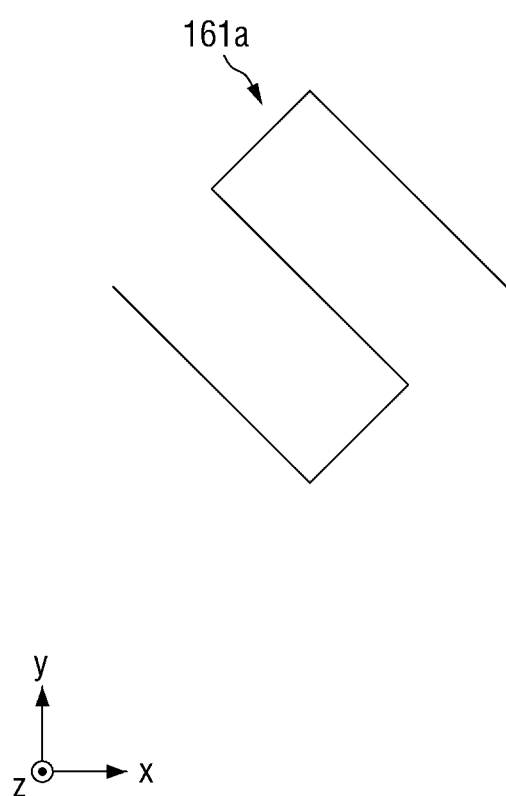
FIG. 36 is an enlarged plan view of portion Q7 of FIG. 35 according to some exemplary embodiments.
Figure 37:
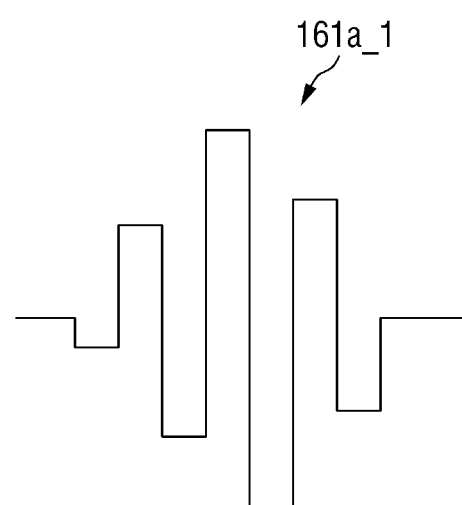
FIGS. 37 and 38 show modified examples of a resistance line shown in FIG. 36 according to some exemplary embodiments.
Figure 37:
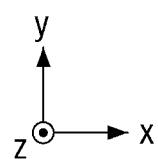
Figure 38:
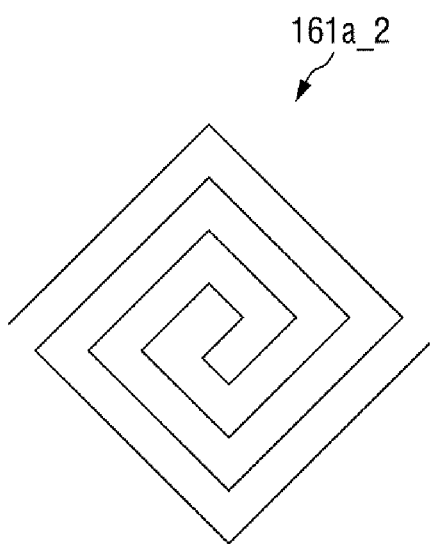
Figure 38:
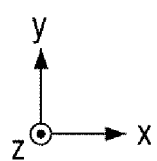
Figure 39:
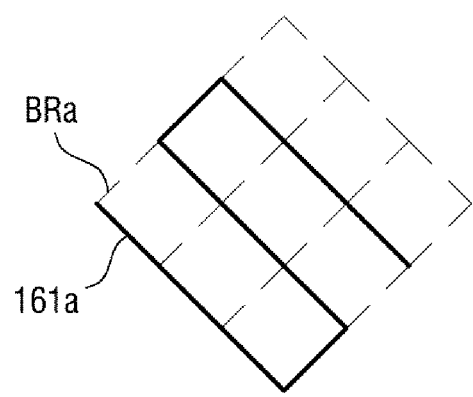
FIG. 39 shows a modified example of the structure shown in FIG. 36 according to some exemplary embodiments.
Figure 40:
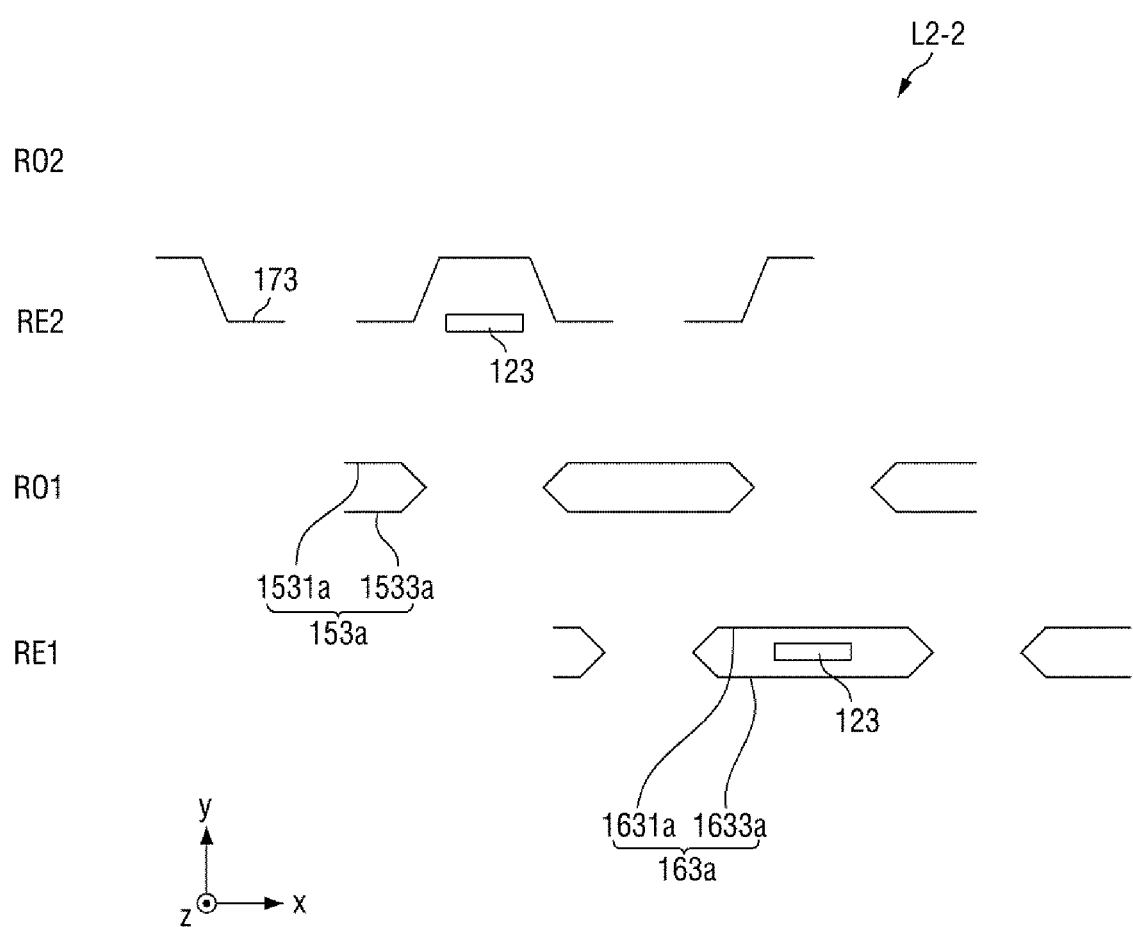
FIG. 40 is a view showing a structure of a second layer of the sensor unit shown in FIG. 34 according to some exemplary embodiments.
Figure 41:
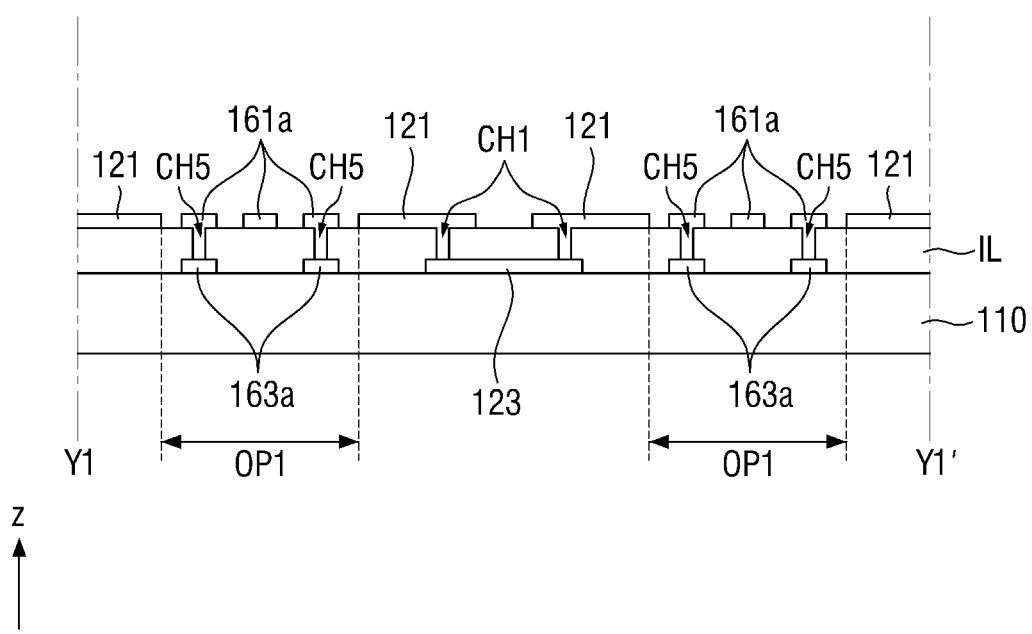
FIG. 41 is a cross-sectional view taken along sectional line Y1-Y1' in FIG. 34 according to some exemplary embodiments.

FIG. 33 is a plan view of a sensor unit of a touch sensor including a depiction of a connection relationship between the sensor unit and a controller according to some exemplary embodiments. FIG. 34 is an enlarged plan view of portion Q6 of FIG. 33 according to some exemplary embodiments. FIG. 35 is a view showing a structure of a first layer of the sensor unit shown in FIG. 34 according to some exemplary embodiments. FIG. 36 is an enlarged plan view of portion Q7 of FIG. 35 according to some exemplary embodiments. FIGS. 37 and 38 show modified examples of a resistance line shown in FIG. 36 according to some exemplary embodiments. FIG. 39 shows a modified example of the structure shown in FIG. 36 according to some exemplary embodiments. FIG. 40 is a view showing a structure of a second layer of the sensor unit shown in FIG. 34 according to some exemplary embodiments. FIG. 41 is a cross-sectional view taken along sectional line Y1-Y1' in FIG. 34 according to some exemplary embodiments.

Referring to FIGS. 33 to 41, the touch sensor TSM-3 includes a sensor unit 100-6 and a controller 200-3.

The sensor unit 100-6 is different from the sensor unit 100 in that the sensor unit 100-6 further includes a fifth strain gauge 160a, a ninth signal line 9311, and a tenth signal line 9313, and other configurations of the sensor unit 100-6 are substantially the same as or similar to those of the sensor unit 100. Therefore, hereinafter, differences will be mainly described.

The fifth strain gauge 160a may be located in the electrode row formed by the first electrode units 120 in the sensing area SA. In some exemplary embodiments, the fifth strain gauge 160a may be located adjacent to the first strain gauge 150a along the second direction y. Illustratively, when the first strain gage 150a is located in the first row R01, the fifth strain gauge 160a may be located in the first electrode row RE1.

The fifth strain gauge 160a may include a fifth resistance line 161a and a fifth connection line 163a.

The fifth resistance line 161a may be located in the first opening OP1 formed in the first touch electrode 121 in the first electrode row RE1, and may be spaced apart from the first touch electrode 121. In some exemplary embodiments, the fifth resistance line 161a may be located in the same first layer L1-2 as the first resistance line 151a, and may be made of the same material as the first resistance line 151a.

In some exemplary embodiments, as shown in FIG. 36, the fifth resistance line 161a may have a shape including two or more bent portions and a portion extending in a direction intersecting the first direction x and the second direction y. In addition, the shape of the fifth resistance line 161a may be variously changed. Illustratively, as shown in FIG. 37, the fifth resistance line 161a_1 may include a plurality of bent portions and a portion extending in parallel with the second direction y. Further, as shown in FIG. 38, the fifth resistance line 161a_2 may have an angular spiral shape, and unlike that shown in FIG. 38, the fifth resistance line 161a may have a curved spiral shape.

When the first touch electrode 121 and the second touch electrode 131 have a mesh structure, the fifth resistance line 161a may be formed by removing a part of the mesh structure. When the fifth resistance line 161a is formed by removing a part of the mesh structure, in some exemplary embodiments, as shown in FIG. 39, a plurality of branch portions BRa connected to the fifth resistance line 161a and spaced apart from each other may be further disposed in the first opening OP1. The plurality of branch portions BRa may be remnants after removing a part of the mesh structure.

The fifth connection line 163a may electrically connect adjacent fifth resistance lines 161a along the first direction x, and may be in contact with the fifth resistance lines 161a. The fifth connection line 163a may be spaced apart from the first electrode unit 120 and the second electrode unit 130 without being in contact with the first electrode unit 120 and the second electrode unit 130. In some exemplary embodiments, the fifth connection line 163a may be located on the same second layer L2-2 as the first connection line 153a, and may be made of the same material as the first connection line 153a. Further, on the plane (or in a plan view), the fifth connection line 163a may be disposed not to overlap the first connection portion 123. For example, the fifth connection line 163a may bypass the first connection portion 123 such that the fifth connection line 163a does not pass through the area where the first connection portion 123 is located so as to connect adjacent two fifth resistance lines 161a.

In some exemplary embodiments, the fifth resistance line 161a and the fifth connection line 163a may be in contact with each other through a fifth contact hole CH5 formed in the insulating layer IL.

In some exemplary embodiments, the fifth connection line 163a may include a first sub connection line 1631a and a second sub connection line 1633a. Further, the fifth resistance line 161a may be in contact with the first sub connection line 1631a and the second sub connection line 1633a through the fifth contact hole CH5.

A ninth signal line 9311 connected to one end E1e of the fifth strain gauge 160a and a tenth signal line 9313 connected to the other end E2e of the fifth strain gauge 160a may be located on the peripheral area NSA of the base layer 110. In some exemplary embodiments, the tenth signal line 9313 may be connected to the first pad portion TP1, and the ninth signal line 9311 may be connected to the second pad portion TP2, but exemplary embodiments are not limited thereto.

Figure 60:
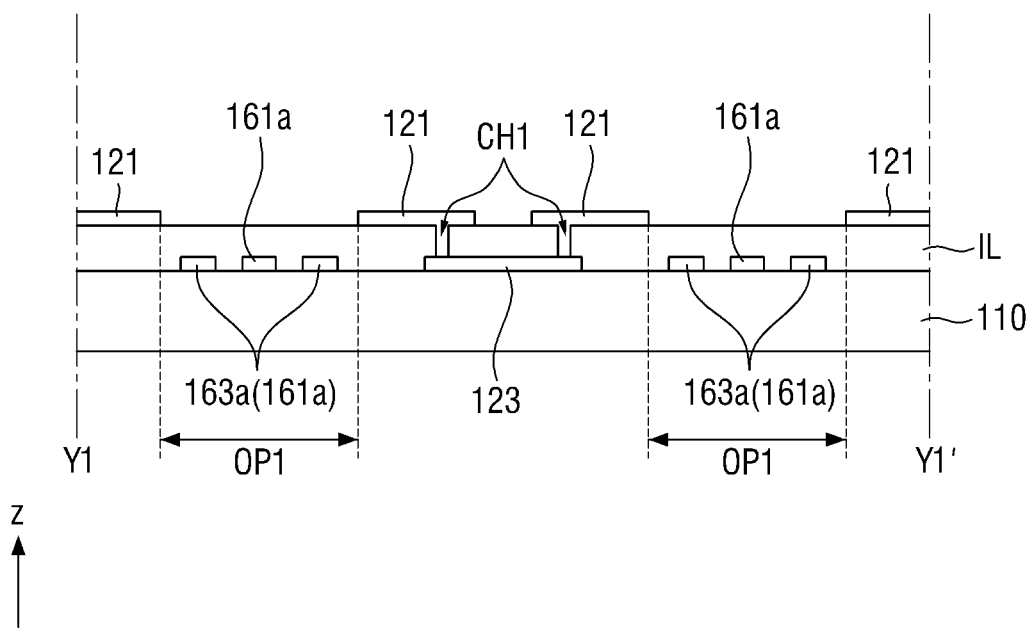
FIG. 60 is a cross-sectional view showing a modified structure of FIG. 41 according to some exemplary embodiments.

In some exemplary embodiments, the layer where the fifth resistance line 161a is located may be changed. FIG. 60 is a cross-sectional view showing a modified structure of FIG. 41 according to some exemplary embodiments. Referring to FIG. 60 in addition to FIGS. 33 to 41, in some exemplary embodiments, the fifth resistance line 161a may be located on a different layer from the first touch electrode 121, unlike that shown in FIG. 41. Illustratively, the fifth resistance line 161a may be located on the same second layer L2-2 as the fifth connection line 163a and the first connection portion 123. Hereinafter, a case where the fifth resistance line 161a is located on the first layer L1-2 will be described as a reference, but the fifth resistance line 161a may be located on the second layer L2-2.

Figure 42:
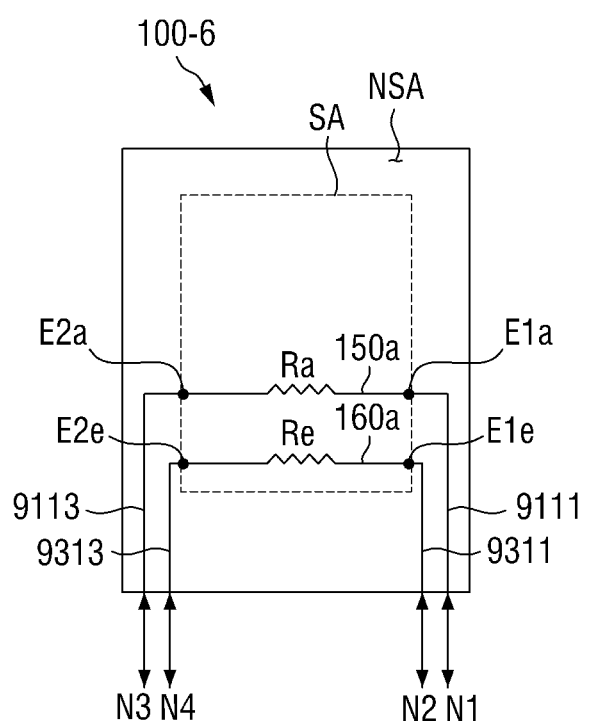
FIG. 42 is a plan view schematically showing a layout of a first strain gauge, a fifth strain gauge, a first signal line, a second signal line, a ninth signal line, and a tenth signal line shown in FIG. 33, as well as a connection relationship with a Wheatstone bridge circuit unit according to some exemplary embodiments.
Figure 43:
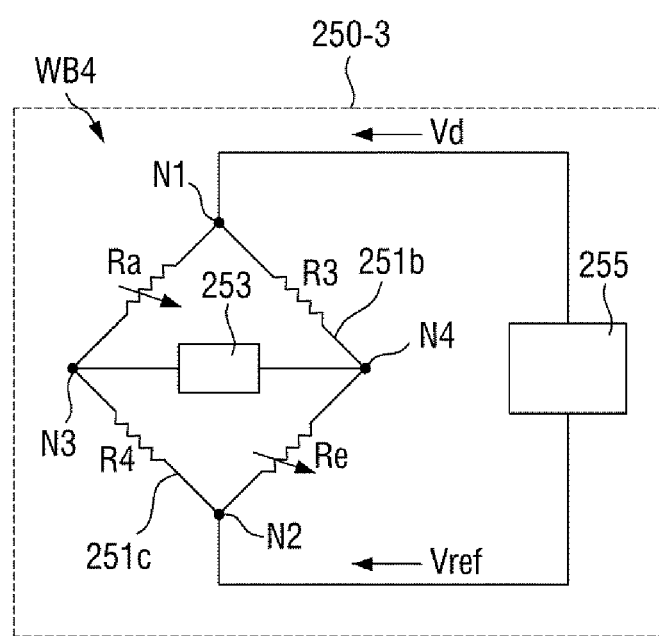
FIG. 43 is a diagram showing the Wheatstone bridge circuit unit electrically connected to the first strain gauge and the fifth train gauge shown in FIG. 42 according to some exemplary embodiments.

FIG. 42 is a plan view schematically showing a layout of a first strain gauge, a fifth strain gauge, a first signal line, a second signal line, a ninth signal line, and a tenth signal line shown in FIG. 33, as well as a connection relationship with a Wheatstone bridge circuit unit according to some exemplary embodiments. FIG. 43 is a diagram showing the Wheatstone bridge circuit unit electrically connected to the first strain gauge and the fifth train gauge shown in FIG. 42 according to some exemplary embodiments.

Referring to FIGS. 42 and 43, the fifth strain gauge 160a may include one end E1e and the other end E2e located at opposite sides to each other along the first direction x. As described above, one end E1e of the fifth strain gauge 160a may be connected to the ninth signal line 9311, and the other end E2e of the fifth strain gauge 160a may be connected to the tenth signal line 9313. Further, the ninth signal line 9311 and the tenth signal line 9313 may be located at the opposite sides to each other with the sensing area SA disposed therebetween.

In some exemplary embodiments, one end E1a of the first strain gauge 150a may be electrically connected to the first node N1 through the first signal line 9111, and the other end E2a of the first strain gauge 150a may be connected to the first output node N3 through the second signal line 9113. Further, one end E1e of the fifth strain gauge 160a may be electrically connected to the second node N2 through the ninth signal line 9311, and the other end E2e of the fifth strain gauge 160a may be connected to the second output node N4 through the tenth signal line 9313. In this manner, the first strain gauge 150a, the fifth strain gauge 160a, the second resistor 251b, and the third resistor 251c may be connected to each other to implement a Wheatstone bridge circuit unit WB4 in the pressure detector 250-3.

The Wheatstone bridge circuit unit WB4 is different from the Wheatstone bridge circuit unit WB2 in that the Wheatstone bridge circuit unit WB4 includes the resistance value Re of the fifth strain gauge 160a instead of the resistance value Rb of the second strain gauge 150b, and other configurations of the Wheatstone bridge circuit unit WB4 are substantially the same as or similar to those of the Wheatstone bridge circuit unit WB2. To this end, the controller 200-3 and the pressure detector 250-3 are different from the controller 200-1 and the pressure detector 250-1 in that the controller 200-3 and the pressure detector 250-1 include the Wheatstone bridge circuit unit WB4 instead of the Wheatstone bridge circuit unit WB2. As such, duplicative descriptions of these elements are omitted.

In some exemplary embodiments, in a state where a touch input is not applied, the resistance value Ra of the first strain gauge 150a and the resistance value Re of the fifth strain gauge 160a may be substantially equal to the resistance value R3 of the second resistor 251b and the resistance value R4 of the third resistor 251c.

When a touch input is applied to the sensor unit 100-6, the shapes of the first strain gauge 150a and the fifth strain gauge 160a may be deformed depending on the intensity of the touch, and the resistance value Ra of the first strain gauge 150a and the resistance value Re of the fifth strain gauge 160a may be changed due to the shape deformation such that a voltage difference occurs between the first output node N3 and the second output node N4. The voltage difference or the amount of current generated by the voltage difference may be measured by the first element 253 to detect the pressure of the touch.

Figure 44:
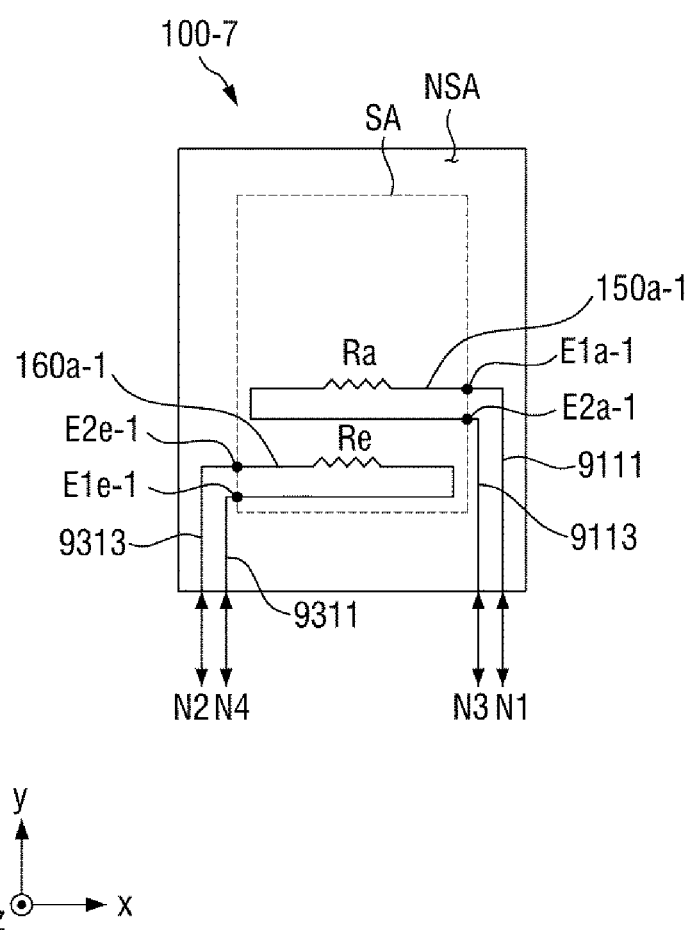
FIG. 44 is a plan view showing a modified example of FIG. 42 according to some exemplary embodiments.

FIG. 44 is a plan view showing a modified example of FIG. 42 according to some exemplary embodiments.

Referring to FIG. 44, in the sensor unit 100-7, both one end E1a-1 and the other end E2a-1 of the first strain gauge 150a-1 may be located at one side (e.g., the right side in FIG. 44) of the sensing area SA, and both one end E1e-1 and the other end E2e-1 of the fifth strain gauge 160a-1 may be located at the other side (e.g., the left side in FIG. 44) of the sensing area SA. However, exemplary embodiments are not limited thereto. In some exemplary embodiments, all of one end E1a-1 and the other end E2a-1 of the first strain gauge 150a-1 and the one end E1e-1 and the other end E2e-1 of the fifth strain gauge 160a-1 may be located at one side of the sensing area SA, for example, at the left side or the right side of the sensing area SA.

Figure 45:
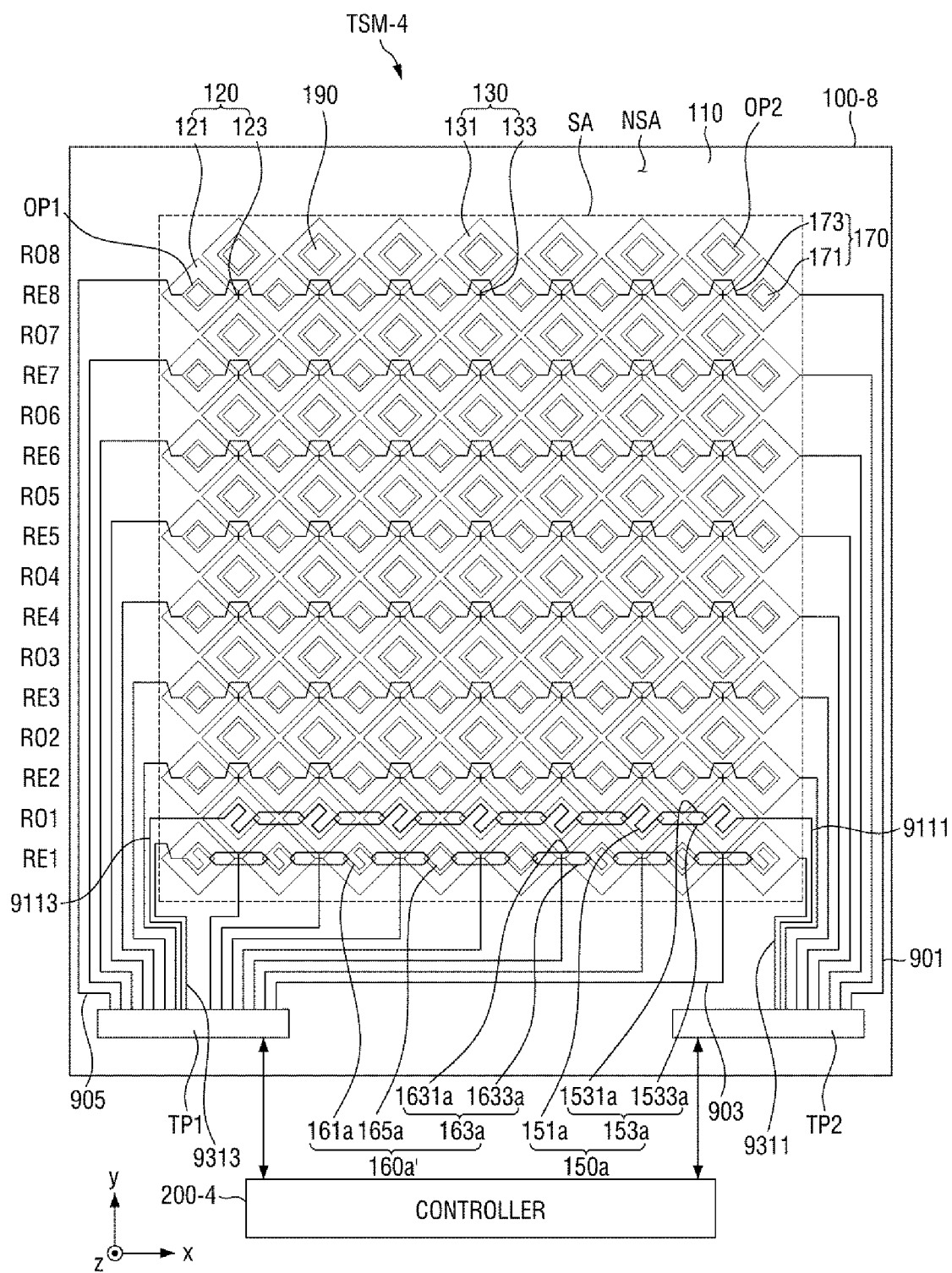
FIG. 45 is a plan view of a sensor unit of a touch sensor including a depiction of a connection relationship between the sensor unit and a controller according to some exemplary embodiments.
Figure 46:
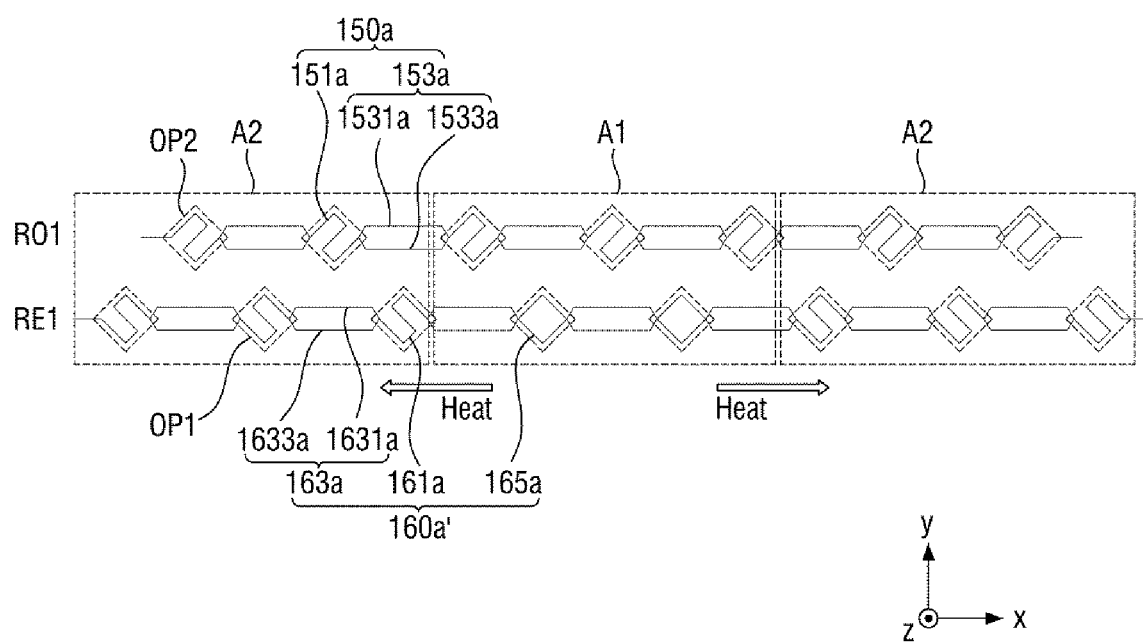
FIG. 46 is a plan view showing a first strain gauge and a fifth strain gauge shown in FIG. 45 according to some exemplary embodiments.
Figure 47:
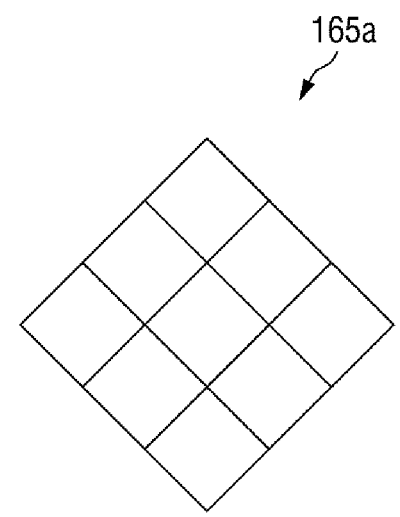
FIG. 47 is an enlarged view of a conductive pattern of the fifth strain gauge shown in FIG. 46 according to some exemplary embodiments.

FIG. 45 is a plan view of a sensor unit of a touch sensor including a depiction of a connection relationship between the sensor unit and a controller according to some exemplary embodiments. FIG. 46 is a plan view showing a first strain gauge and a fifth strain gauge shown in FIG. 45 according to some exemplary embodiments. FIG. 47 is an enlarged view of a conductive pattern of the fifth strain gauge shown in FIG. 46 according to some exemplary embodiments.

Referring to FIGS. 45 to 47, the touch sensor TSM-4 includes a sensor unit 100-8 and a controller 200-4.

The sensor unit 100-8 is different from the sensor unit 100-7 in that the sensor unit 100-8 includes a fifth strain gauge 160a', and other configurations of the sensor unit 100-8 are substantially the same as or similar to those of the sensor unit 100-7.

Unlike the above-described fifth strain gauge 160a, the fifth strain gauge 160a' further includes a first conductive pattern 165a. The first conductive pattern 165a may be located on the same first layer L1-2 as the fifth resistance line 161a of the fifth strain gauge 160a, and may be made of the same material as the fifth resistance line 161a.

In the base layer 110, a first area A1 and a second area A2 adjacent to the first area A1 along the first direction x may be defined. The first conductive pattern 165a may be disposed in the first opening OP1 located in the first area A1 in the first electrode row RE1, and may be spaced apart from the first touch electrode 121. Further, the fifth resistance line 161a may be disposed in the first opening OP1 located in the second area A2 other than the first area A1 in the first electrode row RE1.

The first resistance line 151a of the first strain gauge 150a may be located in the first area A1. In some exemplary embodiments, the first resistance line 151a of the first strain gauge 150a may be further disposed in the second area A2 as shown in FIG. 46, but exemplary embodiments are not limited thereto. In some exemplary embodiments, the first resistance line 151a of the first strain gauge 150a may be located in the first area A1, and may not be disposed in the second area A2.

The first conductive pattern 165a and the fifth resistance line 161a, neighboring along the first direction x, may be electrically connected to each other through the fifth connection line 163a.

In some exemplary embodiments, with respect to the same pressure, the length change amount or section area change amount of the first conductive pattern 165a may be smaller than the length change amount or section area change amount of the fifth resistance line 161a. That is, with respect to the same pressure, the amount of resistance change of the first conductive pattern 165a may be smaller than the amount of resistance change of the fifth resistance line 161a. In some exemplary embodiments, the first conductive pattern 165a may have a mesh structure as shown in FIG. 47. Further, in some exemplary embodiments, the shape of the first conductive pattern 165a may be substantially the same as the shape of the noise sensing electrode 171.

In some exemplary embodiments, the first area A1 may be a predefined area in the touch sensor TSM-4. Illustratively, the first area A1 may be an area that replaces a physical input button.

When a user's touch input is applied to the first area A1, the resistance value of the first strain gauge 150a may be changed depending on the intensity of the user's touch input. Further, the resistance value of the first strain gauge 150a may be changed depending on the temperature change caused by the user's body temperature. Since the change amount of the resistance value of the first strain gauge 150a based on the temperature change is independent of the intensity of the user's touch input, the change amount thereof may act as noise.

According to some exemplary embodiments, the fifth strain gauge 160a' includes a first conductive pattern 165a located in the first area A1 and a fifth resistance line 161a located in the second area A2. Therefore, when the user's touch input is applied to the first area A1, the change in resistance value in the first conductive pattern 165a occurs at a relatively low level relative to the fifth resistance line 161a. Further, the heat caused by user's body temperature is transferred from the first conductive pattern 165a to the fifth resistance line 161a, and the change of the resistance value occurs based on the temperature change.

That is, when a touch input is applied, the change in resistance value depending on the intensity of the touch input does not substantially occur or slightly occurs in the fifth strain gauge 160a', and the change of the resistance value occurs depending on the temperature change. Therefore, the component based on the temperature change in the change amount of the resistance value of the first strain gauge 150a can be compensated using the resistance value change occurring based on the temperature change in the fifth strain gauge 160a'.

Figure 48:
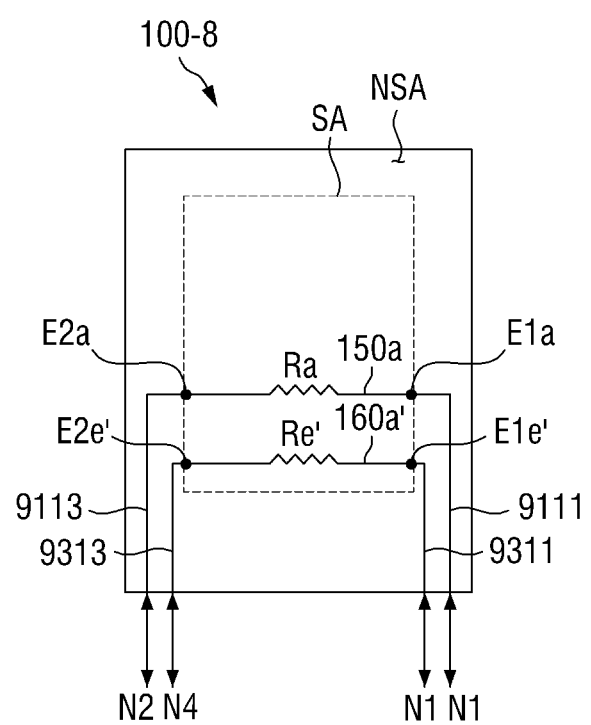
FIG. 48 is a plan view schematically showing a layout of the first strain gauge, the fifth strain gauge, a first signal line, a second signal line, a ninth signal line, and a tenth signal line shown in FIG. 45, as well as a connection relationship with a Wheatstone bridge circuit unit according to some exemplary embodiments.
Figure 49:
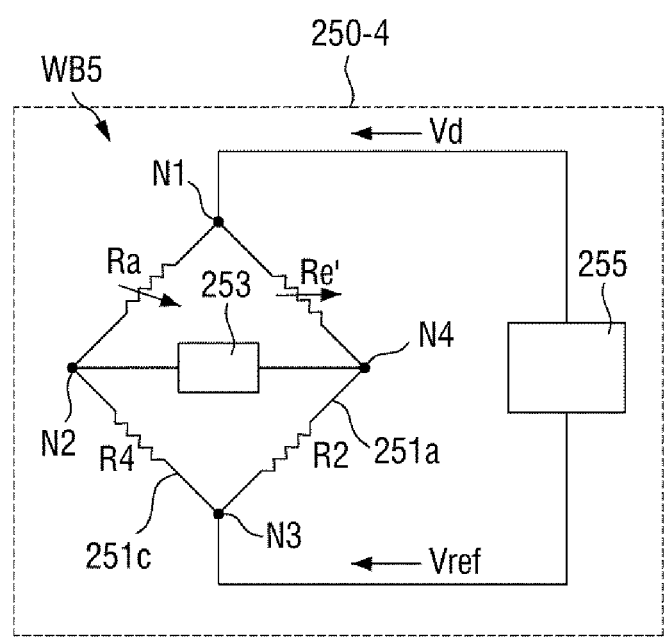
FIG. 49 is a diagram showing the Wheatstone bridge circuit unit electrically connected to the first strain gauge and the fifth train gauge shown in FIG. 48 according to some exemplary embodiments.

FIG. 48 is a plan view schematically showing a layout of the first strain gauge, the fifth strain gauge, a first signal line, a second signal line, a ninth signal line, and a tenth signal line shown in FIG. 45, as well as a connection relationship with a Wheatstone bridge circuit unit according to some exemplary embodiments. FIG. 49 is a diagram showing the Wheatstone bridge circuit unit electrically connected to the first strain gauge and the fifth train gauge shown in FIG. 48 according to some exemplary embodiments.

Referring to FIGS. 48 and 49, the controller 200-4 is different from the above-described controller 200 in that the pressure detector 250-4 includes a Wheatstone bridge circuit unit WB5, and other configurations of the controller 200-4 are substantially the same as or similar to those of the controller 200.

The pressure detector 250-4 of the controller 200-4 may include a Wheatstone bridge circuit unit WB5. The Wheatstone bridge circuit unit WB5 is different from the Wheatstone bridge circuit unit WB1 shown in FIG. 19 in that it does not include the second resistor 251b, and other configurations of the Wheatstone bridge circuit unit WB5 are substantially the same as or similar to those of the Wheatstone bridge circuit unit WB1. Therefore, duplicate descriptions will be omitted.

One end E1a of the first strain gauge 150a may be electrically connected to the first node N1 through the first signal line 9111, and the other end E2a of the first strain gauge 150a may be connected to the first output node N3 through the second signal line 9113. Further, one end E1e' of the fifth strain gauge 160a' may be connected to the second node N2 through the ninth signal line 9311, and the other end E2e' of the fifth strain gauge 160a' may be connected to the second output node N4 through the tenth signal line 9313. In this manner, the first strain gauge 150a, the fifth strain gauge 160a', the first resistor 251a, and the third resistor 251c are connected to each other to implement a Wheatstone bridge.

In some exemplary embodiments, in a state where a touch input is not applied, the resistance value Ra of the first strain gauge 150a and the resistance value Re' of the fifth strain gauge 160a' may be substantially equal to the resistance value R2 of first resistor 251a and the resistance value R4 of the third resistor 251c.

When a touch input is applied, the resistance value Ra of the first strain gauge 150a includes a component changing in shape due to a touch pressure (hereinafter, referred to as a "first pressure resistance component") and a component changing based on a temperature change (hereinafter, referred to as a "first temperature resistance component"). Further, when a touch input is applied, the resistance value Re' of the fifth strain gauge 160a' includes a component changing in shape due to a touch pressure (hereinafter, referred to as a "second pressure resistance component") and a component changing based on a temperature change (hereinafter referred to as a "second temperature resistance component"). Here, the second pressure resistance component may be negligible. Since the first strain gauge 150a and the fifth strain gauge 160a' are not arranged to face each other in a diagonal direction in the Wheatstone bridge circuit unit WBS, the second temperature resistance component of the fifth strain gauge 160a' may compensate or offset the first temperature resistance component of the first strain gauge 150a such that a touch pressure can be detected with more sensitivity.

Although not shown, the positions of both ends E1a and E2a of the first strain gauge 150a, the second signal line 9113, both ends E1e' and E2e' of the fifth strain gauge 160a', the ninth signal line 9311, and the tenth signal line 9313 may be changed similarly to those shown in FIG. 44.

Figure 50:
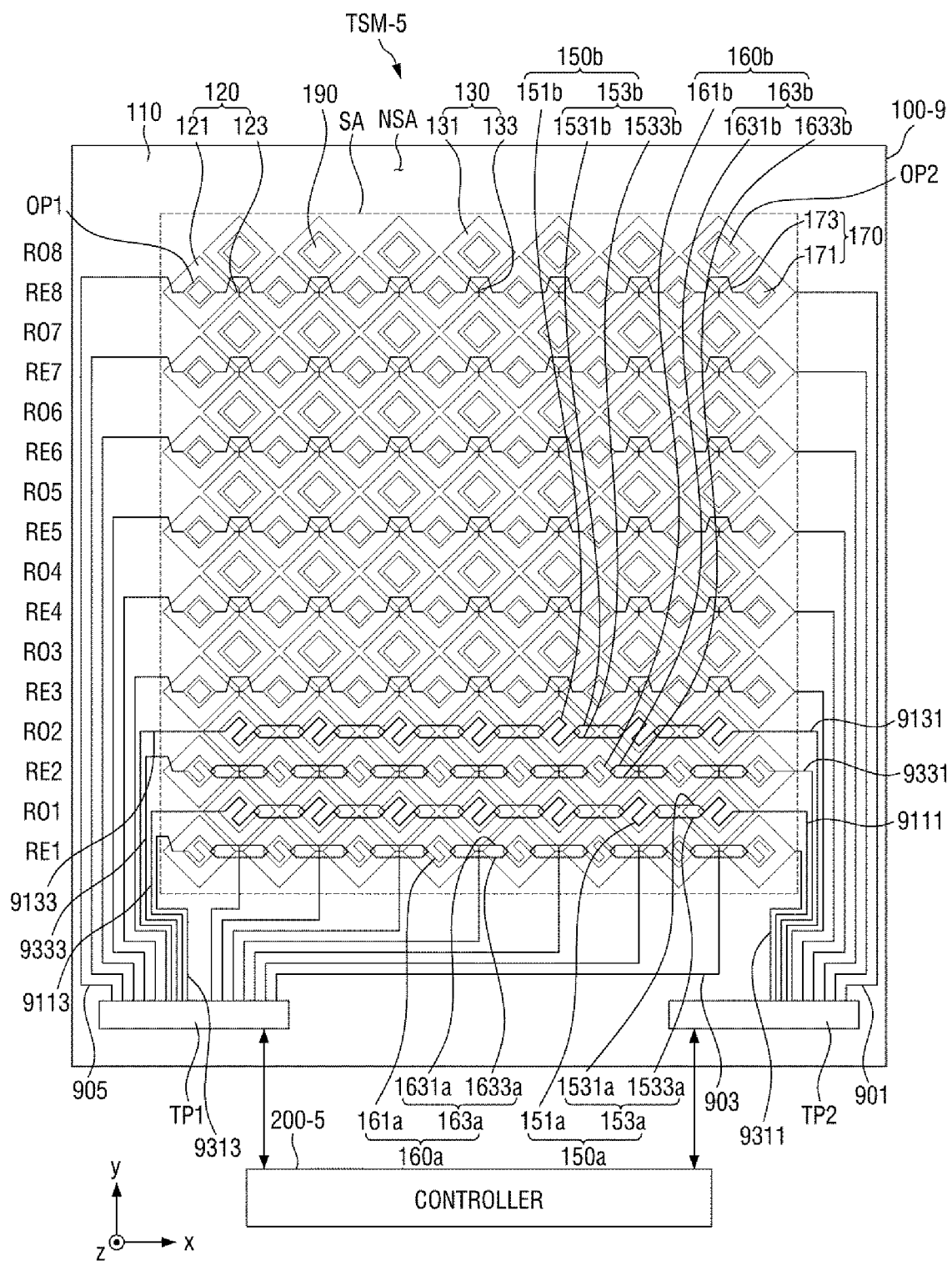
FIG. 50 is a plan view of a sensor unit of a touch sensor including a depiction of a connection relationship between the sensor unit and a controller according to some exemplary embodiments.
Figure 51:
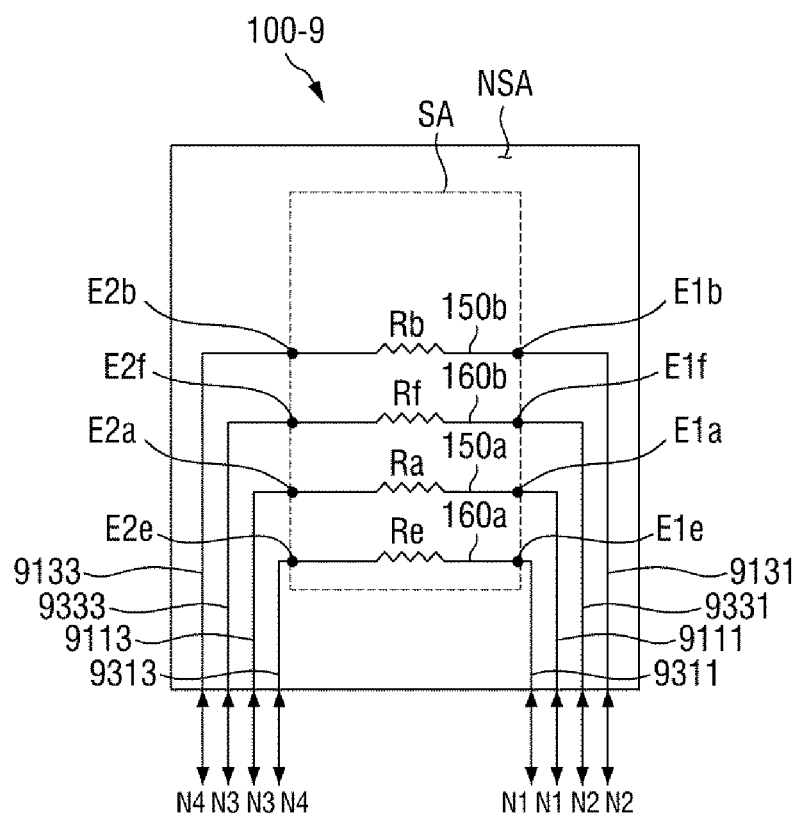
FIG. 51 is a plan view schematically showing a layout of a first strain gauge, a second strain gauge, a fifth strain gauge, a sixth strain gauge, a first signal line, a second signal line, a ninth signal line, a tenth signal line, an eleventh signal line, and a twelfth signal line shown in FIG. 50, as well as a connection relationship with a Wheatstone bridge circuit unit according to some exemplary embodiments.
Figure 51:
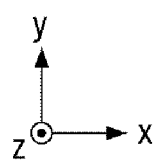
Figure 52:
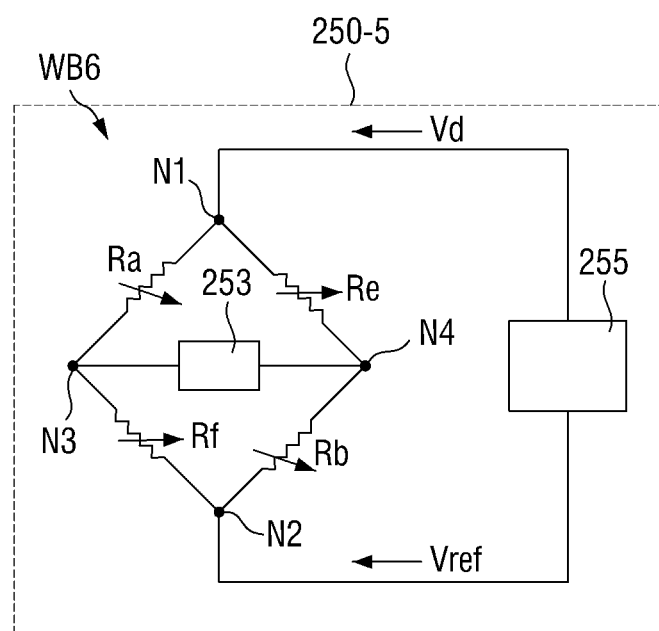
FIG. 52 is a diagram showing the Wheatstone bridge circuit unit electrically connected to the first strain gauge, the second strain gauge, the fifth strain gauge, and the sixth strain gauge shown in FIG. 51 according to some exemplary embodiments.

FIG. 50 is a plan view of a sensor unit of a touch sensor including a depiction of a connection relationship between the sensor unit and a controller according to some exemplary embodiments. FIG. 51 is a plan view schematically showing a layout of a first strain gauge, a second strain gauge, a fifth strain gauge, a sixth strain gauge, a first signal line, a second signal line, a ninth signal line, a tenth signal line, an eleventh signal line, and a twelfth signal line shown in FIG. 50, as well as a connection relationship with a Wheatstone bridge circuit unit according to some exemplary embodiments. FIG. 52 is a diagram showing the Wheatstone bridge circuit unit electrically connected to the first strain gauge, the second strain gauge, the fifth strain gauge, and the sixth strain gauge shown in FIG. 51 according to some exemplary embodiments.

Referring to FIGS. 50 to 52, the touch sensor TSM-5 includes a sensor unit 100-9 and a controller 200-5.

The sensor unit 100-9 is different from the sensor unit 100-6 shown in FIG. 33 in that the sensor unit 100-9 further includes a second strain gauge 150b, a sixth strain gauge 160b, a third signal line 9131, a fourth signal line 9133, an eleventh signal line 9331, and a twelfth signal line 9333, and other configurations of the sensor unit 100-9 are substantially the same as or similar to those of the sensor unit 100-6. Therefore, hereinafter, differences will be mainly described.

Descriptions of the second strain gauge 150b, the third signal line 9131, and the fourth signal line 9133 are the same as those in the sensor unit TSM-1 shown in FIG. 22, and will, thus, be omitted.

The sixth strain gauge 160b is located in the electrode row formed by the first electrode units 120 and located in the sensing area SA, and may be located at the opposite side of the fifth strain gauge 160a with the first strain gauge 150a disposed therebetween. Illustratively, when the first strain gauge 150a is located in the first row RO1 and the fifth strain gauge 160a is located in the first electrode row RE1, the sixth strain gauge 160b may be located in the second electrode row RE2. Further, in this case, the above-described second strain gauge 150b may be located in the second row RO2. That is, the sixth strain gauge 160b may be located between the second strain gauge 150b and the first strain gauge 150a.

The sixth strain gauge 160b may have substantially the same structure as the first strain gauge 160a. For instance, the sixth strain gauge 160b may include a sixth resistance line 161b and a sixth connection line 163b.

The sixth resistance line 161b may be located in the first opening OP1 formed in the first touch electrode 121 in the second electrode row RE2, and may be spaced apart from the first touch electrode 121. In some exemplary embodiments, the sixth resistance line 161b may be located on the same first layer L1 as the first resistance line 151a, and may be made of the same material as the first resistance line 151a. The sixth connection line 163b may electrically connect the sixth resistance lines 161b neighboring along the first direction x to each other, and may be in contact with the sixth resistance lines 161b. The sixth connection line 163b may be located in the same second layer L2 as the second connection line 153b, and may be made of the same material as the first connection line 153a.

The sixth connection line 163b may include a first sub connection line 1631b and a second sub connection line 1633b. A description of the sixth resistance line 161b may be substantially the same as that of the fifth resistance line 161a, and a description of the sixth connection line 161b may be substantially the same as that of the fifth connection line 161a. Therefore, detailed descriptions thereof will be omitted.

An eleventh signal line 9331 connected to one end E1f of the sixth strain gauge 160b and a twelfth signal line 9333 connected to the other end E2f of the sixth strain gauge 160b may be located on the peripheral area NSA of the base layer 110. In some exemplary embodiments, the twelfth signal line 9333 may be connected to the first pad portion TP1 and the eleventh signal line 9331 may be connected to the second pad portion TP2, but exemplary embodiments are not limited thereto.

One end E1a of the first strain gauge 150a may be electrically connected to the first node N1, and the other end E2a of the first strain gauge 150a may be electrically connected to the first output node N3. One end E1b of the second strain gauge 150b may be electrically connected to the second node N2, and the other end E2b of the second strain gauge 150b may be electrically connected to the second output node N4. One end E1e of the fifth strain gauge 160a may be electrically connected to the first node N1, and the other end E2e of the fifth strain gauge 160a may be electrically connected to the second output node N4. One end E1f of the sixth strain gauge 160b may be electrically connected to the second node N1, and the other end E2f of the sixth strain gauge 160b may be electrically connected to the first output node N3. In this manner, the first strain gauge 150a, the fifth strain gage 160a, the second strain gage 150b, and the sixth strain gage 160b may be connected to each other to implement a Wheatstone bridge circuit unit WB6 in the pressure detector 250-5.

The controller 200-5 and the pressure detector 250-5 are different from the controller 200-1 and the pressure detector 250-1 in that the controller 200-5 and the pressure detector 250-5 include the Wheatstone bridge circuit unit WB6 instead of the Wheatstone bridge circuit unit WB2. As such, duplicative descriptions of these elements are omitted.

In some exemplary embodiments, in a state where a touch input is not applied, the resistance value Ra of the first strain gauge 150a and the resistance value Re of the fifth strain gauge 160a may be substantially the same as the resistance value Rb of the second strain gauge 150b and the resistance value Rf of the sixth strain gauge 160b.

When a touch input is applied to the sensor unit 100-9, the shapes of the first strain gauge 150a, the second strain gauge 150b, the fifth strain gauge 160a, and the sixth strain gauge 160b may be deformed depending on the intensity of the touch, and the resistance value Ra of the first strain gauge 150a, the resistance value Rb of the second strain gauge 150b, the resistance value Re of the fifth strain gauge 160a, and the resistance value Rf of the sixth strain gauge 160b may be changed due to the shape deformation such that a voltage difference occurs between the first output node N3 and the second output node N4. The voltage difference or the amount of current generated by the voltage difference may be measured by the first element 253 to detect the pressure of the touch.

Figure 53:
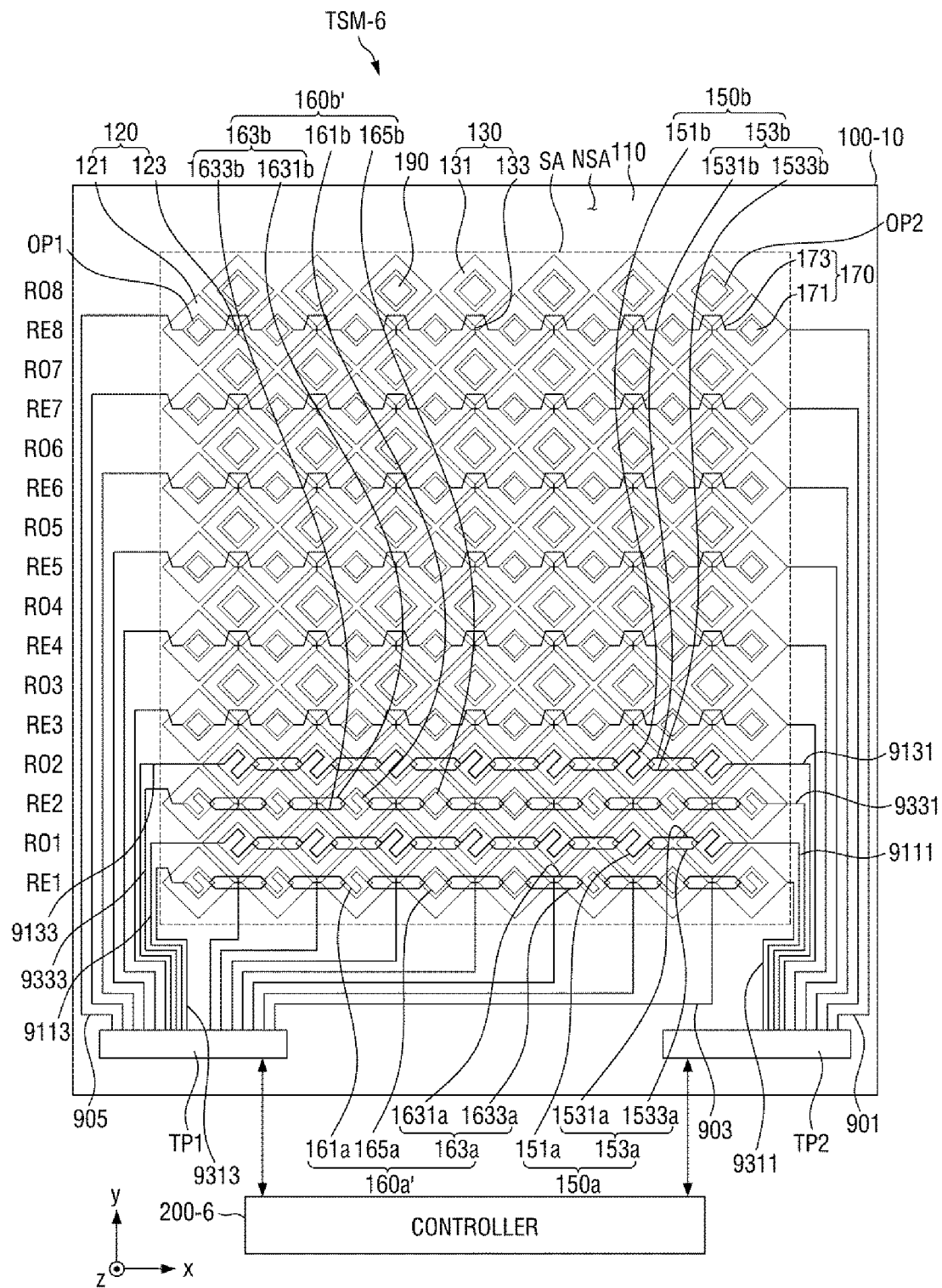
FIG. 53 is a plan view of a sensor unit of a touch sensor including a depiction of a connection relationship between the sensor unit and a controller according to some exemplary embodiments.
Figure 54:
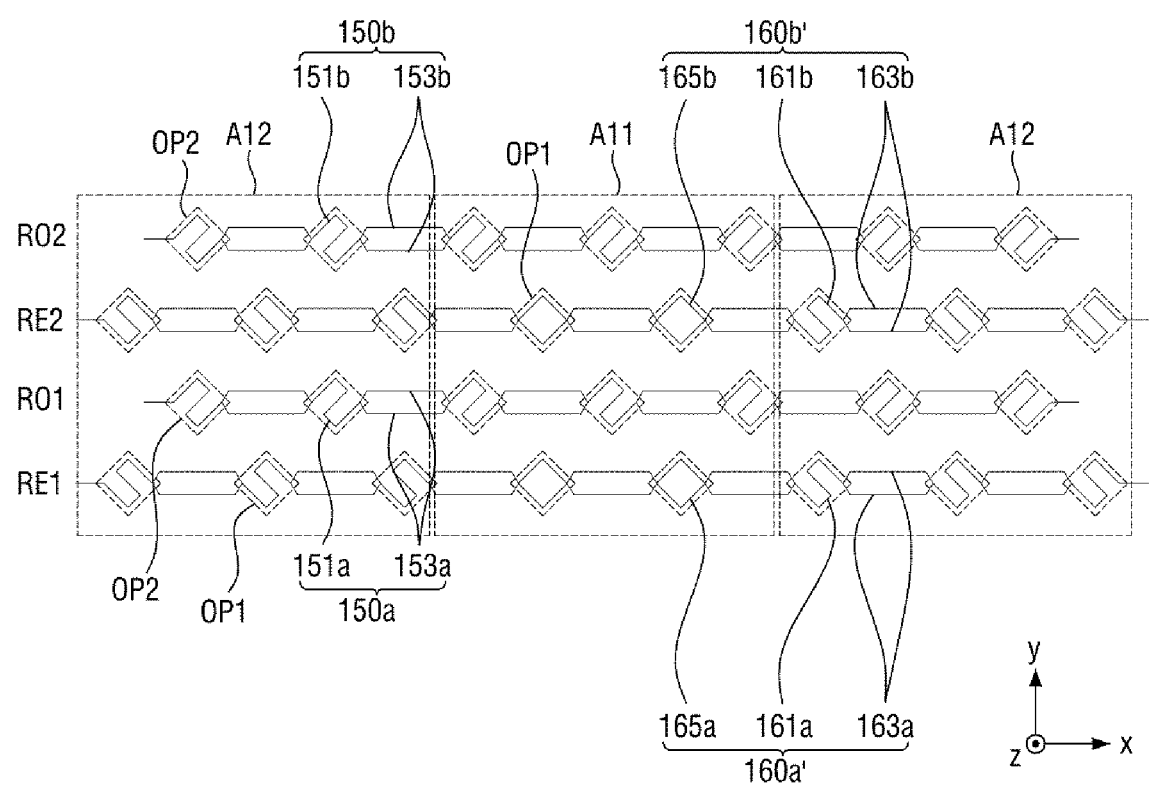
FIG. 54 is an enlarged view of a first strain gauge, a second strain gauge, a fifth strain gauge, and a sixth strain gauge shown in FIG. 53 according to some exemplary embodiments.
Figure 55:
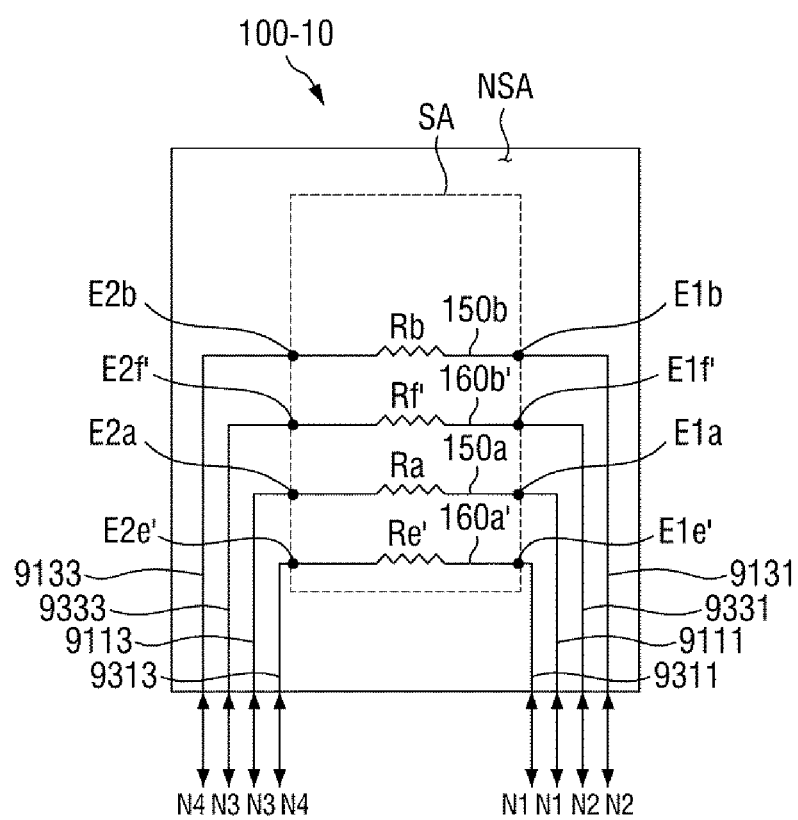
FIG. 55 is a plan view schematically showing a layout of the first strain gauge, the second strain gauge, the fifth strain gauge, the sixth strain gauge, a first signal line, a second signal line, a ninth signal line, a tenth signal line, an eleventh signal line, and a twelfth signal line shown in FIGS. 53 and 54, as well as a connection relationship with a Wheatstone bridge circuit unit according to some exemplary embodiments.
Figure 56:
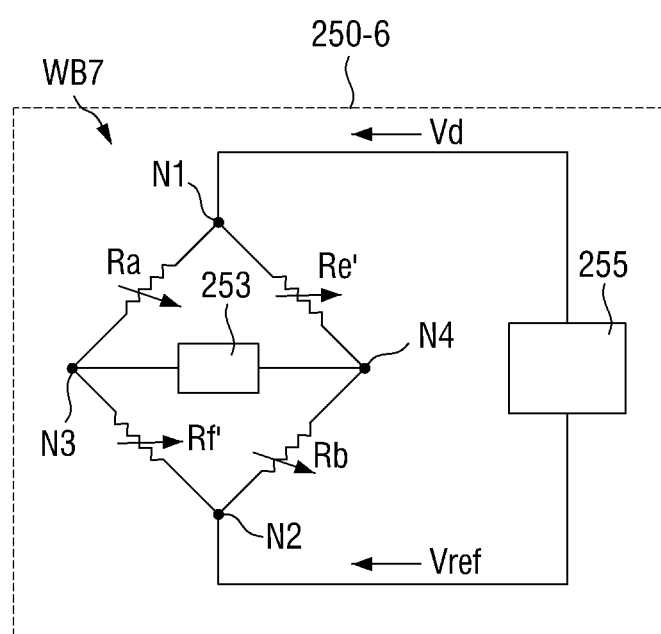
FIG. 56 is a diagram showing a Wheatstone bridge circuit unit electrically connected to the first strain gauge, the second strain gauge, the fifth strain gauge, and the sixth strain gauge shown in FIG. 55 according to some exemplary embodiments.

FIG. 53 is a plan view of a sensor unit of a touch sensor including a depiction of a connection relationship between the sensor unit and a controller according to some exemplary embodiments. FIG. 54 is an enlarged view of a first strain gauge, a second strain gauge, a fifth strain gauge, and a sixth strain gauge shown in FIG. 53 according to some exemplary embodiments. FIG. 55 is a plan view schematically showing a layout of the first strain gauge, the second strain gauge, the fifth strain gauge, the sixth strain gauge, a first signal line, a second signal line, a ninth signal line, a tenth signal line, an eleventh signal line, and a twelfth signal line shown in FIGS. 53 and 54, as well as a connection relationship with a Wheatstone bridge circuit unit according to some exemplary embodiments. FIG. 56 is a diagram showing a Wheatstone bridge circuit unit electrically connected to the first strain gauge, the second strain gauge, the fifth strain gauge, and the sixth strain gauge shown in FIG. 55 according to some exemplary embodiments.

Referring to FIGS. 53 to 56, the touch sensor TSM-6 includes a sensor unit 100-10 and a controller 200-6.

The sensor unit 100-10 is different from the sensor unit 100-9 shown in FIG. 50 in that the sensor unit 100-10 further includes a fifth strain gauge 160a' and a sixth strain gauge 160b', and other configurations of the sensor unit 100-10 are substantially the same as or similar to those of the sensor unit 100-9. Therefore, hereinafter, differences will be mainly described.

The fifth strain gauge 160a' further includes a first conductive pattern 165a unlike the fifth strain gauge 160a, and the sixth strain gauge 160b' further includes a second conductive pattern 165b unlike the sixth strain gauge 160b. A description of the fifth strain gauge 160a' is the same as that having been described with reference to FIGS. 45 to 49, and will, thus, be omitted.

The second conductive pattern 165b of the sixth strain gauge 160b' is electrically connected to the sixth resistance line 161b along the first direction x. The second conductive pattern 165b and the sixth resistance line 161b may be electrically connected to each other through the sixth connection line 163b. The second conductive pattern 165b may be located on the same first layer L1 as the first touch electrode 121.

In the base layer 110, a first area A11 and a second area A12 adjacent to the first area A11 along the first direction x may be defined. The first area A11 may be an area that replaces a physical input button.

The second conductive pattern 165b may be disposed in the first opening OP1 located in the first area A11 in the second electrode row RE2, and may be spaced apart from the first touch electrode 121. Further, the sixth resistance line 161b may be disposed in the first opening OP1 located in the second area A12 different from the first area A11 in the second electrode row RE2.

The amount of resistance change of the second conductive pattern 165b may be smaller than the amount of resistance change of the sixth resistance line 161b, and the heat generated by a user's body temperature or the like may be transmitted to the sixth resistance line 161b when a touch input is applied.

The first strain gauge 150a, the second strain gauge 150b, the fifth strain gauge 160a', and the sixth strain gauge 160b' may be connected to each other to implement a Wheatstone bridge circuit unit WB7 of the pressure detector 250-6 of the controller 200-6.

In some exemplary embodiments, in a state where a touch input is not applied, the resistance value Ra of the first strain gauge 150a, the resistance value Re' of the fifth strain gage 160a', the resistance value Rb of the second strain gage 150b, and the resistance value Rf of the sixth strain gage 160b' may be substantially equal to each other.

In addition, a description of the second conductive pattern 165b is substantially the same as the description of the first conductive pattern 165a, and the electrical connection relationship between the Wheatstone bridge circuit unit WB7 and the first strain gauge 150a, the second strain gauge 150b, the fifth strain gauge 160a' and the sixth strain gage 160b' may be substantially the same as those having been described above with reference to FIG. 52. Therefore, a detailed description thereof will be omitted.

Although not shown, among the various described exemplary embodiments, in the case of embodiments including the Wheatstone bridge circuit unit WB3, WB6, and WB7, at least one of signal lines connected to the same node may be omitted. For example, the connection relationship between the signal lines and the strain gauges may be modified as shown in FIG. 32, or may be modified in various ways as far as possible.

According to various exemplary embodiments, a touch sensor may detect the intensity of touch pressure, as well as a touch input. Accordingly, the touch sensor according to various exemplary embodiments may be used in place of a physical input button or in combination with a physical input button. Since the touch sensor detects the intensity of a user's touch input and/or the intensity of pressure, the touch sensor may be used as input means for a display device and may provide various user interfaces to users. Illustratively, the touch sensor may detect the intensity of pressure and/or whether or not pressure is applied. Further, the operation of a preprogrammed display device may be output according to the pressure and/or magnitude applied to a specific position. For example, preprogrammed functions, such as screen adjustment, screen lock, screen conversion, application call, application execution, picture capturing, call reception, and the like, may be performed.

Further, since the touch sensor can cancel the noise introduced from the display panel and the like, it has an advantage of being capable of improving touch sensitivity. Also, since the touch sensor can compensate for the resistance change due to temperature, it has an advantage of being capable of improving the detection sensitivity of touch pressure.

As described, according to various exemplary embodiments, there can be provided a touch sensor capable of sensing the pressure of a touch input, as well as the position of touch input, and a display device including the touch sensor. The effects of the inventive concepts are not limited by the foregoing, and other various effects are anticipated.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. An electronic device, comprising:
a base substrate;
a light emitting element disposed on the base substrate;
an organic layer disposed on the light emitting element;
an inorganic layer disposed on the organic layer;
a first electrode unit comprising first touch electrodes arranged on the inorganic layer along a first direction and a first connection portion disposed between two adjacent first touch electrodes along the first direction among the first touch electrodes in a plan view;
second electrode units spaced apart from one another along the first direction, each of the second electrode units comprising second touch electrodes arranged on the base layer along a second direction intersecting the first direction and a second connection portion disposed between two adjacent second touch electrodes along the second direction among the second touch electrodes in the plan view, each of the second touch electrodes forming a closed shape comprising a first opening interior thereto; and
a first conductive member comprising first conductive lines electrically connected to each other along the first direction, each of the first conductive lines being disposed in a respective first opening disposed in a first row among the first openings.

2. The electronic device of claim 1, wherein the first touch electrodes, the second touch electrodes, and the first conductive lines are disposed in a same first layer and are made of a same material.

3. The electronic device of claim 2, wherein:
the first conductive member further comprises a first connection line disposed between two adjacent first conductive lines along the first direction among the first conductive lines;
one of the first connection portion and the second connection portion is disposed on a second layer different from the first layer;
the other of the first connection portion and the second connection portion is disposed on the first layer; and
the first connection line is disposed on the second layer.

4. The electronic device of claim 3, wherein:
the first connection line comprises:
a first sub connection line disposed between the two adjacent first conductive lines; and
a second sub connection line at least partially spaced apart from the first sub connection line and disposed between the two adjacent first conductive lines; and
the first sub connection line and the second sub connection line are disposed on the second layer.

5. The electronic device of claim 3, further comprising:
an insulating layer disposed on the inorganic layer, the insulating layer comprising a first surface facing the inorganic layer and a second surface opposite to the first surface,
wherein:
the first connection line is disposed between the inorganic layer and the first surface of the insulating layer;
the first touch electrodes, the second touch electrodes, and the first conductive lines are disposed on the second surface of the insulating layer.

6. The electronic device of claim 5, wherein each of the first touch electrodes and each of the second touch electrodes has a mesh structure.

7. The electronic device of claim 1, further comprising:
branch portions disposed in each of the first openings and spaced apart from each other, each of the branch portions being extended from a respective some of the first resistance lines; and
each of the branch portions is made of a same material as the first conductive lines.

8. The electronic device of claim 1, wherein:
the electronic device is configured to sense a position of a touch input based on a change in capacitance between the first touch electrodes and the second touch electrodes, the change in capacitance being generated in response to the touch input; and
the electronic device is configured to sense a pressure of the touch input based on a change in resistance value of the first conductive member, the change in resistance value being generated in response to the touch input.

9. The electronic device of claim 1, further comprising:
a Wheatstone bridge circuit electrically connected to the first conductive member;
a first signal line electrically connecting one end of the first conductive member and a part of the Wheatstone bridge circuit unit; and
a second signal line electrically connecting the other end of the first conductive member and another part of the Wheatstone bridge circuit,
wherein the electronic device includes:
a sensing area in which the first touch electrodes, the second touch electrodes, and the first conductive lines are disposed; and
a peripheral area outside the sensing area, and
wherein:
the first signal line is disposed in the peripheral area and adjacent to a first side of the touch sensor; and
the second signal line is disposed in the peripheral area and adjacent to a second side of the touch sensor such that the sensing area is disposed between the first signal line and the second signal line.

10. The electronic device of claim 1, further comprising:
a Wheatstone bridge circuit electrically connected to the first conductive member;
a first signal line electrically connecting one end of the first conductive member and a part of the Wheatstone bridge circuit; and
a second signal line electrically connecting the other end of the first conductive member and another part of the Wheatstone bridge circuit,
wherein the electronic device further comprises:
a sensing area in which the first touch electrodes, the second touch electrodes, and the first resistances line are disposed; and
a peripheral area outside the sensing area, and
wherein the first signal line and the second signal line are disposed in the peripheral area and adjacent to a same side of the touch sensor such that the first and second signal lines are disposed between the same side of the touch sensor and the sensing area.

11. The electronic device of claim 1, further comprising:
a second conductive member disposed in a second row adjacent to the first row along the second direction,
wherein:
the second conductive member comprises second conductive lines electrically connected to each other along the first direction, each of the second conductive lines being disposed in a respective first opening disposed in the second row among the first openings; and the first touch electrodes, the second touch electrodes, the first conductive lines, and the second conductive lines are disposed in a same first layer.

12. The electronic device of claim 11, wherein, in a state in which a touch input is not applied, a resistance value of the first conductive member is substantially equal to a resistance value of the second conductive member.

13. The electronic device of claim 11, further comprising:
a Wheatstone bridge circuit electrically connected to the first conductive member and the second conductive member,
wherein the Wheatstone bridge circuit comprises:
a first node configured to receive a driving voltage, the first node being electrically connected to one end of the first conductive member;
a second node configured to receive a reference voltage, the second node being electrically connected to one end of the second conductive member;
a first output node electrically connected to the other end of the first conductive member; and
a second output node electrically connected to the other end of the second conductive member.

14. The electronic device of claim 13, wherein:
the Wheatstone bridge circuit further comprises:
a first resistor comprising one end connected to the first node and the other end connected to the second output node; and
a second resistor comprising one end connected to the second node and the other end connected to the first output node,
wherein, in a state in which a touch input is not applied, a resistance value of the first conductive member, a resistance value of the second conductive member, a resistance value of the first resistor, and a resistance value of the second resistor are substantially equal to each other.

15. The electronic device of claim 11, further comprising:
a third conductive member disposed in a third row adjacent to the second row along the second direction, the third conductive member comprising a third conductive line disposed in a first opening disposed in the third row among the first openings;
a fourth conductive member disposed in a fourth row adjacent to the third row along the second direction, the fourth conductive member comprising a fourth conductive line disposed in a first opening disposed in the fourth row among the first openings; and
a Wheatstone bridge circuit electrically connected to the first conductive member, the second conductive member, the third conductive member, and the fourth conductive member,
wherein the first row, the second row, the third row, and the fourth row are sequentially arranged along the second direction.

16. The electronic device of claim 15, wherein:
the Wheatstone bridge circuit comprises:
a first node configured to receive a driving voltage, the first node being electrically connected to one end of the first conductive member and one end of the third conductive member;
a second node configured to receive a reference voltage, the second node being electrically connected to one end of the second conductive member and one end of the fourth conductive member;
a first output node electrically connected to the other end of the first conductive member and the other end of the fourth conductive member; and
a second output node electrically connected to the other end of the second conductive member and the other end of the third conductive member; and
wherein, in a state in which a touch input is not applied, a resistance value of the first conductive member, a resistance value of the second conductive member, a resistance value of the third conductive member, and a resistance value of the fourth conductive member are substantially equal to each other.

17. The electronic device of claim 11, further comprising:
a third conductive member disposed in a same first electrode row as the first electrode unit,
wherein:
at least one of the first touch electrodes comprises a second opening;
the third conductive member further comprises a third conductive line disposed in the second opening; and
the first touch electrodes, the second touch electrodes, the first conductive lines, the second conductive lines, and the third conductive line are disposed in the same first layer.

18. The electronic device of claim 17, wherein an area of the first opening is greater than an area of a second opening among the second openings.

19. The electronic device of claim 17, further comprising:
a fourth conductive member disposed in a second electrode row adjacent to the first electrode row along the second direction,
wherein:
the fourth conductive member comprises a fourth conductive line disposed in a second opening disposed in the second electrode row among the second openings;
the fourth conductive member is disposed between the first conductive member and the second conductive member along the second direction;
the first conductive member is disposed between the third conductive member and the fourth conductive member; and
the fourth conductive line is disposed in the same first layer.

20. The electronic device of claim 19, further comprising:
a Wheatstone bridge circuit electrically connected to the first conductive member, the second conductive member, the third conductive member, and the fourth conductive member,
wherein the Wheatstone bridge circuit comprises:
a first node configured to receive a driving voltage, the first node being electrically connected to one end of the first conductive member and one end of the third conductive member;
a second node configured to receive a reference voltage, the second node being electrically connected to one end of the second conductive member and one end of the fourth conductive member;
a first output node electrically connected to the other end of the first conductive member and the other end of the fourth conductive member; and
a second output node electrically connected to the other end of the second conductive member and the other end of the third conductive member.

21. The electronic device of claim 20, wherein, in a state in which a touch input is not applied, a resistance value of the first conductive member, a resistance value of the second conductive member, a resistance value of the third conductive member, and a resistance value of the fourth conductive member are substantially equal to each other.

22. The electronic device of claim 19, wherein:
The electronic device further comprises a first area and a second area adjacent to each other along the first direction;
the third conductive member further comprises a first conductive pattern electrically connected to the third conductive line;
in response to a touch input, a resistance value change of the first conductive pattern is relatively smaller than a resistance value change of the third conductive line;
the fourth conductive member further comprises a second conductive pattern electrically connected to the fourth conductive line;
in response to a touch input, a resistance value change of the second conductive pattern is relatively smaller than a resistance value change of the fourth conductive line;
the first conductive pattern and the second conductive pattern are disposed in respective second openings disposed in the first area among the second openings; and
the third conductive line and the fourth conductive line are disposed in the second area.

23. The electronic device of claim 22, wherein each of the first conductive pattern and the second conductive pattern has a mesh structure.

24. The electronic device of claim 1, further comprising:
a second conductive member disposed in a same first electrode row as the first electrode unit,
wherein:
at least one of the first touch electrodes comprises a second opening,
the second conductive member further comprises a second conductive line disposed in the second opening; and
the first touch electrodes, the second touch electrodes, the first resistance lines, and the second conductive line are disposed in a same first layer.

25. The electronic device of claim 24, wherein:
the electronic device further comprises a first area and a second area adjacent to each other along the first direction;
the second conductive member further comprises a conductive pattern electrically connected to the second conductive line;
in response to a touch input, a resistance value change of the conductive pattern is relatively smaller than a resistance value change of the second conductive line;
the second conductive line is disposed in the second area;
each of the first touch electrodes comprises a second opening; and
the conductive pattern is disposed in a second opening disposed in the first area among the second openings.

26. The electronic device of claim 1, further comprising:
a dummy conductive pattern disposed in a different area than the first conductive line,
wherein:
the dummy conductive pattern is disposed in a first opening disposed in the different area among the first openings, the dummy conductive pattern being spaced apart from the second touch electrodes; and
the first touch electrodes, the second touch electrodes, the first conductive lines, and the dummy conductive pattern are disposed in a same first layer and are made of a same material as the first conductive lines.

27. The electronic device of claim 1, further comprising:
a noise sensing electrode configured to sense a noise signal,
wherein:
at least one of the first touch electrodes further comprises a second opening;
the noise sensing electrode is disposed in the second opening and is made of a same material as the first conductive lines; and
the first touch electrodes, the second touch electrodes, the first conductive lines, and the noise sensing electrode are disposed in a same first layer.

28. The electronic device of claim 27, wherein the touch sensor is configured to cancel a noise of a signal sensed via the first electrode unit based on the noise signal.

29. An electronic device, comprising:
a base substrate;
a light emitting element disposed on the base substrate;
an organic layer disposed on the light emitting element;
an inorganic layer disposed on the organic layer;
a first electrode unit comprising first touch electrodes arranged on the inorganic layer along a first direction and a first connection portion disposed between two adjacent first touch electrodes along the first direction among the first touch electrodes in a plan view;, each of the first touch electrodes comprising a first opening;
a first conductive member disposed in a same first electrode row as the first electrode unit; and
a second electrode unit comprising second touch electrodes arranged on the base layer along a second direction intersecting the first direction and a second connection portion disposed between two adjacent second touch electrodes along the second direction among the second touch electrodes in the plan view,
wherein the first conductive member comprises first conductive lines and a first connection line disposed between two adjacent first conductive lines along the first direction among the first conductive lines, each of the first conductive lines being disposed in a respective first opening among the first openings and being spaced apart from the first touch electrodes.

30. The electronic device of claim 29, wherein the first touch electrodes, the second touch electrodes, and the first conductive lines are disposed in a same first layer and are made of a same material.

31. The electronic device of claim 29, further comprising:
branch portions disposed in each of the first openings, each of the first conductive lines being connected to a respective some of the branch portions,
wherein:
the first touch electrodes, the second touch electrodes, the first conductive lines, and the branch portions are disposed in a same first layer; and
the branch portions are spaced apart from the first touch electrodes and are made of a same material as the first conductive lines.

32. The electronic device of claim 29, further comprising:
a second conductive member disposed in a second electrode row adjacent to the first electrode row along the second direction,
wherein:
the first electrode unit is further disposed in the second electrode row;
the second conductive member comprises second conductive lines electrically connected to each other along the first direction, each of the second conductive lines being disposed in a respective first opening of the second electrode row among the first openings and spaced apart from the first touch electrodes; and the first touch electrodes, the second touch electrodes, the first conductive lines, and the second conductive lines are disposed in a same first layer.

33. The electronic device of claim 32, further comprising:
a Wheatstone bridge circuit electrically connected to the first conductive member and the second conductive member,
wherein, in a state in which a touch input is not applied, a resistance value of the first conductive member is substantially equal to a resistance value of the second conductive member.

* * * * *